United States Patent [19]

Sheldon et al.

[11] 4,128,888

[45] Dec. 5, 1978

[54] VELOCITY CONTROL ARRANGEMENT FOR A COMPUTER-CONTROLLED OIL DRILLING RIG

[75] Inventors: Loren B. Sheldon, Houston, Tex.; James R. Tomashek, Wood Dale; Donald H. Ward, Glen Ellyn, both of Ill.

[73] Assignee: BJ-Hughes Inc., Houston, Tex.

[21] Appl. No.: 777,677

[22] Filed: Mar. 15, 1977

[51] Int. Cl.$^2$ ........................ E21B 19/00; G06F 15/20

[52] U.S. Cl. .................................... 364/565; 214/2.5; 340/18 R; 340/670

[58] Field of Search ................. 173/2, 11, 12; 175/85, 175/24, 27, 203; 214/2.5; 211/605; 364/556, 565; 73/151; 340/263

[56] References Cited

U.S. PATENT DOCUMENTS

| | | | |
|---|---|---|---|
| 3,660,649 | 5/1972 | Gilchrist et al. | 235/193 |
| 3,752,966 | 8/1973 | Foy, Jr. et al. | 235/150.1 |
| 3,761,701 | 9/1973 | Wilder et al. | 235/193 |
| 3,881,695 | 5/1975 | Joubert | 173/11 X |
| 3,921,152 | 11/1975 | Hagar et al. | 235/151.3 X |
| 4,042,123 | 8/1977 | Sheldon et al. | 214/2.5 |

*Primary Examiner*—Edward J. Wise

*Attorney, Agent, or Firm*—Arnold, White & Durkee

[57] ABSTRACT

A computer - controlled oil drilling rig is characterized by apparatus for comparing signals representative of the actual velocity and direction of travel of a traveling block with signals representative of predetermined minimum and maximum velocities of the traveling block and a signal representative of a predetermined direction of travel of the traveling block. Output signals are generated if the actual velocity signals are greater than the maximum velocity signal or less than the minimum velocity signal and if the direction of the traveling block deviates from the predetermined direction.

10 Claims, 16 Drawing Figures

ACTUAL LOAD
INITIAL LOAD·(-K1)
ELEV. LOAD UNDER LIMIT
INITIAL LOAD·(-K2)
LOAD OVER LIMIT
ELEV. LOAD ACQUIRED
LOAD RELEASED
LOAD ACQ'D
136
138B
178
138M
179
180
766
810
811
812
813
819
826
850
858
882
1
2
3
4
5
6
H
X
+V
-V

VELOCITY CONTROL ARRANGEMENT FOR A COMPUTER-CONTROLLED OIL DRILLING RIG

CROSS REFERENCE TO RELATED APPLICATIONS

Subject matter disclosed and claimed herein is disclosed in the following copending applications, each assigned to the Assignee of the present invention:

Computer-Controlled Oil Drilling Rig having Drawworks Motor and Brake Control Arrangement, Ser. No. 777,724, filed Mar. 15, 1977 in the names of James P. Heffernan, Loren B. Sheldon, James R. Tomashek and Donald H. Ward;

Elevator Load Arrangement for a Computer-Controlled Oil Drilling Rig, Ser. No. 777,786, filed Mar. 15, 1977 in the names of Loren B. Sheldon, James R. Tomashek and Donald H. Ward; and, Block Position and Speed Transducer for a Computer-Controlled Oil Drilling Rig, Ser. No. 777,677 filed Mar. 15, 1977 in the names of Loren B. Sheldon and James R. Tomashek.

BACKGROUND OF THE INVENTION

1. Field of the Invention

This invention relates to computer-controlled oil drilling rig, or derrick and in particular, to a velocity comparator and direction comparator therefor.

DESCRIPTION OF THE PRIOR ART

The physical structures utilized in the generation of a hydrocarbon producing well are known in the art. For example, drawworks have been long utilized in oil drilling rigs, or derricks, to raise or lower pipe stands and drill string into and out of the bore. Tongs are well known for making and breaking joints between pipe stands and the drill string. U.S. Pat. No. 3,881,375, issued to Robert R. Kelly and assigned to the assignee of the present invention, generally relates to a tongs. Racker arrangements for moving pipe stands from a storage location on a "set back" to an operating location within the derrick are also wellknown. U.S. Pat. No. 3,501,017, issued to Noal E. Johnson et al. and U.S. Pat. No. 3,561,811, issued to John W. Turner, Jr., both relate generally to well pipe rackers and are both assigned to the assignee of the present invention.

Usually each of the broad functions performed by the mentioned structural systems requires the superintendence of many skilled derrick operators. Further, the work is often ineffeciently performed, adding to the overall cost of the well. Yet further, even if the work is periodically efficient, it is difficult to maintain peak operating levels whereby each operation of the associated structures mesh so as to maintain the task of making-up or breaking-out a drill string at a minimum from a time standpoint consistent with safety of the personnel and the bore.

It is therefore advantageous to provide each of those structural systems with an appropriate electronic control system and to utilize a programmed general purpose digital computer to superintend and sequence the proper operation of the physical structures to most efficiently control derrick operations. It is appreciated that the elimination of manual control increases the efficiency and lowers the cost of well drilling operations.

By way of particular examples, in the prior art, the lifting or hoisting of the traveling block and elevator is done by the manual control of the electric motor drive on the derrick. The lowering motion of the traveling block is normally manually controlled by a drum brake. The lowering motion of a loaded traveling block (having a drill string thereon) is done by the manual control of the drum brake and uses an auxiliary brake to absorb the potential energy of the string during lowering. The manual control of these functions may be inefficient during foul weather or otherwise detrimental environments. It would be advantageous to provide an electronic control system in cooperative association with a programmed digital computer to control the lifting and lowering cycles, and specifically the velocity and position of the traveling block and elevator.

The loading on the traveling block and elevator, and specifically the increase in block loading when in the break-out cycle associated by friction in the bore as well as the decrease in block loading in the make-up cycle occassioned by an obstruction in the bore, present problems in the manual control of the derrick. It is therefore advantageous to provide an electronic load sensing arrangement to provide inputs to an electronic drawworks control to adjust the velocity and position of the traveling block in response thereto and to recognize potential dangerous loading conditions on the block.

The tongs are, as is known in the art, a hydraulically powered arrangement capable of making and breaking joints in a drill string. It is advantageous to provide an electronic network controlling the operations of the tongs, and to interconnect that control network with a programmed general purpose digital computer so as to repeatedly and efficiently operate the tongs to perform its function. Of course, since various of the physical structures discussed are actuated by hydraulic or pneumatic operators, suitable electro-hydraulic or electro-pneumatic interfaces must be provided. It is also advantageous to provide a sensor arrangement to locate the backup and power driven tong in vertical symmetry with respect to a horizontal plane passing through the tool joint.

SUMMARY OF THE INVENTION

This invention relates to a computer-controlled oil drilling rig having apparatus for comparing signals representative of the actual velocity and direction of travel of a traveling block with signals representative of predetermined minimum and maximum velocities thereof and a signal representative of a predetermined direction thereof. The velocity signals are derived from a transducer associated with the drawworks, while the position signal is derived from a transducer associated with the traveling block. Output signals are generated if the actual velocity signals are greater than the predetermined maximum velocity or less than the predetermined minimum velocity, and if the block is moving in the wrong direction.

BRIEF DESCRIPTION OF THE DRAWINGS

The invention will be more fully understood from the following detailed description of a preferred embodiment thereof, taken in connection with the accompanying drawings, which form a part of this application, and in which.

DESCRIPTION OF PREFERRED EMBODIMENT

Figure 1:
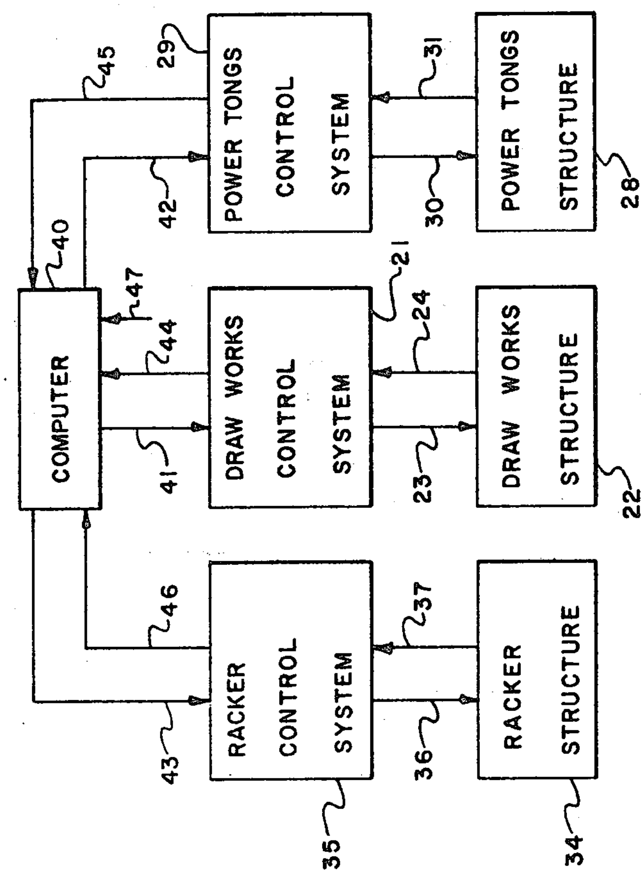
FIG. 1 is a generalized block diagram illustrating the interactions between derrick structure and control systems therefor and a digital computer in accordance with the teachings of this invention.

Throughout the following description, similar reference characters and reference numerals refer to similar elements in all Figures of the drawings.

Referring first to FIG. 1, a generalized block diagram of a computer controlled oil drilling rig, or derrick, embodying the teachings of this invention is illustrated. Generally speaking, the derrick includes three broad structural systems each performing a particular set of functions relating to the drilling of an oil well, and a control system related to each structural system to control the physical actions performed thereby.

The derrick 20 (FIG. 2) includes a drawworks structural system 22 having a drawworks control system 21 associated therewith. The drawworks systems generally provide the hoisting (or lifting) and lowering functions associated with the generation of a well bore. Command signals output from the drawworks control system 21 are input to the structural system 22, as diagrammatically illustrated by a line 23, and initiate or cease the physical actions of elements within the structural system 22. Feedback signals representative of various physical parameters associated with each of the structural elements within the drawworks structural system 22 are input to the control system 21, as illustrated by a line 24.

The derrick also includes a power tongs structural system 28 and a tongs control system 29 associated therewith. The tongs systems generally provide the make-up or break-out of individual pipe stands into or out of a drill string. Command signals initiating or ceasing the physical actions of structural elements of the tongs structural system 28 are input thereto from the tongs control system 29, as illustrated by a line 30. Feedback signals representative of various physical parameters associated with each of the structural elements within the tongs structural system 28 are input to the tongs control system 29 as illustrated by a line 31.

Also provided is a racker structural system 34 which, in general, provides the structure necessary for carrying individual pipe stands from a storage location to a location along the vertical axis of the derrick for make-up or from the location along the vertical axis of the derrick to the storage location during break-out. The storage location is known in the art as the "set back". A racker control system 35 is provided, with control signals being output therefrom to the structural system 34, as illustrated by a line 36. Feedback signals from the structural system 34 are input to the racker control system 35, as illustrated by a line 37. The racker structural system 34 and control system 35 have been disclosed and claimed in the copending application of Loren B. Sheldon, James R. Tomashek, Robert R. Kelly, and James S. Thale, Ser. No. 547,375, filed February 6, 1975, now U.S. Pat. No. 4,042,123 and assigned to the assignee of the present invention.

A general purpose programmable digital computer 40 is interfaced with each of the above-mentioned control systems, as illustrated diagrammatically by a line 41 (to the drawworks control system 21), a line 42 (to the power tongs control system 29) and a line 43 (to the racker control system 35). Each of the control systems feed back various signals to the computer 40, as illustrated by the lines 44, 45, and 46, from the drawworks control system 21, tongs control system 29, and racker control system 35, respectively. Further, the computer 40 receives direct data input of physical parameters, as illustrated as by a line 47.

The computer, in accordance with the programmed instructions, sequentially initiates the operations of various of the structural systems to perform various physical functions within the derrick. To economize operating time and maximize efficiency, control of the systems may be on a time shared basis, as with control of the drawworks and racker systems. Any interactions between the systems, as between drawworks and tongs, are through the computer 40. A listing of th program for the digital computer 40 is appended hereto.

STRUCTURE

Figure 2:
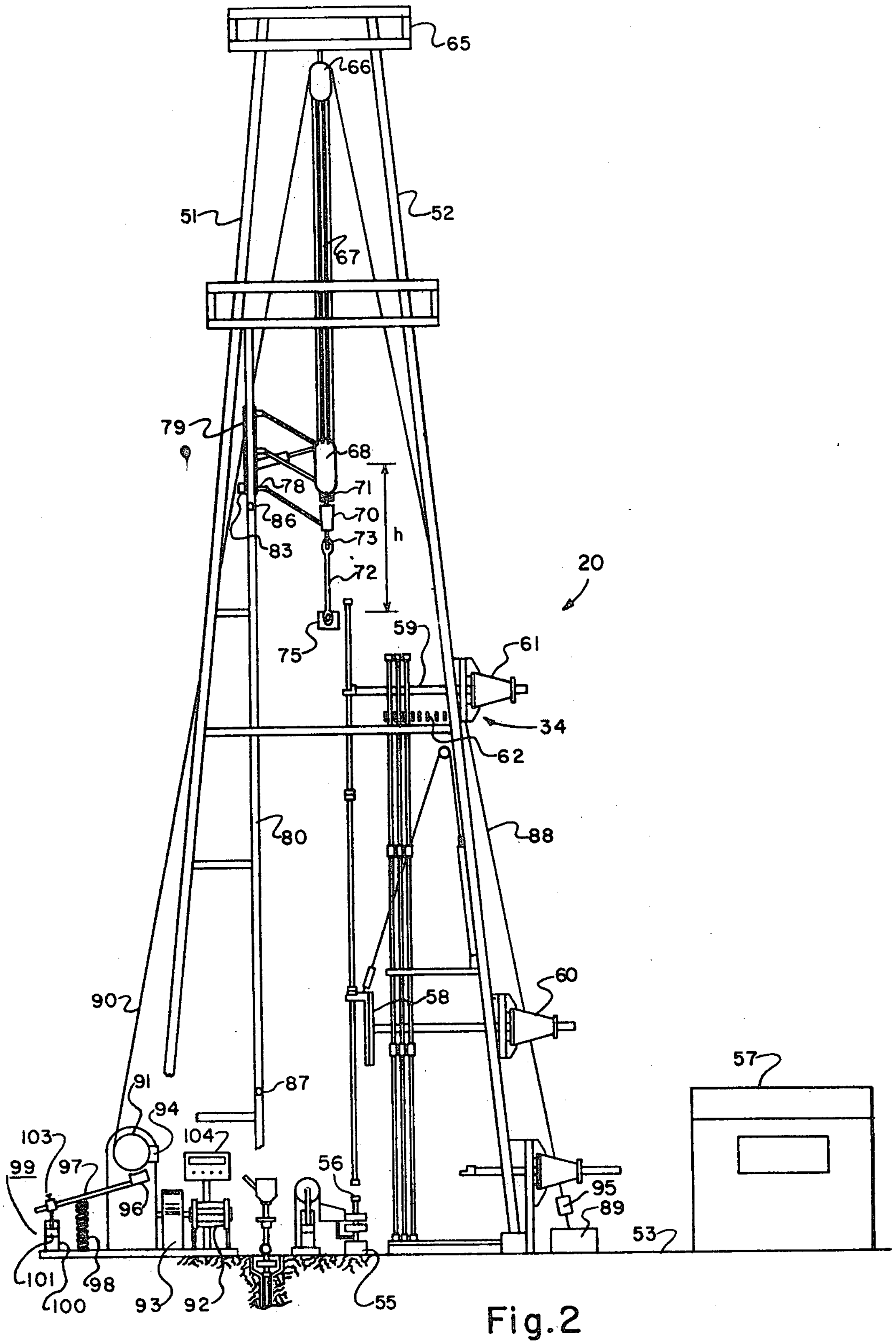
FIG. 2 is an illustration of the structural elements included on an oil derrick, or drilling rig, and the various structural systems disposed thereon.

Referring to FIG. 2, shown is an illustration of the oil drilling rig, or derrick 20 incorporating the basic rig features and having thereon the structural elements which are included in the structural systems outlined in connection with FIG. 1. These structural systems are in cooperative association with their associated control systems to initiate and cease the operation of the physical functions performed by structural systems. The derrick 20 is illustrated in simplified form, with various structural supports, sway bars, and other similar members being omitted for clarity.

The basic derrick structure 20 includes corner posts 51 and 52 extending substantially upwardly from suitable base members. The base members are supported on a drilling floor 53, the drilling floor 53 being mounted on the surface of the earth, on an off-shore drilling platform or on a drill ship. A rotary table is provided in the floor 53 of the derrick and provides the rotational energy whereby a drill string, comprised of end-to-end connected drill pipe stands, may be advanced toward a hydrocarbon producing formation. Slips 55 are shown on the floor 53. When engaged, the slips 55 support the full weight of the drill string depending therebeneath. In FIG. 2, the upper end of the drill string, or more precisely, the upper end of the uppermost pipe stand connected within the drill string, is shown as protruding above the slips 55. Each upper end of the pipe stand has a distended joint 56 used in connection with the tongs operation. The programmable general purpose digital computer 50 may be conveniently housed in a structure 57 on the floor 53.

The axis of the bore being generated beneath the floor 53 of the derrick extends centrally and axially through the derrick. A racker structural system, generally indicated by the reference numeral 34, carries individual pipe stands between a storage location, or "set back", disposed at the side of the derrick and a location along the vertical axis thereof. It is along the vertical axis of the derrick 20 that the drill string is retracted from or lowered into the bore being generated. The racker structure 34 includes a lifting head 58, an upper arm 59 with a latch thereon, carriages 60 and 61 for the head 58 and for the arm 59, respectively, and a racker board 62 for receiving and supporting individual pipe stands. The racker structure and control systems has been disclosed and claimed in the above-referenced copending application Ser. No. 547,375.

The corner posts 51 and 52 are interconnected with and supported by transverse supports at various elevations along the derrick 20. The derrick 20 is capped by a water table 65 which supports the usual crown block 66. Suspended from the crown block 66 by a cable arrangement 67, or reaving, are elements of the drawworks structural system, including a traveling block 68. The traveling block 68 supports a hook structure 70 by interengaged bales 71. Elevator links 72 are suspended from ears 73 on the hook structure 70. The links 72 have an elevator 75 swingably attached at the lower ends thereof. The elevator 75 is offset below the traveling block 68 by a predetermined distance h. The elevator 75 includes a gripping arrangement 76 to grasp or release the distended ends 56 of a pipe stand.

A block retractor arrangement 78 is connected to the traveling block 68 and serves to retract the traveling block (with depending elevator 75) away from the vertical axis of the derrick along which it usually depends. The retractor 78 includes a carriage 79 which is rectilinearly moveable through a wheeled arrangement along a substantially vertically extending retractor guide track 80. A block position and speed transducer (B.P.S.T.) 83 is mounted on the retractor carriage 79 and produces output feedback signals representative of the actual physical position of the traveling block 68 along the track 80. These feedback signals, as will be seen, are provided both to the drawworks control system 21 (FIG. 1) and to the computer 40. The block position transducer 83 also provides a feedback signal representative of the velocity at which the traveling block 68 is moving along the track 80. Of course, it may be readily appreciated that since the elevator 75 is vertically offset by the distance h from the traveling block 68, the position of the traveling block 68 along the track 80 also indicates the position of the elevator 75 withd respect thereto, and vice versa. And, since the traveling block 68 and the elevator 75 are generally extended to move along the vertical axis of the derrick, the position (elevation), and velocity of the traveling block 68 with respect to the vertical axis of the derrick 20 may be accurately monitored by the block position and speed transducer 83. The structure and internal circuitry of the block position and speed transducer 83 are set forth in full herein. For a purpose more fully disclosed herein, upper and lower limit switches 84 and 85 are provided on the carriage 81. An upper target 86 and a lower target 87 are provided at predetermined locations on the retractor guide track 80.

As is the usually practice in the art, the cable arrangement 67 which supports the traveling block 68 and structures (including the elevator 75) depending therefrom are reaved about the block 66. One end 88 of the cable arrangement 67, known as the "dead line" in the art, is anchored to the derrick 20 as illustrated at 89. The second end 90 of the cable arrangement 67, known as the "fast line" is connected to other elements included in the drawworks structural system. More particularly, the fast line 90 is attached to a spool or drum 91 of the drawworks. The drum 91 is driven by an electric motor 92 of any suitable type as diagrammatically illustrated in FIG. 2. For example, a motor manufactured by the Electromotive Division of General Motors, sold under Model No. D79GB and rated at 800 horsepower for drilling is a typical motor for a drawworks structural system. Determination of a motor lies well within the skill of the art. The motor 92 is provided with a motor drive 93, such as a THYRIG manufactured by Baylor Company, although any other motor drive arrangement may be used. The motor 92 may be wound in any predetermined configuration to meet the needs of a particular rig. It is noted, however, that the motor 92 imparts the energy whereby the traveling block 68 and the structures depending therefrom may be moved with respect to the vertical axis of the derrick 20 from a first predetermined to a second predetermined elevation. Therefore, control of the motor drive 93, and in turn, of the motor 92, effectively controls the velocity and acceleration of the traveling block 68 as it is lifted from a first to a second elevation. The drawworks includes a suitable clutch and gear arrangement therein.

A drum tachometer 94 is physically located in adjacency to the spool 91. The output of the drum tachometer 94 is a feedback signal to the drawworks control system 21 representative of the velocity of the spool 88, which signal is directly proportional to the velocity of the traveling block 68 and depending structures. Within the dead line 88 is provided a transducer 95 known as the dead line force sensor (D.L.F.S.). The transducer 95 provides a feedback signal to the drawworks control system 21 related to the physical loading of the structures supported by the cable arrangement 67. Of course, the cable arrangement 67 at all times supports the traveling block 68 and its depending structures. The unloaded, static weight of these structures defines a "tare" weight of the structure supported by the cable arrangement 67. When the elevator 75 acquires a load, the D.L.F.S. 95 appropriately reacts. Similarly when the elevator load is properly relinquished, the sensor 95 responds accordingly. Yet further, during movement of a loaded traveling block 68, frictional or other forces may alter the load carried by the elevator 75. The D.L.F.S. 95 therefore provides an accurate feedback signal as to the instantaneous loading on the elevator 75 of the drawworks structure. As is generally the case with the other transducers, other convenient physical locations therefor may be used to measure the desired parameters. In addition, any appropriate means for measuring the desired parameters may also be utilized, as is appreciated by those skilled in the art.

Also included within the drawworks structural system is a brake. The drawworks brake includes a primary brake the function of which is to control the velocity and deceleration of the drawworks traveling block (when unloaded) and to stop the motion thereof. An auxiliary brake is also provided within the drawworks structural system to substantially absorb the potential energy associated with the lowering of a loaded traveling block. In the particular embodiment of the invention shown in FIG. 2, the primary brake is a drum brake 96, manually operable by a pivotable lever 97. A spring 98 biases the drum brake 96 into its fully asserted position. The lever 97 may be connected to a brake actuator assembly generally indicated by the numeral 99. As seen also in FIG. 7, the brake actuator assembly 99 include a cylinder 100 having a piston 101 therein. The piston 101 is coupled to the lever 97. The brake actuator 99 also includes an electro-to-pneumatic interface 102 (FIG. 7) such that the cylinder 100 may be coupled to a suitable supply of pressurized air or any other fluid. Introduction of the fluid into the cylinder 100 moves the piston 101 therein which moves the lever 97 so as to modulate the force on the brake.

As mentioned above, it is known to those skilled in the art that the secondary brake is provided to absorb the energy when the loaded traveling block is moved downwardly from an upper to a lower elevation. A manually controlled hydromatic brake may be used as an auxiliary brake. However, an electric brake, such as an ELMAGCO brake sold by Baylor Company could typically be used. The brake control subsystem of the drawworks control system 21 can be readily interfaced with an auxiliary brake by those having skill in the art so as to provide the desired velocity and deceleration control. Final position is ultimately controlled by the drum brake 96.

It is important to note that whatever auxiliary brake configuration and actuator therefore is utilized, the drawworks structure includes a brake which is controlled by the drawworks control system 21 so that the desired velocity and acceleration of the traveling block 68 is maintained as it moves from an upper to a lower final positioon. Also, the brake is operable to set and hold position. lifted or hoisted load in the upper position. If the operator deems it necessary to halt the movement of the physical structures associated with the drawworks, the operator may at any time override the electrical signal output from the drawworks control system by actuating a switch 103 mounted on the lever 97. The operator may also, at anytime, override the electrical signal output from the drawworks control system 21 by depressing a push-button switch located in the control panel 104. The spring 98 may be manually overridden to release the brake.

The racker structure 34 is operable to carry a pipe stand from the vertical centerline of the derrick to the set back. In a make-up cycle, the pipe stand to be added is stabbed into the already emplaced and connected stands which comprise the drill string. When joined to the drill string, the racker structure 34 relinquishes the load to the drawworks, which lowers the string into position. In a breakout cycle, the drawworks structure' 22 withdraws the drill string, and, as each pipe stand thereis is disconnected from the string, the racker structure 34 accepts the load from the drawworks and moves the pipe stand to a storage location.

The actual connection and disconnection of pipe stands from the drill string is accomplished by the power tongs structure 28 under the control of the tongs control system 29. Very briefly, the tongs includes a backup, which holds the lower pipe element defining the joint, while a second element of the tongs - the power driven tong - connects or disconnects a pipe stand to the upper pipe element. The tongs also includes a lift to move the associated tongs structure at a predetermined speed to a predetermined operating elevation with respect to the vertical axis of the derrick. The backup and the power driven tong jaws usually circumferentially surround the drill string as it advances in the bore. Put another way, the vertical axis of the derrick usually extends through the openings in the backup and jaws of the tongs to facilitate gripping and disconnection or connection operations. Until needed, the tongs is stored in a lowermost storage position. When it is convenient to do so, the tongs are lifted to a standby position which is proximate to the elevation at which the distended joint 56 of the drill string is raised by the drawworks. To sense the distended joint 56, a joint sensor 1025 (FIGS. 18A and 18B) is provided to contact the exterior of the drill string as the tongs are moved from the standby to the operating position. The movement from the standby to the operating position is at a slower speed, of course, than the speed at which the tongs are moved from the storage position to standby position. The particular joint sensor 1025 embodied by the teachings of this invention is made clearer herein.

The details of the structure of the tongs, the joint sensor and the tongs control system (including an electrohydraulic interface) is discussed in detail herein.

OPERATION

Having defined the elements of the various structural systems, the operating sequence thereof during a typical make-up or break-out cycle is presented, to graphically illustrate the physical interractions between the defined structures. Once this is done, a detailed description of each of the control systems initiating and ceasing the physical operations performed by the structural systems is set forth.

In the break-out cycle, the objective is to disassemble the drill string into its constituent pipe stands as the drill string is lifted from the bore. With the upper end of the still-attached pipe stand to be next-removed held by the slips at a predetermined elevation along the vertical axis of the derrick, the traveling block with the elevator suspended therefrom is lowered under the control of the drawworks portion of the computer program and under the influence of the drawworks brake control subsystem which stops and sets the brake at an elevation so as to permit the elevator to accept the pipe stand. During this period the racker is placing the last-removed pipe stand in a storage location on the set back, and will eventually be moved under control of racker portion of the computer program to a position to accept the next-removed pipe stand. The drawworks program and racker program operate on a time-shared basis. The tongs are in a storage position.

The computer sends an actuating signal to the elevator load control subsystem which derives its input signals from the dead line force sensor. A momentary signal output from the computer samples the weight of the unloaded traveling block and elevator. This tare weight is used, as discussed herein, to ascertain the instantaneous loading on the traveling block and elevator. The elevator then accepts the loading of the drill string, and an output feedback signal to that effect from the elevator load control subsystem is used to coordinate opening of the slips. The computer outputs a momentary load sample signal before the velocity of the loaded elevator is increased. This static or initial load signal when modified by a predetermined fractional multiplier, is used as a basis for determining whether the instantaneous loading on the elevator has exceeded a permissible range of values as selected by an experienced drilling operator.

In response to an actuating signal from the computer, the drawworks motor control subsystem provides a throttle signal to the drawworks motor drive to hoist the drill string to a predetermined elevation. It may be necessary to move the block slightly, or creep to engage the drawworks clutch. The drill string is hoisted under the control of the drawworks motor control subsystem. A logic network operates to release the brake whenever the hoisting velocity exceeds a preset threshold value and tends to apply the brake at hoisting speeds below this threshold velocity (the drum brake being a self-energizing brake).

The motor control subsystem provides output signals to the drawworks motor drive to lift the drill string in a manner which takes into account the position error (the difference between the actual position and command position of the drill string being lifted), a predetermined command velocity output by the computer, and the dynamic loading. During the major portion of the travel the load is hoisted at an uniform velocity equal to the command velocity. As the predetermined command position is approached, the hoisting velocity is reduced in a manner proportional to the position error. Put another way, the drawworks motor control subsystem responds to position and velocity feedback signals input to it from the block position and speed transducer and the drum tachometer, respectively, to move the traveling block and elevator to a predetermined command elevation at a predetermined command velocity output by the computer.

During the hoisting operation, signals from the elevator load control subsystem are taken into consideration in determining the magnitude of the output signal to the drawworks motor. If the actual loading on the elevator exceeds the predetermined value by which actual load may deviate from the static loading, the motor is slowed to bring the loading into the acceptable limits. Of course, if the deviation goes beyond a threshold above the scaled initial value range, indicating that the string is caught in the bore, the automated control shuts the system down and the system reverts to manual control.

As the block is hoisted and approaches the final position, the motor is stopped and the brake is set. The brake is applied when the lifting velocity drops below the predetermined threshold mentioned. The motor is stopped when the position reaches within some predetermined close distance to the command elevation. During lifting, if the block is indicated as moving in the wrong direction of travel or at a greater than commanded velocity, the automated sequence is halted and the system reverts to manual control.

The block final elevation is selected such that the height at which the upper end of the pipe stand to be removed finally stops will also place the joint between the pipe stand and the next lower pipe stand at an elevation for operation by the power tongs. When the block velocity is sufficiently close to zero, a velocity signal is returned to the computer. This signal, along with a block position feedback signal sufficiently close the command position signal are necessary conditions before the actuating command to set the slips to retain the load is output from the computer. Only with the slips set and supporting the full load of the drill string will the elevator relinquish the pipe stand to the racker structure. As mentioned, after racking the previous stand, the racker is moved back toward the vertical centerline of derrick, so as to be in a position to accept the next pipe stand. The elevator and block are retracted away from the vertical centerline of the derrick and drop under the control of the drawworks brake to be in position to repeat the lifting sequence.

When the lifting movement started, the power tongs were in the storage position above the floor of the derrick. After the elevator had been hoisted above a potentially obstructing position the tongs were actuated and moved to a standby position. After the pipe stand has been finally positioned and the slips set, a joint sensor associated with the tongs controls a slower lifting movement to bring the tongs into operating position. When the tongs are positioned properly with respect to the joint, the motion thereof is halted, and the joint sensor retracted. The tong backup then engages the drill string, the tong jaws engage the pipe stand to be removed, and the pipe stand is separated therefrom. The racker then begins to store the now-separated pipe stand, while the tongs are moved to the storage position. The elevator then is brought into the elevation along the central axis of the derrick where it may engage the upper end of the still-attached pipe stand to be next-removed and the breakout process repeated.

In the make-up cycle, the objective is to assemble the drill string from its constituent pipe stands and to lower the string into the bore. With the upper end of the last-connected pipe stand supported at a predetermined elevation by the slips, the drawworks motor control subsystem lifts the block and elevator along the vertical axis of the derrick to a position at which it will receive a pipe stand from the racker.

The tongs are moved upwardly from the storage to the standby position at a first, normal, speed. The tongs continue to move upwardly at a second, slower, speed beyond the standby position with the joint sensor extended. When the joint is sensed, upward motion is halted with the tongs at the operating elevation and the backup is closed. A pipe stabber is extended to guide the lower end of the pipe stand being made up into the threaded connection at the distended upper end of the drill string. When the pipe is stabbed, the tongs proceed to make up the joint. Thereafter, the tongs are lowered to the storage position. The elevator, at the upper elevation, is raised at a creep speed to acquire the drill string load. After the elevator load control subsystem detects that the drill string load is acquired by the elevator, the slips are raised and the drill string is hoisted further to disengage the slips from the drill string. At this time, the rackers, under control of the computer racker program, proceed to acquire the next pipe stand and carry it toward the vertical centerline of the derrick to the racker standby position. From there the rackers proceed to the vertical centerline of the derrick.

In response to command velocity and command position signals output from the computer, and utilizing a position feedback signal from the block position and speed transducer, and a velocity feedback signal from the drawworks drum tachometer, the drawworks brake control subsystem supervises the lowering of the drill string to a predetermined lower elevation. The brake control subsystem outputs control signals to the drawworks brake actuator so as to maintain the block velocity near the command velocity for the major portion of the travel, and to position the block as close as possible to the command position during the final position of the travel.

The elevator load control is activated by the computer and is responsive to a momentary signal to sample to loading of the block and elevator in the unloaded condition. This signal is used to discern whether or not the elevator is supporting any of the drill string load. Also in response to a signal output from the computer, the loading on the elevator is sampled and held after the load is acquired but before the downward velocity thereof is appreciable. This initial static loading signal is used, when appropriately modified by a predetermined factional multiplier, as the basis for determination as to whether or not the instantaneous loading on the elevator has exceeded a permissible range of loading normally anticipated during a lowering operation.

During the lowering operation, the outputs to the brake actuator from the brake control subsystem take into account the signals relative to loading from the elevator load control subsystem. If the actual loading is deviating from the initial static condition by more than the specified amount, the drawworks brake control slows the velocity to bring the loading back to acceptable limits. If the actual loading is deviating by more than a predetermined threshold below the scaled static value (indicating that the bore is obstructed and the drill string unable to penetrate), then the automated control sequence is terminated, reverted to manual control, and the system is shut down. Other interrupt conditions may occur if, during the lowering operation, an indication that excessive speed has been reached, or that the block is moving in a wrong direction of travel.

As the block reaches the command position, the differences in the actual position and velocity from the command position and velocity are such that the brake is set. That is, when the block and elevator come within a predetermined distance of the command position, the brake is set. Zero position error and zero velocity are necessary conditions which must be met before the computer sets the slip. With the slips set, and the weight of the drill string supported thereby, the elevator surrenders the load, and the block and elevator lifted to the upper most position to accept the next-to-be lowered pipe stand. The process is then repeated.

DRAWWORKS CONTROL SYSTEM

The drawworks structural system 22 is the collection of the structural elements on the derrick which perform all of the physical acts associated with the lifting or lowering of the drill string. These structural elements have been detailed in connection with FIG. 2.

Figure 3:
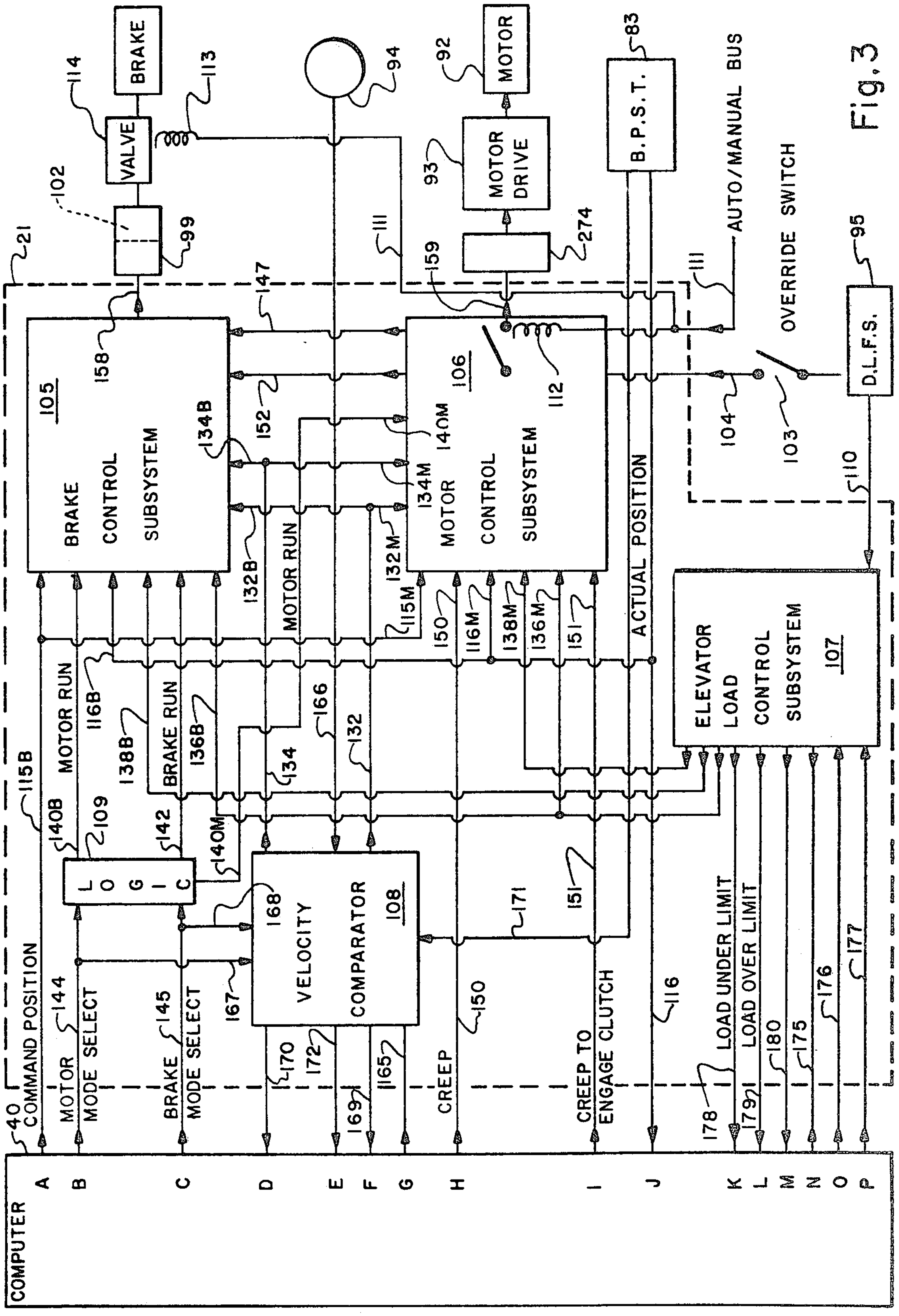
FIG. 3 is a more detailed block diagram of the drawworks control system embodying the teachings of this invention.

The physical actions performed by the drawworks structural systems 22 are controlled by an arrangement known as the drawworks control system, indicated by reference numeral 21 on the general block diagram FIG. 1 and on the more detailed drawworks control system block diagram FIG. 3. The computer is interfaced with the drawworks control system 21 through a plurality of input and output lines, each of which will be discussed herein. Further, the drawworks control system 21 is input with various feedback signals representative of physical quantities associated with the structural system, such as velocity, position, direction, etc. Through the use of the computer commands and the feedback signals, the drawworks control system 21 outputs signals initiating or ceasing the functions performed by certain structural elements. All inputs and outputs of the drawworks control 21 to and from the physical structures with which it is associated will be detailed herein.

The drawworks control system 21 includes several interconnected subsystems, as follows: the drawworks brake control subsystem 105; the drawworks motor control subsystem 106; the drawworks elevator load control subsystem 107; and the drawworks velocity comparator subsystem 108. Further, logic 109 is connected within the drawworks control 21 in cooperative association with the brake control subsystem 105 and the motor control subsystem 106.

Feedback signals to the drawworks control system 21 are provided from the block position and speed transducer (B.P.S.T.) 83, which specifically provides position feedback signals to the brake and motor control subsystem, 105 and 106 respectively. The block position and speed transducer 83 also furnishes a velocity feedback signal to the velocity comparator 108. However, the primary velocity feedback signal to the drawworks control 21 is the signal from the drawworks drum tachometer 94 provided to the velocity comparator 108. The deadline force sensor (D.L.F.S.) 95 provides feedback current signal of 4–20mA to the drawworks control system 21, particularly to the elevator load control subsystem 107 on a line 110. Any of these feedback signals may be conditioned, recorded or otherwise operated upon prior to their input to the control system 21.

One output from the drawworks control system 21, specifically from the brake control subsystem 105, is connected to the brake actuator 99 which is connected to the brake. The brake actuator 99 includes the electronic-to-pneumatic interface 102 (discussed in detail herein) which converts electrical output signals from the brake control subsystem 105 into pneumatic signals compatible with drawworks brake cylinder 100. Another output from the drawworks control system 21 is connected to the motor drive 92 of the drawworks. For convenience of operation, various voltage-to-current (as by the converter 274, for example) and current-to-voltage conversions are effected, with the electronic arrangements for effecting these conversions being detailed herein.

Input to the drawworks control system 21 are signals from various safety overrides present on the physical structure of the drawworks. For example, the STOP control button located on the driller's console is an element of an interlocking circuit. When the STOP button is depressed, it functions to deenergize the AUTO/MANUAL bus. This bus in input to the motor control subsystem 106 by a line 111. The line 111 connects to a relay coil 112 and a solenoid coil 113 of a valve 114. Actuation of the STOP button causes the system to revert from automated to manual control. By deenergizing the relay 112 the throttle signal from the motor control subsystem 106 is disconnected from the motor drive 93, stopping the motor 92. By deenergizing the coil 113 of the valve 114, the actuator pneumatic signal to the cylinder 100 is disconnected and the cylinder 100 is vented to the atmosphere, thus applying a full braking signal.

The electronic arrangement of each of the recited drawworks control subsystems, the operation of each, and the interaction between them are now discussed.

DRAWWORKS BRAKE AND MOTOR CONTROL SUBSYSTEMS

The drawworks brake and motor control subsystems 105 and 106 are now discussed. Both the brake control subsystem 105 and the motor control subsystem 106 receive a 4-20mA analog signal COMMAND POSITION output from channel A of the computer 40. The COMMAND POSITION signal is carried by lines 115B and 115M as inputs to the brake control subsystem 105 and motor control subsystems 106, respectively. The magnitude of the COMMAND POSITION signal is related to the elevation to which it is desired the traveling block 68 to be raised or lowered by the motor 92 or brake under the control of the motor or brake control subsystems. ACTUAL POSITION voltage signals are received from the block position transducer 83 by the brake control subsystem 105 and the motor control subsystems 106, respectively, on lines 116B and 116M. The derivation of the position signal is discussed in connection with the block position transducer 83.

Both the brake control subsystem 105 and the motor control subsystem 106 receive a 0-10v COMMAND VELOCITY signal from the velocity comparator 108 on lines 132B and 132M, respectively. The magnitude of the COMMAND VELOCITY signal is related to the velocity to which it is desired to lift the traveling block 68 to the desired elevation. ACTUAL VELOCITY voltage signals, also from the velocity comparator 108, are input to the brake control subsystem 105 and the motor control subsystem 106 on the lines 134B and 134M, respectively. The magnitude of the ACTUAL VELOCITY signal is functionally related to the speed at which the traveling block 68 is moving under the control of the motor or brake. The origin of these signals will be discussed in connection with the description of the velocity comparator 108.

The brake control subsystem 105 and the motor control subsystem 106 each receive an ACTUAL LOAD voltage signal related to the actual load on the elevator 75 from the elevator load control subsystem 107 on lines 136B and 136M, respectively. Moreover, from the elevator load control subsystem 107, the brake control subsystem 105 receives an appropriately scaled INITIAL LOAD voltage signal on a line 138B while an appropriately scaled INITIAL LOAD voltage signal is input to the motor control subsystem 106 on a line 138M. The derivation of these load signals is discussed in connection with the elevator load control 107.

Although the interaction of the logic 109, the brake control subsystem 105 and the motor control subsystem 106 is set forth in detail herein, for present purposes it should be noted that the logic 109 outputs MOTOR RUN voltage signals to the brake control subsystem 105 and to the motor control subsystem 106 on lines 140B and 140M, respectively. A BRAKE RUN signal on a line 142 is output from the logic 109 to the brake control subsystem 105. The logic 109 receives a MOTOR MODE SELECT command on a line 144 from the computer channel B. The logic 109 receives a BRAKE MODE SELECT command from the channel C on a line 145. As mentioned earlier, the motor control subsystem 106 receives a signal from the override switch 103 on the line 104. As is more clearly shown herein, information concerning a manual override is transmitted from the motor control subsystem 106 to the brake control subsystem 105 on a line 147.

Computer channels H and I respectively output CREEP and CREEP TO ENGAGE CLUTCH to the motor control subsystem 106 on lines 150 and 151. Upon receipt of a CREEP signal on the line 150, the motor control subsystem 106 outputs a signal CREEP FLIP-FLOP to the brake control subsystem 105 on a line 152.

The output signal from the brake control subsystem 105 is carried by a line 158 to the brake actuator 99. The output signal from the motor control subsystem 106 is carried by a line 159 to the motor drive 93 (through a converter 274). In the preferred embodiment of the invention, both of these output signals are 4–20mA current signals. In general, it may be stated that current signals are preferred for carrying information over the longer of the conduction paths used in the preferred embodiment. Current signals provide high noise immunity over long cable runs through electrically noisy environments As alluded to earlier, the AUTO/MANUAL bus is connected to the drawworks control system 21, and in particular, to the motor control subsystem 106 by the line 111. The effect of this signal, as discussed in detail herein, is to isolate the motor and brake control output signals from their associated controlled apparatus. The loss of AUTO/MANUAL bus voltage de-energizes the coils 112 and 113. The effect of de-energizing the coil 112 is to interrupt the motor control output line 159. In the case of the coil 113, de-energization thereof opens a brake solenoid valve 114 to disconnect the brake pneumatic system (FIG. 7) from the cylinder 100.

The brake control sysbystem 105 and the motor control subsystem 106 are basically similar to each other, at least insofar as to the basic operating principles. They can, therefore, be discussed together to illustrate how each of the above-enumerated inputs interact to generate brake or motor control output signals. They differ, of course, in the inplementation thereof due to differences in technical requirements and functions to be performed. Preferred embodiments of each subsystem are discussed herein.

Figure 4:
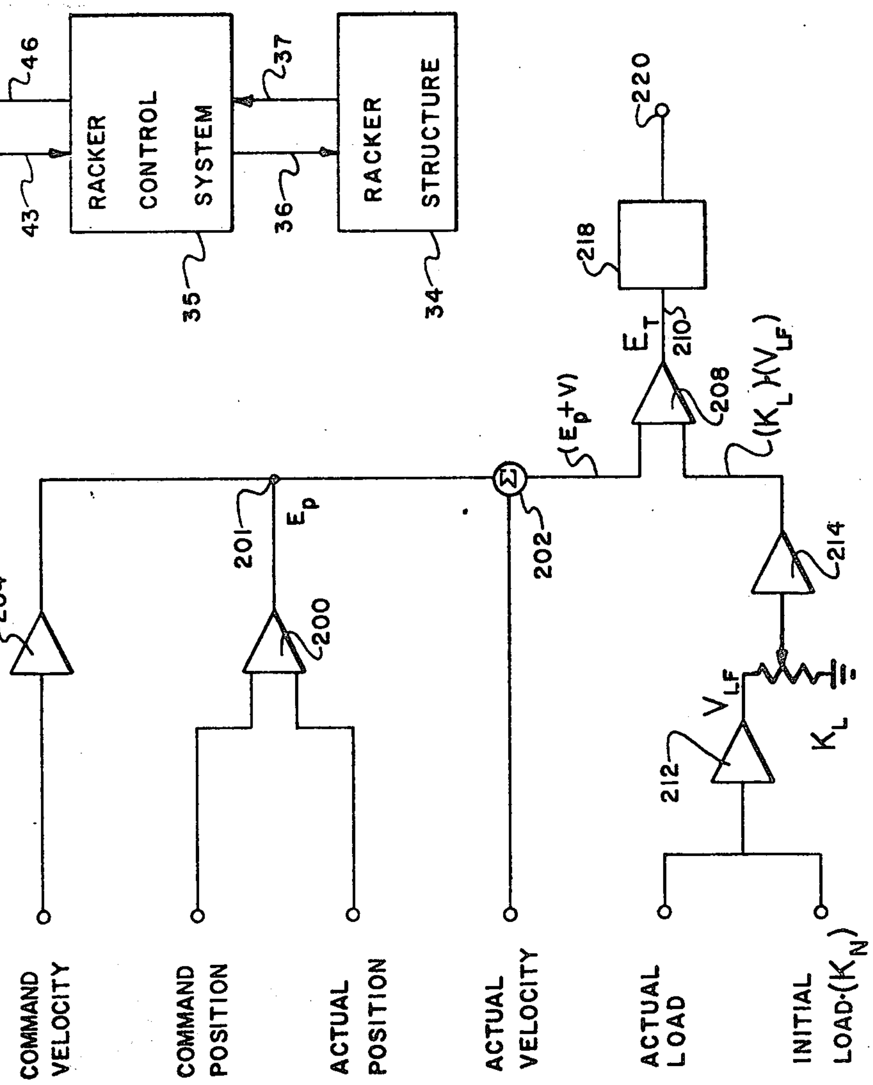
FIG. 4 is a simplified signal diagram illustrating the principles of operation of the motor and brake control subsystems of a drawworks control system embodying the teachings of this invention.

Referring to the simplified block diagram shown in FIG. 4, the six enumerated inputs utilized in generating an output control signal from either the brake or motor control subsystems are: the COMMAND VELOCITY; the COMMAND POSITION; the ACTUAL VELOCITY; the ACTUAL POSITION; the ACTUAL LOAD; and, the initial load signal multiplied by a predetermined constant. (This last-mentioned signal is symbolized hereinafter by INITIAL LOAD.($K_N$), where N = 1 or 2). In both the motor and the brake control subsystems, the first two listed signals are provided by the computer using certain input rig data, operating conditions, etc. The next-three listed signals are instantaneously provided by outputs from the transducers. The last mentioned input signal is an appropriately scaled representation of the initial load on the elevator taken while the elevator is in a relatively static condition. The scaling factor is selected by an experienced driller to define an acceptable range within which the instantaneous actual load may deviate from the static load during displacement of the traveling block. It is noted that the scaling factor K is different for each subsystem.

In operation, as seen in FIG. 4, the analog signal representative of the actual position of the traveling block (ACTUAL POSITION) is subtracted at a different amplifier 200 from the analog signal representative of the predetermined final position selected by the computer (COMMAND POSITION). The resulting difference, or position error signal $E_p$, taken from the output of the differential amplifier at the node 201 is summed at a summing junction 202 with the ACTUAL VELOCITY signal to define a position error plus velocity signal, $E_p+V$. The COMMAND VELOCITY signal is input to an amplifier 204 and a series diode, the combination of which acts as a limiter to limit the magnitude of the position error signal $E_p$ present at the node 201. This effectively results in the magnitude of the COMMAND VELOCITY signal establishing a maximum velocity at which the traveling block is displaced from a first to a second predetermined position. The position error plus velocity signal, $E_P + V$, together with a signal related to a load factor $V_{LF}$, are input to a difference amplifier 208. At the output 210 of the difference amplifier 208 is a total error signal $E_T$, from which the output signal of the motor or brake control subsystem is derived.

The load factor signal $V_{LF}$ is derived from the ACTUAL LOAD and the INITIAL LOAD .($K_N$) signals. These signals are summed algebraically the input to an amplifier 212. If the ACTUAL LOAD signal deviates from the intitial static elevator load by a fraction greater than the appropriately selected scaling constant $K_N$, an output is emitted from the amplifier 212 related to the difference. This output is the load error, or load factor $V_{LF}$. An adjustable portion of the load factor signal (adjustable through the potentiometer $K_L$) is input to an amplifier 214, the output of which is applied as the scaled load factor signal $(K_L)\cdot(V_{LF})$ to the difference amplifier 208. The effect of the load factor signal $V_{LF}$ is to change the total error signal $E_T$ in a direction such as to reduce the drawworks velocity otherwise prevailing. Of course, if the load factor signal $V_{LF}$ is zero (indicating that the actual load on the elevator during the movement has not exceeded the allowed range of deviations from the initial static load) the total error signal $E_T$ is then derived exclusively from the position error plus velocity signal, $E_P+V$.

The total error signal $E_T$, comprised of the above-mentioned input factors, is, in effect, used as an input to a closed-loop servo control system operative to drive the controlled elements, either the drawworks motor or drawworks brake, in a manner so as to change the total error signal in a direction such as to reduce the drawworks velocity otherwise prevailing. In accordance with this invention, the total error signal $E_T$ is applied as the input to an integrator-amplifier network 218. When the total error signal $E_T$ reaches zero, the output 220 of the integrator-amplifier network 218 is constant and uniform drawworks velocity is maintained. The output 220 of the integrator-amplifier network 218 operates to maintain the drawworks motor or brake at the velocity producing the zero total error signal $E_T$.

As may be appreciated, the magnitude of the total error signal $E_T$ determines the rate of change of velocity. The greater the absolute magnitude of $E_T$, the greater is the rate of change of block velocity - effected either by increased driving signals to the drawworks motor or decreased application of the drawworks brake. The smaller the absolute magnitude of $E_T$, the smaller is the rate of change of block velocity - either through decreased driving signals to the drawworks motor or increased application of the drawworks brake. To reiterate, however, the nature of the motor and brake control subsystems is such that the magnitude of the total error signal $E_T$ tends toward zero. As the magnitude of the output of the integrator-amplifier network 218 increases, the motor speeds up (if in motor mode) or the brake goes on (if in brake mode), as explained in connection with FIGS. 5 and 6.

The load factor $V_{LF}$ tends to change the total error $E_T$ so as to reduce the hoisting or lowering velocity. The effect of the load factor $V_{LF}$ is to limit the actual velocity of the traveling block to a value less than the programmed command velocity and a value necessary to maintain the instantaneous elevator load within the range of limits set by the factor $K_N$.

Figure 5:
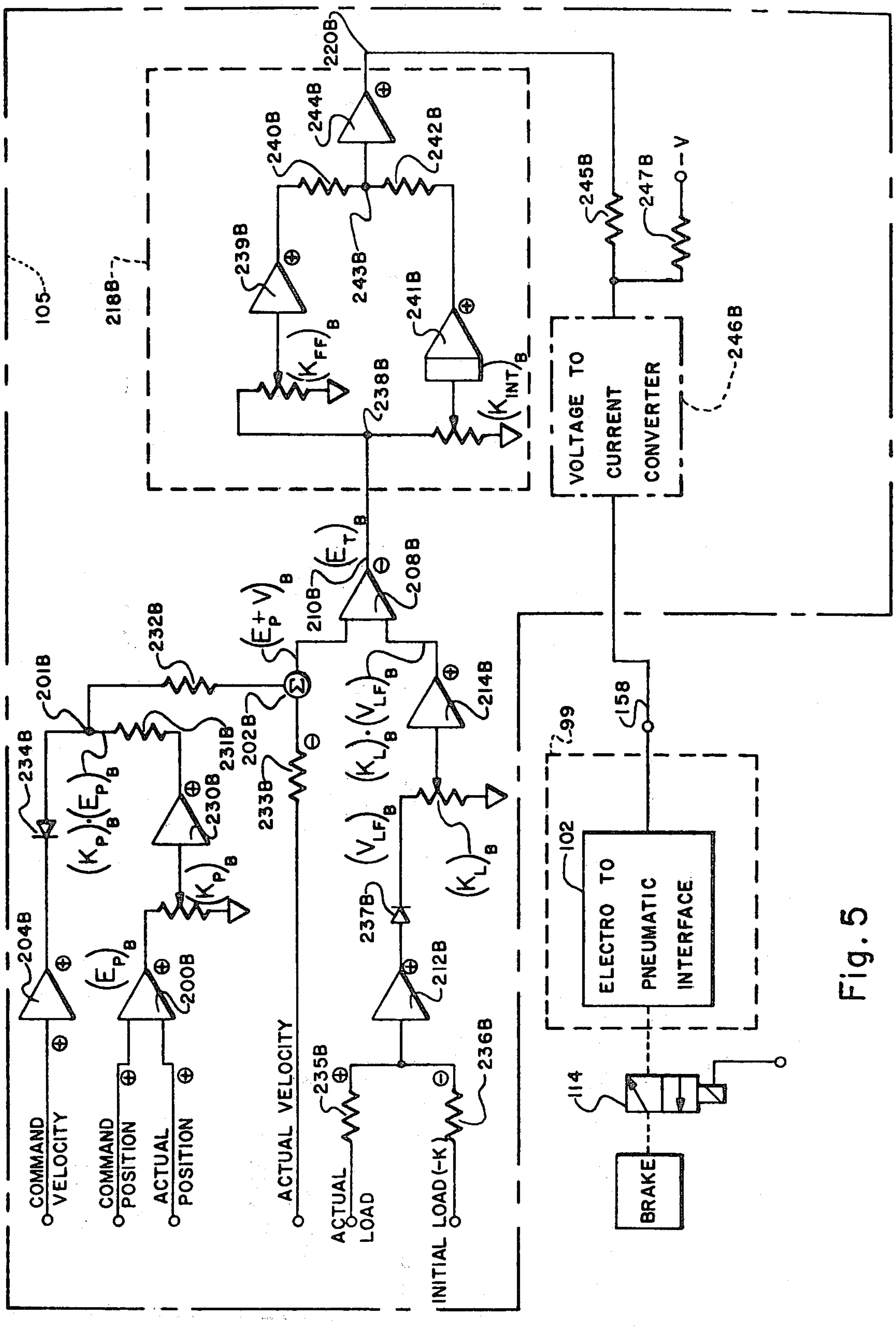
FIGS. 5 and 6 are more detailed signal diagrams based upon the signal diagram of FIG. 4 and specifically relating to a brake control subsystem and to a motor control subsystem, respectively, each embodying the teachings of this invention.
Figure 6:
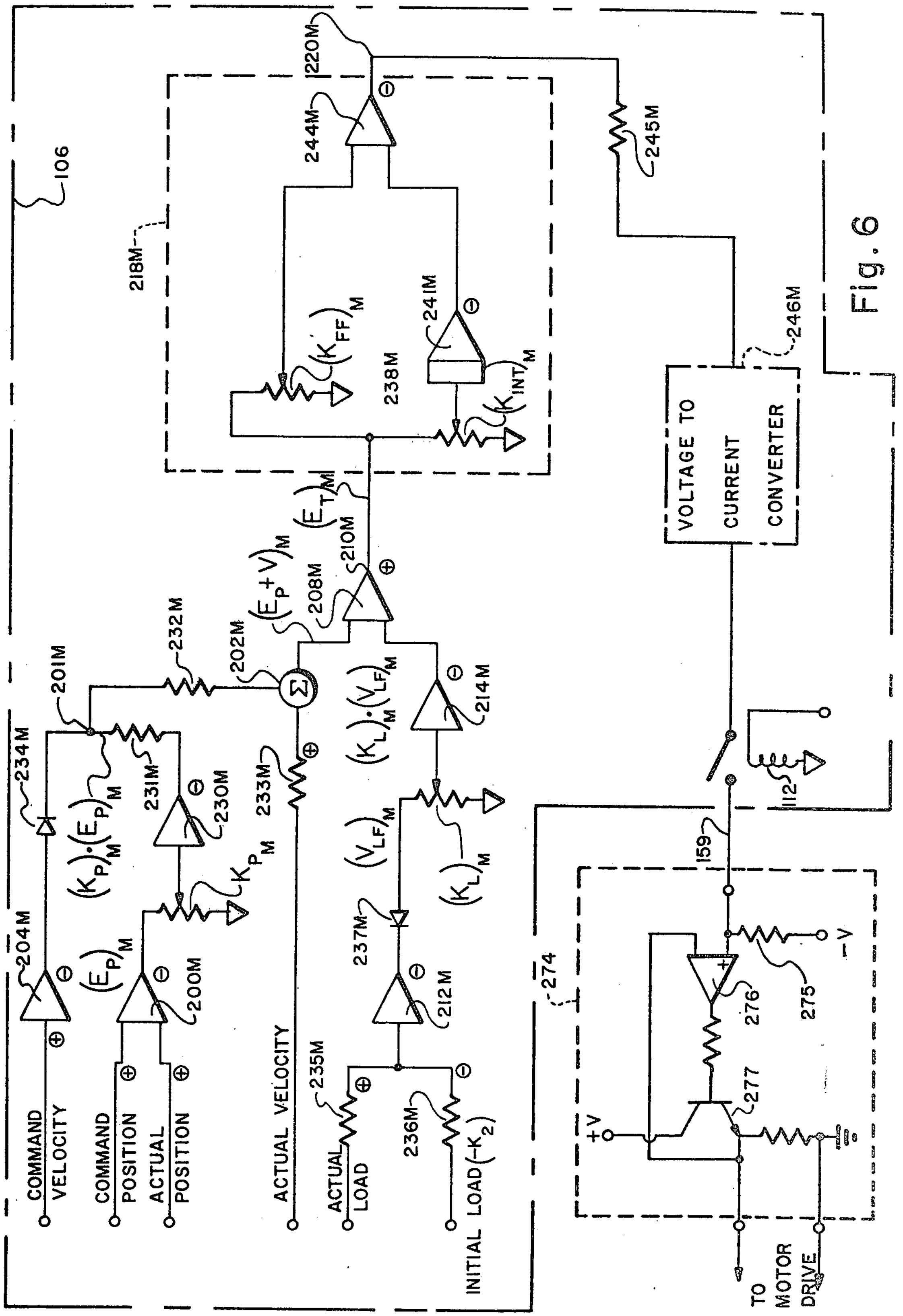

Having described the general operating principles behind the drawworks brake and motor control subsystems, reference is invited to FIGS. 5 and 6, which are simplified signal diagrams patterned upon the signal diagram of FIG. 4 and which are directed toward the brake control subsystem 105 and the motor control subsystem 106, respectively. FIGS. 5 and 6 elaborate more fully upon an operative embodiment of both the brake and motor control subsystems. In the Figures, the prevailing polarity at the designated circuit points are indicated by reference symbols comprising circled positive or circled negative signs.

In both FIG. 5 (brake) and FIG. 6 (motor), those inputs recited in connection with FIG. 4 are, of course, utilized, and need not be summarized again. In FIG. 5, the position signals are input to the terminals of the differential amplifier 200B, as shown. The position error signal $(E_P)_B$ is adjustable through a potentiometer $(K_p)_B$ and amplified by an amplifier 230B having a resistor 231B at its output. At the node 201B, the readjusted portion of the position error signal $(K_P)_B\cdot(E_P)_B$ from the output of the amplifier 230B is connected to the summing junction 202B through a resistor 232B. The ACTUAL VELOCITY signal is connected through a resistor 233B to the junction 202B.

The magnitude of the adjusted position error signal $(E_P)_B\cdot(K_P)_B$ at the node 201B is limited by the magnitude of the COMMAND VELOCITY signal taken through the amplifier 204B and the diode 234B. In effect, the magnitude of the voltage at the node 201B is equal to the output of the amplifier 200B (adjusted by $(K_P)_B$) as long as the adjusted position error is less than the magnitude of the COMMAND VELOCITY. If the magnitude of the position error exceeds the magnitude of the COMMAND VELOCITY signal, it is limited thereby and the COMMAND VELOCITY signal is summed at the junction 202B. In this manner a maximum velocity for the lowering motion of the block is programmed by the computer. The composite position error plus velocity signal $(E_p+V)_B$ (appropriately limited by the COMMAND VELOCITY if necessary) is applied to the inverting input of the difference amplifier 208B.

The non-inverting input to the difference amplifier 208B is presented with a signal related to the load factor signal $(V_{LF})_B$ derived from the load signals input to the brake control subsystem 105. Note that the INITIAL LOAD signal input is scaled by a factor $(-K_1)$, chosen by a skilled well operator for reasons discussed in connection with the elevator load control subsystem 107. The load signals are connected through resistors 235B and 236B and algebraically summed at the amplifier 212B. The output of the amplifier 212B is the basic load factor signal $(V_{LF})_B$ indicative of the magnitude by which the actual load differs from a predetermined fraction $K_1$ of the initial static load. This load factor signal is connected through a diode 237B to the potentiometer $(K_L)_B$. The amplifier 214B is connected to the potentiometer $(K_L)_B$, with the amplifier output being connected to the difference amplifier 208B. The voltage value input to the difference amplifier 208B is, of course, equal to zero or to the value $(K_L)_B \cdot (V_{LF})_B$. A zero output signal is present at the amplifier 214 output as long as the ACTUAL LOAD signal is greater than or equal to the absolute value of the product of INITIAL LOAD$\cdot(-K_1)$. However, if the ACTUAL LOAD signal is less than the absolute value of the quantity defined, an output signal equal to the magnitude by which the ACTUAL LOAD is exceeded is applied ot the potentiometer $(K_L)_B$. This is the basic load factor signal $(V_{LF})_B$ applied for scaling by the potentiometer $(K_L)_B$.

The total error signal $(E_T)_B$ at the output 210B of the difference amplifier 208B is applied to the integrator-amplifier network 218B. The magnitude of the output of the integrator-amplifier 218B on the line 220 determines the velocity at which the block is moved downwardly. In general, the larger the signal on the line 220, the smaller is the block velocity. The net braking effort is proportional to the output signal from the integrator-amplifier 218B. That is, the smaller the signal on the line 220, the less the brake is applied, and the faster the block moves downwardly. The effect of a load factor signal, if one is present, is to reduce the velocity of the block. Thus, the block is limited in its velocity to the lower of the maximum COMMAND VELOCITY programmed into the computer (which limits the signal at the node 202B) or the velocity level required to maintain the elevator load at the predetermined factor $K_1$ of the initial value.

In the drawworks brake control subsystem the integrator-amplifier network 218B comprises two parallel conduction paths. The total error signal $(E_T)_B$ is split at a node 238B, with an adjustable portion thereof taken by a potentiometer $(K_{FF})_B$ and input to an amplifier 239B connected to a resistor 240B. This path improves the overall dynamic response of the network 218B to step-changes in the total error signal. The other parallel branch includes a potentiometer $(K_{INT})_B$ which presents an adjustable portion of the error signal $(E_T)_B$ to an integrating amplifier 241B. The output of the integrating amplifier 241B is connected to a resistor 242B and summed at a junction 243B. The signal at the junction 243B is input to an amplifier 244B.

The brake control subsystem output signal at 220B is carried by a resistor 245B to a voltage-to-current converter 246B. This network converts the signal output to a current for reasons discussed. A negative reference voltage is applied to the current-to-voltage converter 246B through a resistor 247B. The reference voltage is summed with the brake signal on the line 220B. The difference signal (since the polarities are opposite) is converted to a 20–4mA current signal and is presented on the line 158 to the brake actuator 99, which includes an electronic-to-pneumatic interface 102 described in full detail hereafter. Connected within the brake actuator 99 is the brake solenoid valve 114 (FIG. 3).

Figure 7:
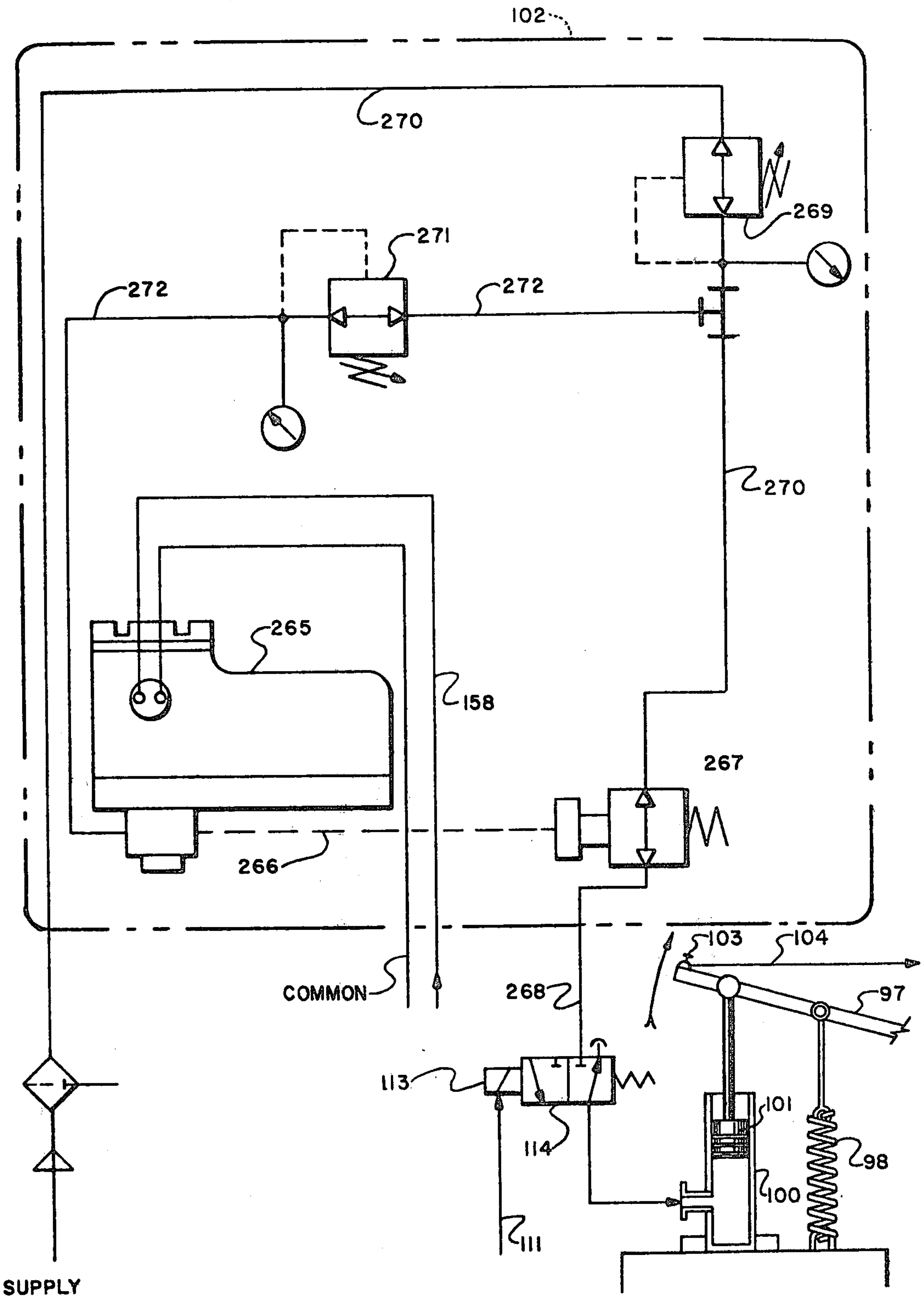
FIG. 7 is a schematic diagram of the electronic-to-pneumatic interface associated with the drawworks brake actuator.

The electronic-to-pneumatic interface 102 associated with the brake actuator 99 is illustrated schematically in FIG. 7. As discussed previously, movement of the actuator lever 97 against the bias of the spring 98 moves the brake (FIG. 2) toward the release position. The lever 97 is physically connected to the piston cylinder arrangement such that the introduction of a pressurized fluid into the cylinder 100 moves the piston 101 and the lever 97 attached thereto so as to disengage the brake. It is apparent that the force applied to the brake lever 97 by the piston 101 is proportional to pressure of the fluid in the cylinder 100. As discussed immediately above, the output of the voltage-to-current converter 246B is a current signal the magnitude of which determines the degree to which the brake is applied. The output line 158, (together with a common line) is connected to a current-to-pressure transducer 265. Of course, the output signal on the line 158 may be operated upon by any suitable signal conditioners, ramp or delay circuits or the like, in a manner known to those skilled in the art.

Dependent upon the magnitude of the input current signal, the transducer 265 outputs a three-to-fifteeen p.s.i. air signal on a line 266 connected to a high-volume three-to-one booster relay 267. The output of the booster relay 267 is applied through a line 268 to the brake air cylinder 100. The output of the relay 267 is limited by a regulator 269 disposed in a line 270 from the supply to the relay 267. Similarly, the output of the transducer 265 is held within predetermined limits by a regulator 271 disposed within a line 272 connecting the downstream side of the regulator 269 to the transducer 265.

Disposed downstream of the booster relay 267 in the line 268 is the brake solenoid valve 114. In the event of an interrupt, or any other condition resulting in the deenergization of the AUTO/MANUAL bus, the valve 114 disconnects the booster 267 from the cylinder 100 and vents the cylinder 100 to atmosphere, thus applying full braking effort. In connection with the FIG. 7, it is noted that the operator may manually override the brake control subsystem by applying a physically superior force on the lever 97 in opposition to the force of the fluid within the cylinder 100. An electrical override signal applied to the line 104 by actuating of the switch 103 would be a preferred means of overriding the brake (FIG. 3). The effect of such an override signal on the motor and brake subsystems is discussed herein. Similarly, the brake may be released by manually applying a force to overcome the force of the spring 98.

Shown in FIG. 6 is a simplified signal diagram for the motor control subsystem 106. The operation of the motor control subsystem 106 is very similar to that discussed in connection with the brake control subsystem 105. The position error signal $(E_P)_M$ at the output of the differential amplifier 200M (derived from the difference between the COMMAND POSITION and ACTUAL POSITION signals) is adjustable through a potentiometer $(K_P)_M$ and applied by the amplifier 230M having a resistor 231M tied to the output thereof. The adjusted portion of the position error signal $(K_P)_M \cdot (E_P)_M$ at the output of the amplifier 230M is connected to the summing junction 202M through a resistor 232M. The ACTUAL VELOCITY signal is connected to the summing junction 202M through a resistor 233M.

The magnitude of the adjusted position error signal $(E_P)_M$ at the node 201M is limited by the magnitude of the COMMAND VELOCITY signal taken through the amplifier 204M and the diode 234M. The magnitude of the voltage at the node 201M is equal to the output of the differential amplifier 200M (adjusted by $(K_P)_M$) as long as the adjusted position error is less than the magnitude of the COMMAND VELOCITY signal. If the magnitude of the position error exceeds the magnitude of the COMMAND VELOCITY signal, it is limited thereby and the COMMAND VELOCITY signal is summed at the summing junction 202M. The effect of the above-described arrangement is to effectively limit the maximum velocity of the block while it is being hoisted. This maximum velocity is programmable into the computer and protects the bore from the detrimental effects of swabbing. The appropriately limited (if necessary) composite position error plus velocity signal $(E_P+V)_M$ is presented to the inverting input of the difference amplifier 208M.

To the non-inverting input of the difference amplifier 208M is applied a signal related to the load factor signal $(F_{LF})_M$, derived from the load signals input to the motor control subsystem 106, including the ACTUAL LOAD and the INITIAL LOAD scaled by the appropriate factor $(-K_2)$. The load signals are algebraically summed at the input of the amplifier 212M. The output of the amplifier 212M is the basic load factor signal $(V_{LF})_M$. It represents the difference between the ACTUAL LOAD and the INITIAL LOAD multiplied by a factor $(K_2)$. The load factor signal is connected through a diode 237M to the potentiometer $(K_L)_M$. The output of the potentiometer $(K_L)_M$ is applied through the amplifier 214M to the difference amplifier 208M. The voltage applied to the difference amplifier 208M is equal either to zero or the adjusted load factor $(K_L)_M \cdot (V_{LF})_M$. A zero signal is present at the output of the amplifier 214M as long as the ACTUAL LOAD signal is less than or equal to the absolute value of the INITIAL LOAD signal scaled by a factor $K_2$. Thus, the actual load may range as high as (INITIAL LOAD)$\cdot(K_2)$ without causing a load factor output. However, if the ACTUAL LOAD increases beyond the INITIAL LOAD multiplied by a factor $K_2$, an output signal equal to the difference between the ACTUAL LOAD and the scaled INITIAL LOAD is applied to the potentiometer $(K_L)_M$. This load factor output is suitably scaled by the potentiometer $(K_L)_M$.

The total error signal $(E_T)_M$ is applied to the integrator-amplifier network 218M. The magnitude of the output of the integrator-amplifier network 218M on the line 220 determines the velocity at which the block is moved upwardly. In general, the larger the signal on the line 220, the greater is the block velocity and the larger the total error signal $(E_T)_M$, the greater is the rate of change of velocity. That is, the greater the total error signal $(E_T)_M$, the larger the driving current input to the motor, and the faster the block moves upwardly. The load factor signal, if present, changes the total error signal so as to reduce the velocity of the block. The maximum lifting velocity attainable is that predetermined by the computer program. The dynamic loading on the block is limited by controlling the velocity at which the block is lifted. This prevents excessive damage to the bore during hoisting by excessive hydrostatic forces caused by excessive hoisting velocity.

As in the brake control subsystem, the integrator-amplifier network 218M in the motor control subsystem 106 includes first and second parallel paths. The total error signal $(E_T)_M$ is split at the node 238M, with an adjustable portion thereof taken by a potentiometer $(K_{FF})_M$ and to the inverting input of the amplifier 244M. This path improves the overall dynamic response of the integrator-amplifier 218M to step-changes in the total error signal. The other parallel branch includes a potentiometer $(K_{INT})_M$ which takes an adjustable portion of the total error signal and inputs that signal to the integrating amplifier 241. The output of the integrating amplifier 241M is presented to the non-inverting input of the amplifier 244M.

The output 220M of the integrator-amplifier network 218M is applied to a voltage-to-current converter 246M through a resistor 245M. A 4–20MA current signal proportional to the voltage output of the integrator-amplifier network 218M is connected by the line 159 to the motor drive 93, which drive 93 includes a suitable current-to-voltage converter 274 discussed herein. Within the motor control subsystem 106 is the solenoid relay 112, operable to interrupt the current flow from the converter 246M to the current-to-voltage converter 274. The output of the converter 274 is connected to the motor drive 93.

Within current-to-voltage converter 274, the current signal output on the output line 159 of the motor control subsystem 106 is applied to a resistor 275 connected at its opposite end to a negative potential. The negative potential may be supplied by a reference amplifier network, including a feedback path around a transistor, in a manner known to those skilled in the art. The voltage present across the resistor 275 is applied to the non-inverting input of an amplifier 276 driving a transistor 277 to define a unity gain voltage follower. The output voltage signal taken at the emitter of the transistor 277 is connected to the motor drive 93 to drive the drawworks motor 92 at a speed related to the output of the integrator-amplifier network 218M.

Detailed descriptions of the brake control subsystem 105, the motor control subsystem 106 and the logic 109 are new set forth.

BRAKE CONTROL SUBSYSTEM SCHEMATIC

Referring to FIG. 8, the detailed description of the brake control subsystem 105 is shown. The COMMAND POSITION signal is input on the line 115B (FIG. 3) and connected through a resistor 284 to the inverting input of the differential amplifier 200B. The ACTUAL POSITION signal is input on the line 116B and is presented to the non-inverting input of the differential amplifier 200B through the resistor 285. The non-inverting input is connected through a resistor 286 to ground potential. Both the ACTUAL and COMMAND POSITION signals are current signals. They are each converted to an appropriate voltage for application to the differential amplifier 200B by the resistor arrangement of 287, 288, 289 and 290 connected, as shown, in pairs between the position input signals and a negative potential. The output of the differential amplifier 200B is fed back to the inverting input through a resistor 291. This resistor, in combination with the resistor 284, determines the amplifier gain. A capacitor 292 reduces the amplifier's high-frequency response. The output is also taken by a line 293 to the non-inverting input of a final position comparator 294, discussed in more detail herein. The output of the differential amplifier 200B is connected to the potentiometer $(K_P)_B$. An adjustable portion of the position error signal is presented through a resistor 295 to the non-inverting input of the amplifier 230B. The inverting input of the amplifier 230 is connected through a resistor 296 to the wiper of a potentiometer 297, the high end of which is tied to a negative potential through a resistor 298. The purpose of the potentiometer 297 is to set a minimum velocity. The output of the amplifier 230B is fed back through a resistor 299 to the inverting input thereof. This, in combination with the resistor 296, determines the amplifier gain. The output of the amplifier 230B is tied through the resistor 231B to the node 201B which is also connected to the output of the amplifier 204B through the diode 234. The COMMAND VELOCITY signal is input from the line 132B to the non-inverting input of the amplifier 204B through the resistor 300. The inverting input is connected to the output through the resistor 301 and the diode 234B. The effectively fixes the amplifier gain at unity. Since the output is taken at the junction of the resistor and the diode, the effects of diode voltage drop are eliminated. The limiting effect of the diode 234B in combination with the amplifier 204B on the potential at the node 201B has been previously discussed.

The signal at node 201B is connected to the summing junction 202B through the resistor 232B. At the summing junction the composite position error plus velocity signal is formed, as discussed, by the summation of the adjusted position error signal with a signal representative of the ACTUAL VELOCITY taken from the input line 134B through the resistor 233B. The velocity signal may be derived from the drum tachometer 94, or, alternatively, from the block position transducer 83. The ACTUAL VELOCITY signal is applied to the inverting input of a comparator 302 by a line 356, as discussed herein. The signal at the summing junction 202B is presented to the inverting input of the difference amplifier 208B. The non-inverting input is connected to ground through a resistor 303. As discussed, however, the non-inverting input of the difference amplifier 208B is also presented with an adjusted portion of a load factor signal.

ACTUAL LOAD signals are input on the line 136B and the appropriately scaled (INITIAL LOAD)·($K_1$) signal is input on the line 138B. These are summed at the inverting input of the amplifier 212B through the resistors 235B and 236B, respectively. The non-inverting input of the amplifier 212B is connected to ground potential through a resistor 304. The output of the amplifier 212B is fed back to the inverting input through a loop including the diode 305 and the resistor 306. The output of amplifier 212B is connected through the diode 237B to the potentiometer $(K_L)_B$. The cathode of the diode 237B is connected with the inverting input of the amplifier 212B through a resistor 307. The wiper of the potentiometer is connected through a resistor 308 to the non-inverting input of the amplifier 214B. The inverting input is connected to ground potential through a resistor 309. The output of the amplifier 214B is fed back to the inverting input thereof through the resistor 310 and is also connected to the non-inverting input of the difference amplifier 208B through a resistor 310A.

The output of the difference amplifier 208B is connected to the integrator-amplifier network 218B. The output is also fed back to the inverting input through the resistor 311. The integrator-amplifier network 218B takes the output of the difference amplifier 208B from the node 238B (FIG. 8B) along parallel conduction paths. Once such path includes the potentiometer $(K_{FF})_B$, the wiper of which is connected to the inverting input of the amplifier 239B through a resistor 312. The non-inverting input is tied to ground potential through a resistor 313. The output of the amplifier 239B is fed back through a resistor 314 to the inverting input thereof and is also connected to the node 243B through the resistor 242B. The second parallel path includes the potentiometer $(K_{INT})_B$, the wiper of which is connected through a resistor 315 to the inverting input of the integrating amplifier 241B. The non-inverting input of the amplifier 241B is tied to ground potential through a resistor 316. The offset of the integrating amplifier 241B is set to zero by a potentiometer 317. The output of the integrating amplifier 241B is fed back through a capacitive network 318 to the inverting input thereof. The output is also connected to the node 243B through the resistor 240B. The signals at the node 243B are applied to the inverting input of the amplifier 244B. The non-inverting input is tied to ground potential through a resistor 319. The output of the amplifier 244B is fed back to the inverting input through a resistor 320.

The output 220B of the integrator-amplifier network 218B is connected through a potentiometer 321 and the resistor 245B to the inverting input of an amplifier 322. This input signal is summed with a reference signal developed across the zener diode 331 and is applied through the combination of resistors 329 and 333 and a potentiometer 330. The network including amplifiers 322 and 324 forms a voltage-to-current converter. The output of the amplifier 322 drives the NPN-type transistor 324 connected as an emitter follower. The collector of the transistor 324 is tied to a positive potential. The signal at the emitter of the transistor 324 is fed back to the inverting input of the amplifier 322 through a resistor network 325. These resistors, in combination with the resistor 245B and the potentiometer 321 establish the conversion gain of the network 246B. The output of the brake control subsystem 105 is taken from the emitter of the transistor 324 at the junction of the resistors 326 and 327 and is carried by the output line 158. The emitter of the transistor 324 is connected to the ungrounded side of the resistor 323 through the series connection of the resistors 326 and 327 and a potentiometer 328. This combination of resistors makes the output on the line 158 a constant current source. The potentiometer is adjusted to make the output current independent of load resistance.

The inverting input of the amplifier 322 is connected through the resistor 329 and the potentiometer 330 to the anode of the zener diode 331. The anode of the diode 331 is also tied to a negative potential through the resistor 247B. The resistor 333 shunts the resistor 329. This network acts to set an initial signal output in the line 158.

A brake control override 334 is operative in response to a BRAKE RUN signal from the logic 109 on the line 142 or in response to an override signal from the motor control subsystem 106 on the line 147 to impose a suitable voltage on the inverting inputs of the amplifiers 239B and 241B so that the brake is asserted regardless of the total error signal present at the output of the difference amplifier 208B. The line 142 BRAKE RUN from the logic 109 is connected through a diode 335 and a node 336 to switches 337 and 338. The override line 147 from the motor control sybsystem 106 is connected to the node 336 through a diode 339. Both of the switches are connected at one side to a positive potential and at the other sides, through resistors 340 and 341, respectively, to the inverting inputs of the amplifiers 239B and 241B. When energized, the positive potentials are presented to the amplifiers such that the brake is imposed - i.e. the brake is applied - regardless of the magnitude of the total error output signal from the difference amplifier 208B.

Another override circuit of a sort is provided at 342. This network response to a MOTOR RUN signal from the logic 109 on the line 140B to release the brake despite the signal input to the amplifier 244B. The logic 109, in general, outputs a MOTOR RUN signal when in receipt of a MOTOR MODE SELECT signal, as is discussed fully herein. The line 140B is connected to a switch 343. The switch 343 is connected at one side to a positive potential and at the other side through a resistor 344 to the inverting input of the amplifier 244B. When the switch 343 is energized the positive potential is applied to the inverting input of the amplifier 244B. This has the effect of maintaining the output of the amplifier 244B at zero volts. A 20mA output signal from the converter 246B to the output line 158 due to the reference signal input is effective to fully release the brake. The zener diode 345 prevents the output of the amplifier from going negative and limits the positive output of the amplifier 244B to the zener voltage. The application of the MOTOR RUN output on the line 140B from the logic 109 is discussed herein.

Figure 8A:
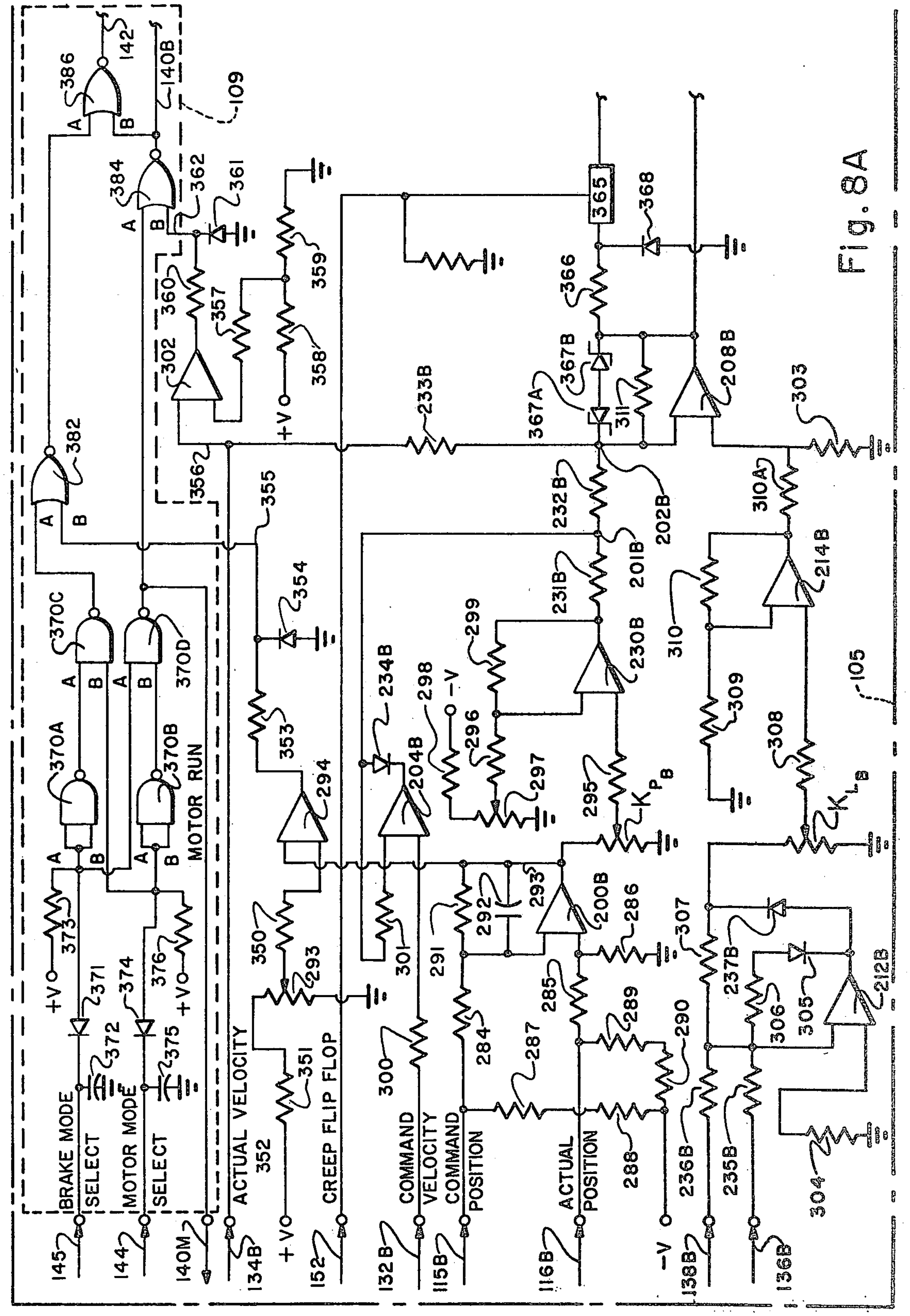
FIGS. 8A and 8B are detailed schematic diagrams of the brake control subsystem shown in the block diagram FIG. 3.
Figure 8B:
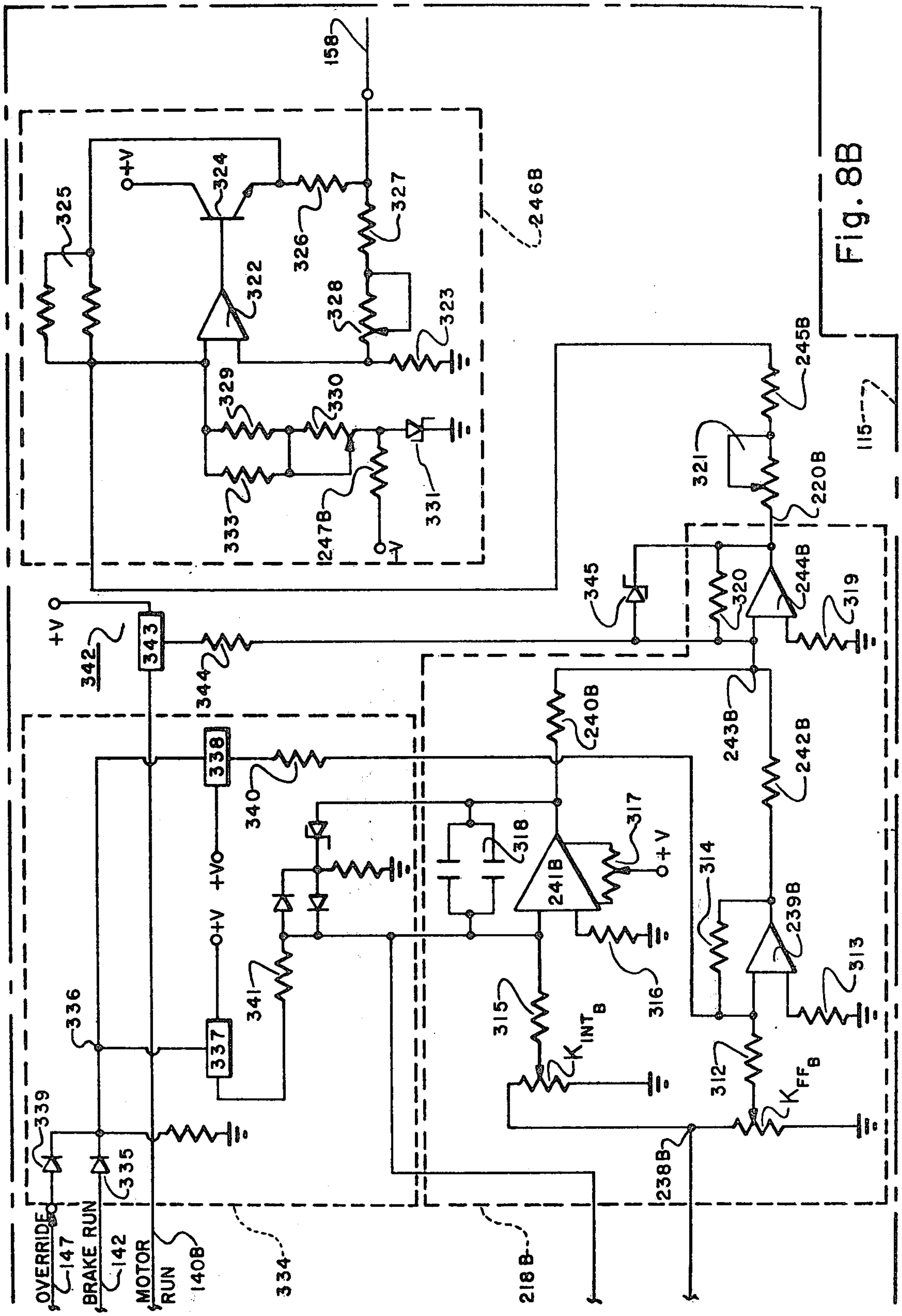

Various other components illustrated in FIG. 8A, but not as yet discussed, are now set forth for future reference. The position error signal from the differential amplifier 200B on the line 293 is applied to the inverting input of the position comparator 294. A signal derived from a final position potentiometer 351 connected to a positive potential through a resistor 352 is applied through a resistor 350 to the non-inverting input of the comparator 294. The potentiometer 351 sets a predetermined voltage signal so that when the position of the block is within a predetermined close distance of the command position, the comparator 294 output signal connected through a resistor 353 and a diode 354 switches from a logic 0 to a logic 1. This signal is carried by a line 355 into the logic 109.

Similarly, the brake release comparator 302 derives its inverting input fom the ACTUAL POSITION signal on the line 356. The non-inverting input is connected through a resistor 357 to a point between resistors 358 and 359 connected in series between a positive potential and ground. The comparator 302 is connected through a resistor 360 and a diode 361 and carried by a line 362 to the logic 109. This establishes a switching threshold voltage for the comparator 302, and thus a threshold velocity. During the motor mode, the ACTUAL VELOCITY is positive. During the motor mode, when the velocity exceeds the threshold velocity, the comparator switches so that the line 362 switches from a logic 1 to a logic 0. The function of this network is to "release" the brake above some threshold velocity. Note that the line 355 and the line 362 have been omitted from FIG. 3 for clarity.

The CREEP FLIP-FLOP line 152 output from the motor control subsystem 106 (FIG. 3) is input to the brake control subsystem 105 and to a switch 365 thereof. The switch 365 is connected between the inverting inputs of the integrating amplifier 241B (FIG. 8B) and the difference amplifier 208B output, and in series with a resistor 366 (FIG. 8A). A junction diode 368 is connected between the junction of the switch 365 and the resistor 366 and ground. This network is provided so that when a signal is present on the line 152 the integrator gain is effectively increased so that the integrator-amplifier 218B responds more rapidly to the small creep velocity signal.

LOGIC OPERATION

The logic 109 includes input lines 144 (MOTOR MODE SELECT) and 145 (BRAKE MODE SELECT) from the computer channels B and C respectively (FIG. 3). Output lines 140B (MOTOR RUN) and 142 (BRAKE RUN) from the logic 109 are connected to the overrides 334 and 342 (FIG. 8B) within the brake control subsystem 105 as discussed above. The output line 140M (MOTOR RUN) (FIGS. 3 and 8A) from the logic 109 is input to the motor control subsystem 106. The logic 109 includes cross-coupled NAND gates 370C and 370D coupled with inverter gates 370A and 370B. These are connected to form an EXCLUSIVE OR function. The purpose of that portion of the logic 109 is to ascertain that only one signal-either MOTOR MODE SELECT from channel B of the computer of BRAKE MODE SELECT from channel C - is effective at one time. If both are asserted, for any reason, neither is effective due to the EXCLUSIVE OR gating described. The logic 109 also includes NOR gates 382, 384 and 386. The NOR gate 382 is input with one output of the NAND gate 370C and at the other with the line 355 from the final position comparator 294. The NOR gate 384 is input at one terminal with the output of the NAND gate 370D and at the other with the line 362 from the velocity comparator 302. The output of the NOR gate 384 is carried from the logic 109 on the line 140B (MOTOR RUN) to the switch 343 in the override 342 (FIG. 8B) to assert the MOTOR RUN function thereof. The output of the NOR gate 384 is also input to the NOR gate 386. The other input to the NOR gate 386 is derived from the output of the NOR gate 382. The output of the gate 386 is carried from the logic 109 by the line 142 (BRAKE RUN) to the brake control override 334 (FIG. 8B) to assert the BRAKE RUN function thereof.

The tied inputs of the inverter gate 370A are connected to the line 145, BRAKE MODE SELECT, through a diode 371 and a capacitor 372. The inputs are normally high, due to their connection to a positive potential connected through a resistor 373. The tied inputs of the inverter gate 370B are connected to the line 144, MOTOR MODE SELECT, through a diode 374 and a capacitor 375. These inputs are normally high due to the positive potential connected through the resistor 376. This portion of the logic 109 functions to accept only one signal-either MOTOR MODE SELECT from channel B or BRAKE MODE SELECT from channel C - from the computer at one time. If, for any reason, the lines 144 and 145 are both asserted (logic 0), the EXCLUSIVE OR functions to make neither signal effective. Note the output of the NAND gate 370D is connected to the motor control subsystem 106 on the line 140M.

If the computer asserts the BRAKE MODE SELECT line 145 (i.e., the block is traveling downward) and if this is the only asserted signal (as checked by the EXCLUSIVE OR) the motor control subsystem 106 is disenabled on the line 140M and the NOR gates 382, 384 and 386 operate to switch the line 142 to logic 0, thus not asserting the BRAKE RUN function (on the line 142). During the greater part of the downward journey of the block, the brake control subsystem 105 operates on the basis of the total error to modulate the brake and control the block velocity within the command limits. As the block aproaches the final position, an output from the final position comparator interacts with the logic 109 to assert the BRAKE RUN function (on the line 142) and sets the brake to stop the block.

Therefore, with a BRAKE MODE SELECT input on the line 145, and MOTOR MODE SELECT on the line 144 not asserted, for the greater part of the downward movement of the block the following conditions would prevail: The A and B terminals of the inverter gate 370B and the B terminal of the NAND gate 370C are at logic 1 condition. Both terminals of the inverter gate 370A and the A terminal of the NAND gate 370D are in the logic 0 condition.

The output of the inverter gate 370A is therefore a logic 1, placing this condition (logic 1) at the A input of the NAND gate 370C. The output of the inverter gate 370B is a logic 0, placing this condition at the B input of the NAND gate 370D. Thus, the output of the NAND gate 370C is at logic 0 and the output of the NAND gate 370D is at logic 1. These are the conditions at the A input of the NOR gate 372 (logic 0 from the output of the NAND gate 370C) and at the A input of the NOR gate 374 (logic 1 from the output of the NAND gate 370D). Note that the logic 1 at the output of the NAND gate 370D is carried by the line 140M to the motor control sybsystem 106 enabling the motor override network therein.

With regard to the NOR gate 384, the presence of a logic 1 at the A input thereof insures that the output thereof is a logic 0, despite the signal presented at the B input leading from the velocity comparator 302 on the line 362. Thus, the output from the NOR gate 384 and the B input of the NOR gate 386 are both at logic 0 as long as a BRAKE MODE SELECT condition is present on the line 145. Accordingly, the output line 140B from the NOR gate 384 in the logic 109 to the override 342 is a logic 0. That is, the MOTOR RUN function is not asserted. Note that the output of the velocity comparator 302 is not effective to release the brake in a BRAKE MODE SELECT condition.

With regard to NOR gate 382, the A input thereof is at a logic 0 at all times that a BRAKE MODE SELECT is asserted on the line 145. The B input to the NOR gate 382 is derived from the output of the final position comparator 294 on the line 355. Therefore, during the greater portion of the downward travel of the block, the output on the 355 to the B input of the NOR gate 382 is at a logic 0. Thus, the output of the NOR gate 382 is a logic 1. The logic 1 input condition to the A input of the NOR gate 386 results in the situation that as long as the block is greater than the threshold distance (set by the potentiometer 351) from the final, command position, the line 142 (BRAKE RUN) is at logic 0, allowing the normal control subsystem functions derived from the magnitude of the total error signal $(E_T)_B$ to be controlling the velocity of the block.

However, as the block approaches the final position, the output of the comparator 294 switches and provides a logic 1 output on the line 355 connected to the B terminal of the NOR gate 382. This results in the output thereof, and the A input to the NOR gate 386, switching to a logic 0, As a result, the output of the NOR gate 386 goes to a logic 1, and BRAKE RUN output line 142 is energized. With a logic 1 at the output of the NOR gate 386 and on the line 142, the switches 337 and 338 are turned on. With such an occurrence full braking is applied since the positive inputs to the amplifiers 239B and 241B override the normal brake control subsystem, thus setting the brake when the position error has reached an acceptably low value.

If the computer asserts the MOTOR MODE SELECT line (i.e., the block is hoisted upwardly) and if this is the only asserted signal (as checked by the EXCLUSIVE OR) the motor control subsystem is enabled on the line 140M (MOTOR RUN). However, the brake is kept asserted by the logic 109 even though the computer has asserted the motor mode, until the block reaches a predetermind threshold velocity. This is implemented as set forth herein.

With the MOTOR MODE SELECT signal on the line 144, the A and B terminals to the inverter gate 370A are at a logic 1 condition along with the A input of the NAND gate 370D. The A and B inputs to the inverter gate 370B, and the B input to the NAND gate 370C, are at a logic 0 condition. Thus, the output of the inverter gate 370A, and the A input to the NAND gate 370C, are at a logic 0 condition. Accordingly, the output of the NAND gate 370C and the A input to the NOR gate 382 are in a logic 1 condition. The output of the inverter gate 370B, and the B input of the NAND gate 370D are in a logic 1 condition. Accordingly, the output of the NAND gate 370D and the A input to the NOR gate 384 are in a logic 0 condition. The output of the NAND gate 370D is conducted to the motor control subsystem 106 on the line 140M. The motor is, in effect, enabled because the MOTOR RUN line 140B is at logic 0.

With respect to the NOR gate 382, as long as a MOTOR MODE SELECT condition is asserted on the line 144, the A input is a logic 1. The output of the NOR gate 382, therefore, is at all times a logic 0, regardless of the signal present on the line 355 from the final position comparator 294. Thus, the position comparator in the brake control subsystem 105 is not effective during a MOTOR MODE SELECT condition. The A input to the NOR gate 386 is at all times a logic 0.

With respect to the A input of the NOR gate 384, it is at all times a logic 0. However, as long as the velocity at which the motor lifts the block is less than the velocity represented at the inverting input of the comparator 302, the output thereof on the line 362 connected to B input of the NOR gate 384 is a logic 1. Therefore, the output of the NOR gate is a logic 0 as long as the velocity of the block is below the threshold. The B input of the NOR gate 386 is also a logic 0, resulting in a logic 1 output therefrom. Accordingly, the line 140B (MOTOR RUN) is not asserted (due to logic 0 at the output of the NOR gate 384) while the BRAKE RUN function at the output of the NOR gate 386 on the line 142 is asserted. The result is when the motor mode is selected (the override being disenabled), the brake is asserted as long as the velocity is below the defined threshold.

When the block is lifted at a velocity exceeding the threshold, the output of the velocity comparator 302 switches, placing a logic 0 at the B input of the NOR gate 384. The output thereof shifts to logic 1, asserting the MOTOR RUN function on the line 140B. The switch 343 is turned on, overriding the signals presented to the inverting inputs of the amplifier 244B. Thus, when the velocity exceeds the predetermined threshold velocity, the override 342 is enabled in the manner described to prevent unnecessary wear on the brake as the block is raised. Further, the B input to the NOR gate 386 is also switched to the logic 1 state, thereby placing a logic 0 at the output thereon, disenabling the BRAKE RUN function on the line 142.

Of course, during this period of the block travel, the velocity is controlled by the time integral of the total error $(E_T)_M$, as discussed. As the block nears its final position, the total error $(E_T)_M$ tends to go positive thus decreasing the velocity of the block. As the velocity of the block falls below the threshold set by the velocity comparator 302, the output thereof switches back to a logic 1, changing the B input to the NOR gate 384, and switching the output of the NOR gate 384 to a logic 0. This disenables the MOTOR RUN line, and switches the output of the NOR gate 386 to a logic 1, enabling the line 142 (BRAKE RUN) to set the brake. As will be seen herein, within the motor control subsystem 106, a position comparator, similar to that discussed above, is operable when the block approaches within a predetermined distance of the command position, to assert a motor override and stop the hoisting motion.

MOTOR CONTROL SUBSYSTEM SCHEMATIC

Figure 9A:
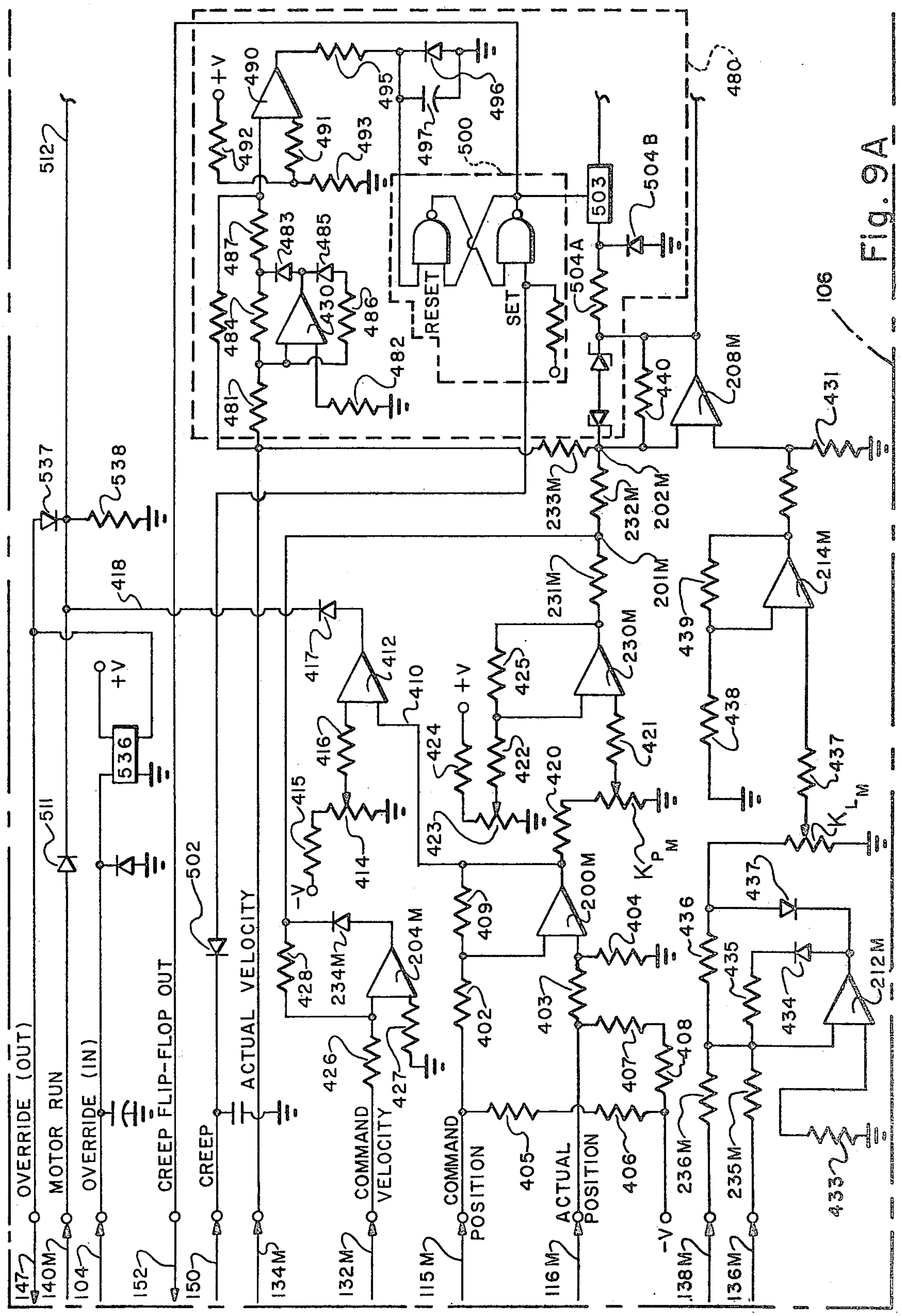
FIGS. 9A and 9B are detailed schematic diagrams of the motor control subsystem shown in the block diagram FIG. 3.

Referring now to FIG. 9, a detailed description of the motor control subsystem 106 is set forth. The basic features of the motor control subsystem 106 are similar to those of the brake control subsystem 105, as seen in earlier discussions.

The COMMAND POSITION signal is input on the line 115M (FIG. 3) and connected through a resistor 402 to the inverting input of the differential amplifier 200M. The ACTUAL POSITION signal is input on the line 116M and is presented to the non-inverting input of the differential amplifier 200M through the resistor 403. The non-inverting input is connected through a resistor 404 to ground potential. Both the ACTUAL POSITION and the COMMAND POSITION signals are current signals and are converted to an appropriate voltage for application to the differential amplifier 200M by the resistor arrangement 405, 406, 407 and 408, connected in pairs between the input signals lines 115M and 116M and a negative potential. The output of the differential amplifier 200M is fed back through a resistor 409 to the inverting input. This resistor, in combination with the resistor 402, establishes the amplifier gain. The position error signal output is taken by a line 410 to the noninverting input of a position comparator 412. The inverting input of the position comparator 412 is furnished with a signal derived from a potentiometer 414 connected to a negative potential through a resistor 415. The wiper of the potentiometer is connected through a resistor 416 to the inverting input. The position comparator 412 outputs a signal through a diode 417 to a line 418 when the position error signal at the output of the differential amplifier 200M is less than the voltage level as set by the potentiometer 414. As seen herein, this condition overrides the motor control to shut off the motor.

The output of the differential amplifier 200M is connected through a resistor 420 to the potentiometer $(K_P)_M$. An adjustable portion of the position error signal, as set by $(K_P)_M$, is applied through a resistor 421 to the non-inverting input of the amplifier 230M. The inverting input of the amplifier 230M is connected through a resistor 422 to the wiper of a potentiometer 423 tied to a positive potential through a resistor 424. The purpose of the potentiometer is to set a minimum velocity signal. The output of the amplifier 230M is fed back through a resistor 425 to the inverting input thereof. The output of the amplifier 230M is tied through the resistor 231M to the node 201M to which is also connected the output of the amplifier 204M through the diode 234M. The limiting effect at the node 201M of the combination of the amplifier 204M and the diode 234M has been discussed earlier in connection with the simplified signal diagrams of the drawworks motor control.

The signal at the node 201M is connected to the summing junction 202M through the resistor 232M. At the summing junction 202M the composite position error plus velocity signal, $(E_{P+V})_M$, is formed, as dicussed, by the summation of the adjusted position error signal with the signal representative of the ACTUAL VELOCITY taken from the input line 134M through the resistor 233M. The velocity signal may be derived from the drum tachometer 94 or, alternatively, from the block position transducer 83. The ACTUAL VELOCITY signal is applied to the inverting terminal of a comparator 430, as is discused herein. The signal at the summing junction 202M is applied to the inverting input of the difference amplifier 208M. The non-inverting input is connected to ground potential through a resistor 431. As discussed, however, an adjusted portion of a load factor signal is also applied to the non-inverting input.

An ACTUAL LOAD signal is applied on the line 136M and the appropriately scaled INITIAL LOAD·$(-K_2)$ signal is input on the line 138M. These load signals are summed at the inverting input of the comparator 212M through the resistor 235M and 236M, respectively. The non-inverting input of the amplifier 212M is connected to ground through a resistor 433. The output of the amplifier 212M is fed back to the inverting input through a loop including the diode 434 and the resistor 435 as well as the loop including a resistor 436 and a diode 437. These components in combination with the input resistors 235M and 236M establish the amplifier gain. The output of the amplifier 212M is connected to the potentiometer $(K_L)_M$. The output is taken from the junction of the resistor 436 and diode 437 to remove the effects of diode 437 voltage drop. The wiper of the potentiometer $(K_L)_M$ is connected through the resistor 437 to the non-inverting input of the amplifier 214M. The inverting input of the amplifier 214M is connected to ground potential through a resistor 438. The output of the amplifier 214M is fed back to the inverting input through a resistor 439 and is also tied to the non-inverting terminal of the difference amplifier 208M.

Figure 9B:
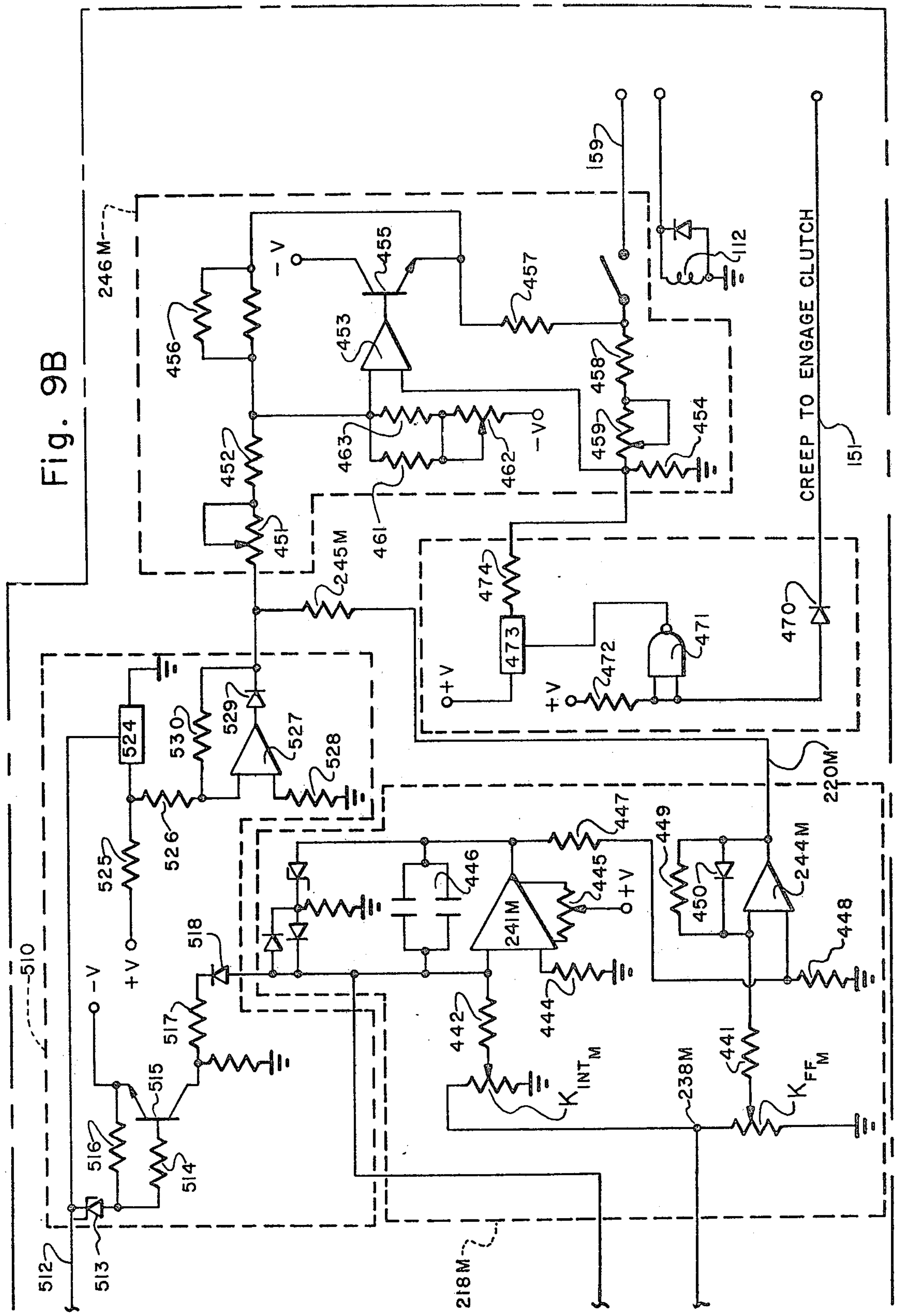

The output of the difference amplifier 208M is connected to the integrator-amplifier network 218M (FIG. 9B). This output is also fed back to the inverting input through the resistor 440. The integrator-amplifier network 218M takes the output of the difference amplifier 208M from the node 238M along two parallel paths. One path includes the potentiometer $(K_{FF})_M$, the wiper of which is connected to the inverting input of the differential amplifier 244M through a resistor 441. The second parallel path includes the potentiometer $(K_{INT})_M$, the wiper of which is connected through a resistor 442 to the inverting input of the integrating amplifier 241M. The non-inverting input is tied to ground potential through the resistor 444. A potentiometer 445 sets the zero point of the integrating amplifier 241M. The output of the integrating amplifier 241M is fed back through a capacitive network 446 to the inverting input thereof. The output of the integrating amplifier 241M is connected through a resistor 447 to the non-inverting terminal of the amplifier 244M. The non-inverting terminal is also tied to ground potential through a resistor 448. The circuit details of the motor control subsystem differs from that of the brake control subsystem in that the parallel paths within the integrator-amplifier network 218M are not summed at a node 243B. Instead, the output of the integrating amplifier is combined differentially with the potentiometer output in the amplifier 244M. The output of the amplifier 244M is fed back through a parallel path including the resistors 449 and the diode 450.

The output 220M of the integrator-amplifier network 218M is connected through the resistor 245M to the voltage-to-current converter 246M. The converter 246M is substantially identical to the inverter described earlier in connection with the brake control subsystem 105 except for the magnitude of the reference voltage applied to the amplifier 453. The resistor 245M is connected to a potentiometer 451 and a resistor 452 through which it is also connected to the inverting input of an amplifier 453. The non-inverting input of the amplifier 453 is tied to ground through a resistor 454. The output of the amplifier drives a transistor 455 of the NPN type, the collector of which is connected to a positive potential. The emitter of the transistor 455 is fed back through a feedback resistive network 456 to the inverting input. The emitter is connected to the high side of the resistor 454 through a series connection of a resistors 457 and 458 and a potentiometer 459. The output of the motor control subsystem is taken at the junction of the resistors 457 and 458. The output line 159 has a relay contact operated by the coil 112 therein.

An initial voltage condition is applied to the inverting input of the comparator 453 and includes a resistor 461 and potentiometer 462 in series with a negative potential. A resistor 463 shunts the resistor 461. The purpose of this network is to supply a reference voltage so as to obtain a 4mA current output under a zero signal input condition.

The motor control subsystem 106 is connected (FIG. 9B) to the computer output channel I through the line 151. This line is connected through a diode 470 to the inputs of a NAND gate 471 having both the inputs tied to a positive potential through a resistor 472. A switch 473 is tied to a positive potential on one side, and one the other through a resistor 474 to the non-inverting input of the comparator 453 within the voltage-to-current converter 246M. Upon receipt of a CREEP TO ENGAGE CLUTCH command signal from the computer on the line 151 (line 151 goes to logic 0), a predetermined current signal is output to the motor drive 93 on the line 159 to move the motor 92 very slowly to permit the clutch to engage for further hoisting operations.

The motor control subsystem 106 has a CREEP control network 480 (FIG. 9A) connected therein. The network includes the inverting amplifier 430. The ACTUAL VELOCITY signal on the line 134M is applied to the non-inverting input through the resistor 481. The inverting input of the comparator 430 is tied to the ground potential through a resistor 482. The output of the comparator is fed back to the inverting and non-inverting inputs through the paths including the diode 483 and resistor 484, and the diode 485 and the resistor 486, respectively. The output of the amplifier 430 is connected through a resistor 487 to the inverting input of a creep comparator 490. The non-inverting input of the comparator 490 is connected through a resistor 491 to a voltage divider network including resistors 492 and 493 connected between a positive and ground potential.

The output of the creep comparator 490 is connected through a resistor 495 to the reset input of a creep flip-flop network 500. A diode 496 with a capacitor shunt 497 is connected between the reset input and ground. The set input of the flip-flop network 500 is connected through a diode 502 to the CREEP signal (channel H) from the computer on the line 150. The output of the flip-flop network 500 connected to the input of a switch 503. The output of the amplifier 208M is connected to a resistor 504A and a diode 504B in series. The switch 503 is connected between the junction of the resistor 504A and the diode 504B and the non-inverting input of the integrating amplifier 241M. The output of the flip-flop network 500 is also connected (through the line 152) to the switch 365 in the brake control subsystem 105 (FIG. 8A).

The purpose of a CREEP command is to slowly raise the traveling block so as to acquire the drill string load with the elevator as discussed in connection with the operation section earlier.

Upon receipt of the CREEP COMMAND a signal at the set input from the line 150 causes an output from the flip-flop network 500 to switch to logic 1. This closes the switch 503. This effectively increases the gain of the integrating amplifier 241M. At the same time, the output on the line 152 from the flip-flop network 500 closes the switch 365 in the brake control subsystem 105 to increase the gain of the integrating amplifier 241B (FIG. 8). Thus, the CREEP command signal, in conjunction with other signals, is used to slowly raise or lower the elevator to acquire or to release a load, as the case may be. Higher velocities are programmed after acquiring or releasing the load. When the velocity exceeds a creep threshold velocity determined by the combination of resistors 492 and 493, the comparator 490 switches to logic 0 to reset the flip-flop network 500 to the normal condition.

A motor control override network 510 (FIG. 9B) includes a primary and secondary override path connected to the MOTOR RUN line 140M. The line 140M is output from the logic 109 and when the motor control subsystem 106 is disenabled by the logic 109, the line 140M has a logic high signal thereon. The line 140M is connected to a diode 511, the output line from the diode 511 being indicated as MOTOR OFF line 512. The primary override path includes a zener diode 513 connected through a resistor 514 to the base of an NPN transistor 515. The emitter of the transistor 515 is connected to a negative potential. The emitter of the transistor 515 is tied to the anode of the zener diode 513 by a resistor 516. The collector of the transistor 515 is connected through a resistor 517 to a diode 518. The primary override is connected to the inverting input of the integrating amplifier 241M. The second path of the override 510 includes a switch 524 connected between the junction of resistors 525 and 526 and ground. The resistor 525 is tied to a positive potential. The non-inverting input of the amplifier 527 is tied to ground through resistor 528. The output of the amplifier 527 is applied through a diode 529 to the inverting input of the voltage-to-current converter 246M. The output is also fed back through the inverting input to a resistor 530.

When an appropriate signal (a logic 1) is received from the logic 109 on the line 140M, the motor control override 510 is actuated to effectively turn off the motor, regardless of the output of the amplifier 244M. When the signal on the line 140M is applied to the diode 511 the output is a signal on the MOTOR OFF line 512 which renders the transistor 515 conductive, effectively setting the output of the integrating amplifier 241 to zero. The secondary path, when in receipt of the MOTOR OFF signal on the line 512, renders the switch 524 conductive, grounding the junction of the resistors 525 and 526. This holds the input to the voltage-to-current converter 246M at zero. This precaution is taken since there may still be a signal at the output of the amplifier 244 even though the integrating amplifier 241M is overriden. The MOTOR OFF line 512 can be energized in ways other than by receipt of a computer command via the logic 109.

In order to shut the motor off when the position of the block comes within a predetermined close tolerance to the command position, an output signal from the position comparator 412 on the line 418 operates the override 510 in a manner exactly as discussed.

Further, when the operator asserts the override on the line 104, a signal is applied to an optical coupler 536 (FIG. 9A) acting as a switch. When energized the switch 536 connects a positive potential to the line 512 through a diode 537. A resistor 538 ties the line 512 to ground. Upon receipt of a manual override signal, the switch 536 is conductive, placing a high signal on the line 512 to turn the motor off by the override 510 in a manner discussed above. At the same time, the line 147 (OVERRIDE) is at logic 1 due to its connection to the switch 536, thereby asserting the override network 334 (FIG. 8).

Figure 10:
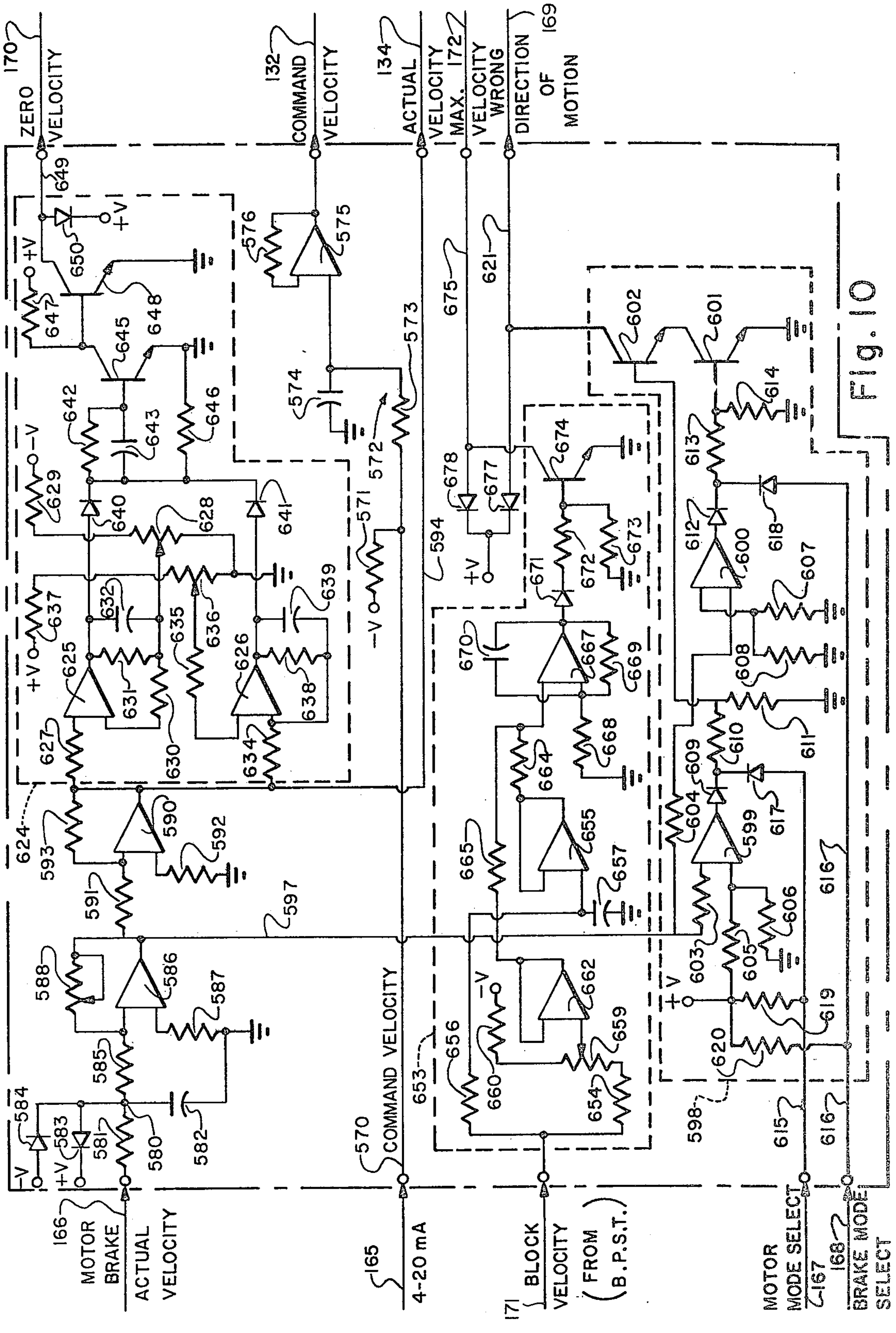
FIG. 10 is a detailed schematic diagram of the velocity comparator shown in the block diagram FIG. 3.

Having completely discussed the brake control subsystem 105, the motor control subsystem 106, and the logic 109, attention is directed to FIG. 10, which is a detailed schematic diagram of the velocity comparator 108.

VELOCITY COMPARATOR

Shown in FIG. 10 is a detailed schematic diagram of the velocity comparator 108 utilized in the drawworks control system 21. As seen from the block diagram FIG. 3, the velocity comparator 108 is input from the computer channel G on the line 165 with a 4–20mA signal representative of the COMMAND VELOCITY, the velocity at which it is desired to move the traveling block 68 from a first to a second elevation within the rig or derrick 20 (FIG. 2). With reference to FIG. 10, the current input signal is taken on a line 570 and converted to a voltage by the action of the resistor 571 connected between the line 570 and a negative potential. The resulting voltage signal is filtered by a filter 572 comprising a resistor 573 and a capacitor 574 and is applied to the non-inverting input of an amplifier 575. The output of the amplifier 575 is fed back to the inverting input through a resistor 576, and is also connected to the output line 132 which carries the 0–10 volt COMMAND VELOCITY signal to the brake control subsystem 105 and the motor control subsystem 106, on the lines 132B and 132M respectively.

The velocity comparator 108 is also input, on the line 166 with a bi-polar voltage signal derived from the drum tachometer 94. The magnitude of the signal from the drum tachometer 94 is representative of the ACTUAL VELOCITY at which the traveling block 68 (FIG. 2) is moving. The polarity of the voltage signal on the line 166 is representative of the direction of travel of the traveling block 68. Consequently, a positive polarity indicates an upward direction of travel with respect to the vertical axis of the derrick 20. An upward direction of travel, of course, implies that the motor mode is being asserted. A negative polarity of the signal on the line 166 indicates downward motion of the traveling block 68 with respect to the derrick axis, and implies the brake mode is being asserted by the computer.

The ACTUAL VELOCITY signal is filtered to remove commutating spikes by a single-pole, low-pass filter network 580 which is comprised of a resistor 581 and a capacitor 582. Diodes 583 and 584, respectively connected to positive and negative potentials, limit the signal to an amplifier 586. The filtered ACTUAL VELOCITY signal is presented through a resistor 585 to the inverting input of the adjustable gain amplifier 586. The non-inverting input of the amplifier 586 is connected to ground potential through a resistor 587. Connected in a feedback loop from the output of the amplifier 586 to the input thereof is an adjustable resistor 588. The gain of the amplifier 586 depends upon the setting of the resistor 588. The output may be adjusted to represent some nominal velocity, for example, 1 volt per foot per second.

The output of the amplifier 586 is applied to the inverting input of a unity gain inverter amplifier 590 through a resistor 591. The non-inverting input of the amplifier 590 is connected to ground potential through a resistor 592. The output of the amplifier 590 is fed back to the inverting input thereof through a resistor 593. The output is also connected by a line 594 to the output line 134, which is the ACTUAL VELOCITY signal input to the brake control subsystem 105 and the motor control subsystem 106 on the lines 134B and 134M, respectively. With the circuit configuration described, the magnitude of the voltage signal on the line 134 represents the actual velocity of the block, with a positive polarity indicating upward movement and a negative polarity indicating downward motion.

The output of the amplifier 586 is taken by a line 597 to a wrong direction indicating network 598. The network 598 includes comparators 599 and 600, and transistors 601 and 602 connected in a logic OR configuration. The inverting input of the comparator 599 and the non-inverting input of the comparator 600 are connected with the output of the amplifier 586 through resistors 603 and 604, respectively. The switching points of the comparators are fixed at a nominal, predetermined threshold level, for example, a level corresponding to the velocity of about 0.5 foot/second. The non-inverting input of the comparator 599 is connected to a positive voltage from a positive potential source through the resistors 605 and 606. The inverting input of the comparator 600 is connected to ground potential through the resistors 607 and 608.

The output from the comparator 599 is connected through a diode 609 and a resistor 610 to the base of the NPN transistor 602. The junction of the transistor 602 and the resistor 610 is connected to ground potential through a resistor 611. The output of the comparator 600 is connected through a diode 612 and a resistor 613 to the base of the NPN transistor 601. The junction of the base of the transistor 601 and the resistor 613 is tied to ground potential through a resistor 614.

One or the other of the comparators 599 or 600 is disenabled, dependent upon whether a signal is present on the line 615 or 616. The line 615 is connected to a line 167 tied to the MOTOR MODE SELECT line 144 from the computer. The line 616 is connected to a line 168 tied to the BRAKE MODE SELECT line 145 from the computer. A diode 617 is connected in the line 615 to the junction between the diode 609 and the resistor 610. A diode 618 is connected in the line 616 to the junction between the diode 612 and the resistor 613. The diodes 617 and 618 are normally forward biased, due to the connection of the anode of each diode 617 and 618 to a positive potential through the resistors 619 and 620, respectively.

The output of the wrong direction network 598 is taken from the collector of the transistor 602 by a line 621. The line 621 is connected to a line 169 connected to the computer input channel E. The network 598 operates to give a WRONG DIRECTION OF MOTION signal on the line 169 if the motion of the block exceeds the nominal setting 0.5 feet/second in the wrong direction. If this occurs, either transistor 602 or 601 ceases to conduct. A WRONG DIRECTION OF MOTION signal is an interrupt condition, which disables all systems and halts the program. As with all other interrupt conditions, the entire system reverts to manual control and all automatic operation is halted.

The enabling signals on the lines 167 and 168 from the computer to the motor and brake control are applied, through the lines 615 and 616, respectively, to the comparator outputs through the diodes 617 and 618. These signals enable the appropriate comparator so that only the "correct" wrong direction is sensed. If, for example, the motor control subsystem is controlling a hoisting motion, the MOTOR MODE SELECT line 144 and the line 167 are low and the BRAKE MODE SELECT line 145 and the line 168 are high so that the output of the comparator 599 is enabled and the output of the comparator 600 is not enabled. During hoisting the ACTUAL VELOCITY signal polarity at the non-inverting input of the comparator 600 is negative so that the transistor 601 would tend to be turned off, but the comparator ouput 600 is disconnected since the diode 612 is back-biased. In this condition, the transistor 601 is maintained in conduction by the signal applied through the diode 618. However, if the ACTUAL VELOCITY signal at the inverting input of the comparator 599 should become positive with a magnitude greater than approximately 0.5 volt, indicating a "wrong" direction of travel, neither the diode 609 nor the diode 617 conducts, so that the transistor 602 becomes non-conductive, signaling an interrupt condition on the line 169 to the computer. The "wrong" direction during a braking motion operates in a similar manner.

The output of the amplifier 590 is also connected to a zero velocity detector network 624. The network 624 includes comparators 625 and 626 connected as zero velocity detectors. Since the output of the drum tachometer 94 is a bipolar signal, two comparators 625 and 626 are required, one effective for each direction. The inverting input of the comparator 625 is connected to the output of the amplifier 590 through a resistor 627. The non-inverting input is connected to a switching point voltage set by the "down" potentiometer 628, connected to ground on one side and to a negative potential through a resistor 629 on the other. The output of the comparator 625 is fed back to the non-inverting terminal thereof through a loop including a resistors 630 and 631, and a capacitor 632. This positive feedback loop provides hysteresis so that the comparator 625 will provide positive signal action with signals close to the switching point. The non-inverting input of the comparator 626 is also connected to the output of the amplifier 590 through a resistor 634. The inverting input is connected through a resistor 635 to a switching point voltage set by the "up" potentiometer 636 which is connected to ground on one side and to a positive potential through a resistor 637. The output of the comparator 626 is fed back to the non-inverting terminal thereof through a loop including a resistor 638 and a capacitor 639. This positive feedback loop insures that the comparator 626 will provide a positive switching action at input signals near threshold.

The outputs of the comparators 625 and 626 are connected, through diodes 640 and 641, respectively, and a through a network including a resistor 642 and a capacitor 644 to the base of an NPN-type transistor 645. The emitter of the transistor 645 is connected to ground. The cathodes of the diodes 640 and 641 are connected to ground through a resistor 646. The collector of the transistor 645 is tied to a positive potential through a resistor 647. The collector of the transistor 645 is connected to the base of an NPN transistor 648. The emitter of the transistor 648 is tied to ground, with the collector thereof being tied to an output line 649. A diode 650 is connected between the line 649 and a positive potential. The output line 649 is connected to a line 170, ZERO VELOCITY, (FIG. 3) to the computer channel D. The switching points of the comparators 625 and 626 are set by the potentiometers 628 and 636, respectively, such that a predetermined small velocity in either the downward or upward direction is recognized as a zero velocity condition and a signal to that effect is applied on the line 170 to the computer. Zero velocity on the line 170, indicated by the transistor 648 being switched on, is only one of the two necessary conditions for the computer to recognize that the block is at its programmed destination.

As will be set forth in detail herein, the block position and speed transducer 83 outputs a 0–10mA velocity signal on a line 171 to the velocity comparator 108. This unipolar current signal on the line 171 is applied to a maximum velocity network 653. The current signal is converted to a voltage signal by the action of a resistor 654 tied to ground potential. The voltage signal is applied to the non-inverting input of a voltage follower amplifier 655 through a resistor 656, with a capacitor 657 tied to ground potential. An adjustable maximum velocity signal derived from a potentiometer 659 connected to a negative potential through a resistor 660 is applied to the non-inverting input of a voltage follower 662. The opposed polarity outputs of the voltage followers 655 and 662 are applied through resistors 664 and 665, respectively, and are summed at the inverting input of an amplifier 667 effectively operating as a comparator. The non-inverting input is tied to ground through a resistor 668. The output of the comparator is fed back to the non-inverting input thereof through parallel feedback paths including a resistor 669 and a capacitor 670. The output of the comparator 667 is tied through a diode 671 and resistor 672 to the base of an NPN transistor 674. The emitter of the transistor 674 is tied to ground, while the output thereof is tied to a line 675. The line 675 is connected to an output line 172. This MAXIMUM VELOCITY signal on the line 172 is connected to the computer input channel F.

The maximum velocity threshold set by the potentiometer 659 is normally greater than the actual velocity signal to the follower 655, so that the output of the comparator 667 is at positive saturation, holding the transistor 674 in conduction. However, if the BLOCK VELOCITY from the B.P.S.T. 83 exceeds the threshold, the transistor 674 is cut off. The indication that the maximum velocity is exceeded is thus output to the computer on the lines 675 and 172. Note that on both the lines 621 and 675, a normal condition is indicated by current flow. When an abnormal condition is sensed, that current signal drops to zero. Diodes 677 and 678 are, respectively, tied between the lines 621 and 675 and a positive potential.

BLOCK POSITION AND SPEED TRANSDUCER

Figure 11:
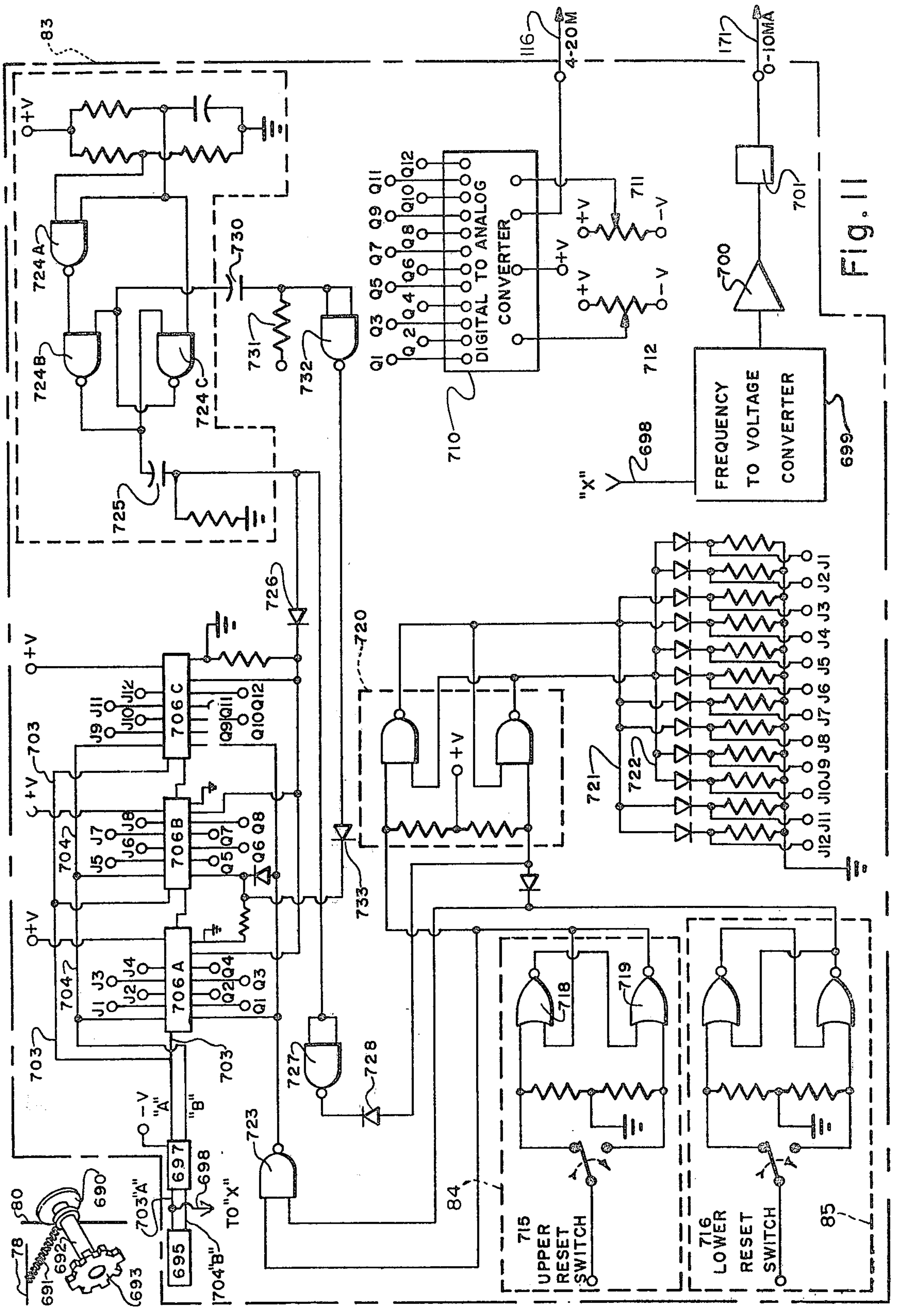
FIG. 11 is a detailed schematic diagram of the traveling block position and speed transducer shown in the block diagram FIG. 3.

Referring to FIG. 11, a detailed schematic diagram of the block position and speed transducer (B.P.S.T.) 83 is shown. As mentioned, the B.P.S.T. 83 outputs a position feedback signal to the computer input channel J on the line 116. Further, a position signal is input to the brake control subsystem 105 and the motor control subsystem 106 on the lines 116B and 116M, respectively. Also, as discussed in connection with FIG. 10, the B.P.S.T. 83 outputs a 0–10mA BLOCK VELOCITY signal on the line 171 to the velocity comparator 108.

The B.P.S.T. 83 is associated with the block 68 and is mounted on the carriage of the block retractor 78 for travel therewith along the guide track 80. The traveling block 68, of course, moves with the carriage 78. The mounting details are illustrated diagrammatically with any suitable means of mounting being within the contemplation of this invention. A friction wheel 690, manufactured of any suitable material, as urethane, is contacted against the retractor guide track 80. A spring 691 biases the wheel 690 into contact with the track 80. Displacement of the carriage 78 causes rotation of the wheel 690 and a shaft 692 suitably coupled thereto. At the opposite end of the shaft 692 is coupled a toothed wheel 693 which is driven by movement of the wheel 690.

The B.P.S.T. 83 includes a zero velocity magnetic pickup 695, such as that manufactured by Airpax and sold under Model No. 4-0002. The pickup 695 outputs a square wave pulse each time a tooth of the wheel 693 passes in proximity to the pickup 695. This signal is hereafter referred to as the "A" signal. The pickup also outputs a signal, either a logic 1 or a logic 0, indicative of the direction in which the teeth of the wheel 693 are passing. This signal is hereafter referred to as the "B" signal. It is quickly appreciated that a predetermined given number of output pulses from the pickup is calibrated and used to represent displacement of the block a predetermined rectilinear distance along the track 80. Similarly, the frequency of the pulses is proportional to the speed at which the carriage 78 moves. The "A" and "B" signals of the pickup 695 are connected to a signal level translator 697. A suitable translator 697 is that manufactured by Motorola and sold under Model No. MC 666. The function of the translator 697 is to translate the magnitudes of the "A" and "B" signals to a level compatible with the electronic components which follow. The "A" signal is also transmitted by a line 698 to the input of a frequency-to-voltage converter 699. Any suitable converter 699 may be utilized, such as that manufactured by Teledyne Filbrick and sold under Model No. 4702.

The frequency-to-voltage converter 699 serves to provide an average output voltage proportional to the frequency of the square wave input signal. Potentiometers may, of course, be provided to adjust the zero and full scale output. For example, a nominal sensitivity of 1.0 volt/foot/second with a full scale of 10 volts, or any other predetermined setting may be utilized. The output from the converter 699 is applied to a unity gain inverting amplifier 700 (shown schematically). The output of the inverting amplifier 700 is applied to a voltage-to-current converter 701. The converter 701 is similar in circuit details to the voltage-to-current converter 246B shown in FIG. 8B. The converter functions to provide a 0–10mA output proportional to the 0 to −10 volt input signal. A suitable trimming resistor may be provided to adjust the output current to a predetermined value, for example 10mA when the input voltage is 10 volts. Resistors or potentiometers may also be provided to make the current output independent of load resistance. A 0–10mA output current signal on the line 171 is functionally related to the frequency of the square wave input on the line 698 and, accordingly, to the speed of the carriage 78 and the traveling block 68 associated therewith. As before, the current signal is preferred due to the high noise immunity offered thereby. Further, the constant current source characteristic makes the cable resistance and/or cable length uncritical. Thus, long cable runs through electrically noisy environments using economical unshielded cable are possible. The output from the voltage-to-current converter 701 is connected by the line 171, discussed above, to the velocity comparator 108. Although velocity feedback signals are received at the velocity comparator 108 from the drum tachometer 94, it is noted that redundancy is provided by the velocity signal output from the B.P.S.T. 83. The velocity signal from the B.P.S.T. 83 provides excess velocity information should the drum tachometer 94 develop a malfunction.

As noted, the "A" and "B", output signals from the pickup 695 are output from the level translator 697. A line 703 carrying the "A" signal (also input to the converter 699), and a line 704, carrying the "B" signal representative of the direction of motion of the wheel 693 are both input to a cascaded array of counters, 706A, 706B, and 706C, such as those manufactured by Motorola and sold under model number MC14516CP. The counters register the number of pulses received on the line 703 during the motion of the block. Thus, the total count is the measure of the vertical distance traversed. The directional signal input on the line 704 determines whether the count is to be added or subtracted (i.e., countup or countdown) from the initial value. In the Figure, the array of counters 706 provides a total count of 4096.

The parallel outputs Q(N) of the counters 706 are applied to a digital-to-analog converter 710, such as that manufactured by Hybrid Systems Corporation and sold under the model number DAC 380-12. The output of the converter 710 is a current proportional to the magnitude of the count received. Potentiometers 711 and 712 are, respectively, provided to adjust the zero and full scale current levels. These potentiometers may be set, for example, so that a 4mA signal corresponds to a zero count and a 20mA current corresponds to a register count of 4095. The output current, is, therefore, proportional to the elevation of the traveling block. The output current signal, sharing the same attributes as discussed above, is applied to the output line 116 to the computer (on input channel J) and to the brake and motor control subsystems 105 and 106, respectively on the lines 116B and 116M.

Since the B.P.S.T. is an incremental position sensing system, a reset is employed to establish a definite and repeatable correlation between the count registered and the physical position of the block 68. As noted earlier in connection with FIG. 2, two proximity switch sensors 84 and 85 are located on the carriage 78 which are actuated by metal targets 86 and 87. This arrangement provides unambiguous reset points near the upper and lower ends of the retractor guide 80. Each reset switch output is applied to an anti-bounce network 715 and 716, each utilizing two cross-coupled NOR gates 718 and 719. The output of each of the networks 715 and 716 is applied to a bistable network 720. The output of the network 720 functions to maintain one or the other of reset buses 721 or 722 high (i.e., at logic 1), depending upon which reset switch 715 or 716 is actuated.

The upper reset bus 721 and the lower reset bus 722 each have a diode-resistor network wired thereto which forms a pattern to the preset inputs J(N) of the counters 706 representing a predetermined count for the physical elevation of each target. The output of the anti-bounce networks is fed through a NAND gate 723 to the preset inputs of the counters 706. Thus, the counters 706 are preset to a predetermined count each time a sensor passes its respective target.

NAND gates 724A, 724B and 724C are connected as a Schmitt trigger network. The output of the trigger network provides a reset pulse to the reset inputs of each counter 706 through a capacitor 725 and a diode 726. The output of the trigger network resets the counters 706 at a fixed time delay after the system power is applied. This time delay is set by the resistor 728 and the capacitor 725. Any predetermined time delay may be used. As a result, the counters 706 are automatically set to zero count each time the system is powered-up.

However, there remains the possibility that after the counters 706 are reset to zero following power-up, one spurious count combined with a down signal from the magnetic pickup could cause the counters 706 to register a full count of 4095. To prevent this situation, the reset pulse described above is also applied to a NAND gate 727 functioning as an inverter. Its output functions to switch the lower reset bus 722 to logic 1 through the diode 728. During a predetermined additional time interval, set by the capacitor 730 and resistor 731, the preset pin of the middle counter 706B is enabled through an inverter 732 and a diode 733. The result is that a preset count is entered following each power-up. In this example, a count of 48 is entered, although any value can be preset by appropriate rearrangement of the logic.

ELEVATOR LOAD CONTROL

As alluded to above, during both the make-up and breakout cycles it is necessary and desirable to monitor the load being carried by the elevator 75 (FIG. 2). Accordingly, as discussed in connection with the brake control subsystem 105 and the motor control subsystem 106, feedback signals from the elevator load control subsystem 107 are utilized in the determination by the motor or brake controls of the speed at which the drill string is lifted (by the motor) during break-out cycle or the speed at which the string is permitted to fall (by the brake) during make-up cycle. The necessity and advantage of considering the elevator loading is apparent. If the drill string is encumbered as it is lifted out of or lowered into the bore, the loading on the elevator departs from a predetermined preset minimum (during lowering) or a predetermined preset maximum (during hoisting). In either case damage to bore may occur if the velocity of the block is not limited.

As seen in FIG. 3, the basic drawworks control block diagram, it is noted that the elevator load control subsystem receives output signals from computer channels N, O, and P on lines 175, 176 and 177, respectively. Feedback signals to the computer channels K, L, and M are carried from the elevator load control subsystem are carried on lines 178, 179 and 180, respectively. It is also noted that a feedback signal representative of the actual elevator load is output to both the brake control subsystem 105 and the motor control subsystems 106 through the lines 136B and 136M, respectively, while appropriately scaled initial load feedback signals are respectively output to the brake and motor control subsystems through the lines 138B and 138M, respectively. The derivation of these signals is discussed herein.

The elevator load control subsystem 107 derives its operating input from the deadline force sensor (D.L.F.S.) 95 on the line 110 (FIG. 3). The signal from the D.L.F.S. 95 may be conditioned, if desired. As is the case with all signals derived from relatively distant transducers, the signal from the D.L.F.S. is a 4–20 current signal, chosen for the reasons outlined above.

Figure 12A:
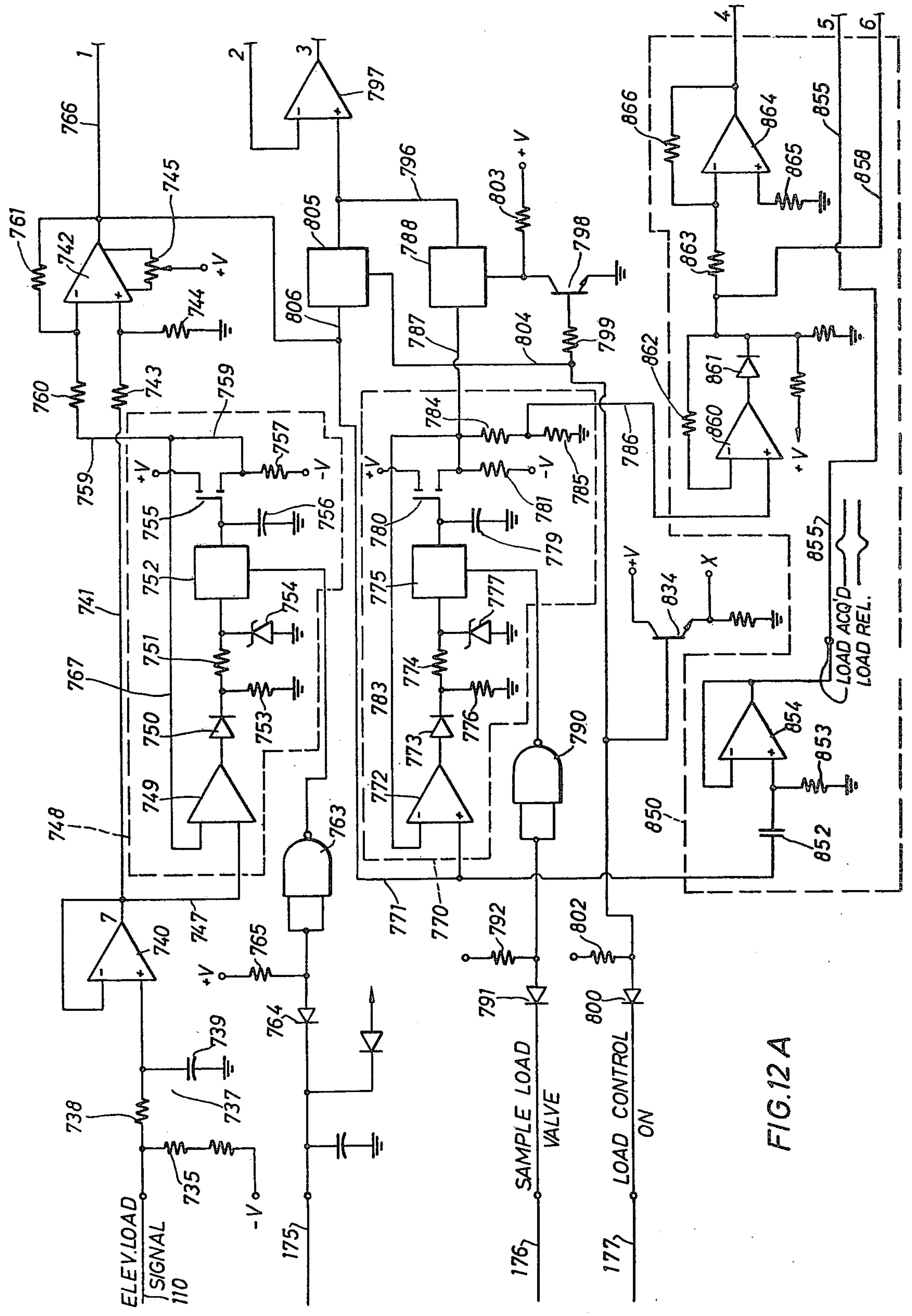
FIGS. 12A and 12B are detailed schematic diagrams of the elevator load control subsystem shown in the block diagram of FIG. 3; and, FIG. 13 is a detailed schematic diagram of associated safety networks and override arrangements embodied by the invention.
Figure 12B:
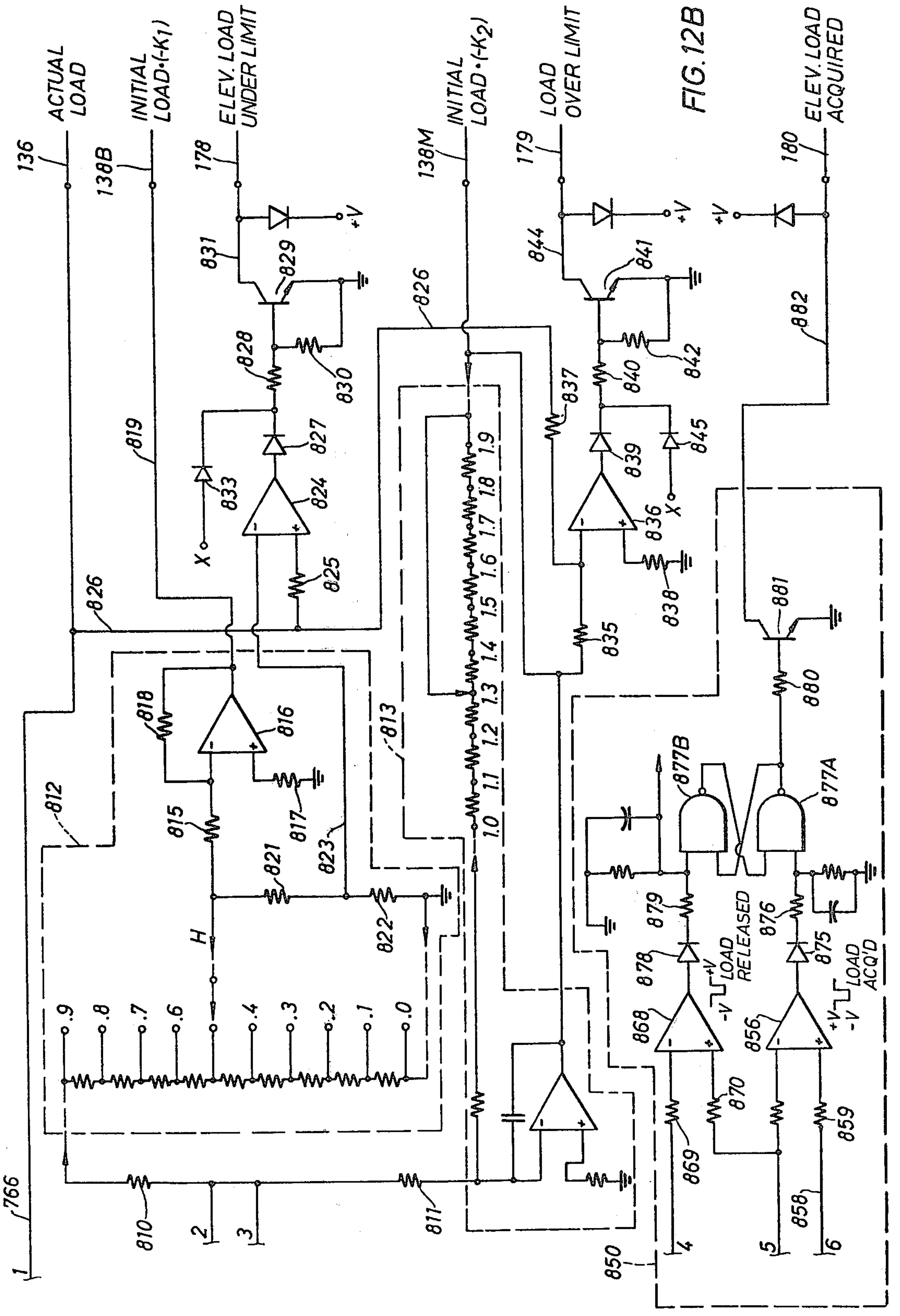

Referring now to FIG. 12, which is a detailed schematic diagram of the elevator load control subsystem 107, the 4–20 mA signal is taken from the input line 110 and converted to a voltage signal by the action of resistor 735 connected to a negative potential. This is a configuration similar to that used throughout the invention to convert a current to a voltage signal. The voltage signal is filtered by a filtering network 737 including a resistor 738 and a capacitor 739. The filtered voltage signal is taken through a buffer amplifier 740 and carried by a line 741 to the non-inverting input of a comparator 742 through a resistor 743. The non-inverting input of the comparator 742 is tied to ground potential through a resistor 744. A potentiometer 745 connected to a positive potential adjusts the zero point of the comparator 742.

The output of the amplifier 740 representative of the loading on the elevator 75 (FIG. 2) at any given instant is connected by a line 747 to a sample-and-hold network 748. The network 748 includes a buffer amplifier 749 connected at its non-inverting input to the line 747. The output of the amplifier 749 is taken through a diode 750 and a resistor 751 to a bilateral switch 752. The junction of the diode 750 and the resistor 751 is tied to ground potential through a resistor 753 while a Zener diode 754 is interposed between the junction of the resistor 751 and the switch 752. The output of the switch 752 is connected to the gate of a field effect transistor 755 with the gate also being connected to ground potential through a capacitor 756. The drain of the transistor 755 is connected to a positive potential. The source is connected to a negative potential through a resistor 757. The output of the sample-and-hold network 748 is taken by a line 759 at the source of the transistor 755 and applied through a resistor 760 to the inverting input of the differential amplifier 742. The output of the differential amplifier 742 is fed back to its inverting input through a resistor 761. The switch 752 is connected through a NAND 763, both inputs thereof being tied through a diode 764 to the line SAMPLE ZERO LOAD line 175 leading from computer channel N. The NAND gate 763 inputs are connected to a positive potential through a resistor 765.

When the switch 752 is closed momentarily by an enabling signal on the line 175 from channel N of the computer, the capacitor 756 is charged to a level corresponding to the elevator load signal at the output of the amplifier 740. The signal level at the output of the transistor 755 on the line 759 remains at the level existing when the switch 752 is gated off until the next gate signal is applied. The computer is programmed such that channel N the "SAMPLE ZERO LOAD" signal is activated when the elevator and block are not in motion and at an appropriate point in the cycle when the elevator has not acquired any load. The signal presented at the inverting input of the comparator 742 may then be thought of as consisting of the tare weight of the elevator and block plus any offsets and accumulated long-term drifts existing in the load measuring networks. At the differential amplifier 742, the zero signal is subtracted from a signal representative of the instantaneous elevator load input on the line 741 so that the instantaneous signal representative of the actual loading on the elevator at the output line 766 from the differential amplifier 742 is presented to the output line 136 ACTUAL LOAD.

The output from the field effect transistor 755 on the line 759 is fed back through a line 767 to the inverting input of the amplifier 749.

A substantially identical sample-and-hold network 770 is connected to the output of the comparator 742 through the line 771. The non-inverting input of a buffer amplifier 772 is connected to the signal on the line 771. The output of the amplifier 772 is connected through a diode 773 and a resistor 774 to a bilateral switch 775. The junction between the diode 773 and the resistor 774 is connected to ground potential through a resistor 776. The junction between the resistor 774 and the switch 775 is connected to ground potential through a zener diode 777. The output of the switch 775 is connected to a capacitor 779 and to the gate of a field effect transistor 780. The drain of the transistor 780 is connected to a positive potential while the source thereof is connected to a negative potential through a resistor 781. The output of the network 770 is taken from the source of the transistor 780. This output is also fed back to the inverting input of the amplifier 772 by a line 783. The output of the transistor 780 is also connected through series resistors 784 and 785 to ground potential. A line 786 is connected at the junction of the transistors 784 and 785 for a purpose to be discussed herein. The output of the sample-and-hold network 770 is connected by a line 787 to a switch 788.

The switch 775 is connected to a NAND gate 790, the tied inputs of which are connected through a diode 791 to the line SAMPLE LOAD ON the line 176 leading from the output channel 0 of the computer. The inputs to the NAND gate 790 are connected to a positive potential through a resistor 792. With the receipt of a signal from the computer channel 0 on the line 176 the positive signal presnet on the input of the NAND gate 790 connected as an inverter switches to a logic 0. The output switches to a logic 1 which gates on the switch 775. With the switch 775 gated on, the capacitor 779 charges to a signal level such that the output of the transistor 780 on a line 787 is equal to the signal level existing at the amplifier 742 output of the line 771. This signal level at the line 787 remains at the level existing when the switch 775 is gated off until the next gating signal is applied. The signal from the computer on the line 176 is activated at a point in the cycle when the elevator has acquired a load but is not yet in motion. Thus, the output of the transistor 780 on the line 787 represents the "dead weight" of the drill string load. This is the INITIAL LOAD and is the base value of the drill string load used for comparison with the ACTUAL LOAD by the brake control subsystem 105 and the motor control subsystem 106, as discussed in connection with the description of those subsystems.

The switch 788 is connected at its input by a line 796 to the non-inverting input of a buffer amplifier 797. The switch 788 is controlled by a transistor 798 of the NPN type, the base of which is connected through a resistor 799 and the diode 800 to the line 177. The LOAD CONTROL ON signal from the computer output channel P is applied on the line 177. The signal end of the resistor 799 is connected to a positive potential through a resistor 802. The collector of the transistor 798 is connected to a positive potential through a resistor 803. The collector of the transistor 798 is also connected to the control lead of the bilateral switch 788. The signal end of the resistor 799 is also connected by a line 804 to the control lead of a second switch 805. The switch 805 connects the output of the amplifier 742 through a line 806 to the non-inverting input of the buffer amplifier 797. Except during the CREEP mode, the LOAD CONTROL ON signal is asserted whenever the drill string is being raised or lowered. When this signal is asserted, the switch 788 is gated on and this switches the signal representing the INITIAL LOAD on the line 787 to the input of the amplifier 797. At the same time, the bilateral switch 805 is turned off. The INITIAL LOAD signal at the output of the amplifier 797 is applied through parallel paths including resistors 810 and 811 to level control circuits 812 and 813, respectively.

Each of the level selectors comprises a bank of resistors such that, depending upon the setting of the selector switch, a predetermined fraction of the INITIAL LOAD is applied through a resistor 815 to the inverting input of a buffer amplifier 816. The non-inverting input of the buffer amplifier is connected through a resistor 817 to ground potential. The output of the amplifier 816 is fed back through its inverting input through a resistor 818. The setting selected by a skilled driller and dialed into the level controller 812 is an adjustable fraction $K_1$ between 0 and 0.9 of the INITIAL LOAD. This level is inverted by the amplifier 816 and applied on the output line 819 to a connection with the line 138B input to the brake control subsystem 105.

The physical effect of choosing the factor $K_1$ may be seen by a consideration of the lowering operation. During lowering, the actual load on the elevator will be less than or equal to the initial INITIAL LOAD value due to frictional forces on the moving pipe. Therefore, it is reasonable to anticipate that some deviation of the actual load on the elevator below that of the INITIAL LOAD may be encountered during a normal lowering operation. The magnitude of the allowable deviation is defined by the magnitude of the constant $K_1$ selectable by the level controller 812.

A portion of the signal at the inverting input of the amplifier 816, the magnitude of that portion being defined by the ratio of the resistors 821 to 822, is applied by a line 823 to the inverting input of a comparator 824. The non-inverting input of the comparator 824 is connected through a resistor 825 to the actual load value carried thereto by a line 826. The output of the comparator 824 is connected through a diode 827 and a resistor 828 connected to the base of an NPN transistor 829. A suitable base resistor 830 is provided. The output of the transistor 829, which is normally conducting, taken at the collector thereof, is connected by a line 831 to the output line 178 leading from the elevator load control subsystem 107 to the computer input channel K. This is the LOAD UNDER LIMIT interrupt signal. The junction of the diode 827 and the transistor 828 is connected through a diode 833 to the output taken at the emitter of a transistor 834. The base of the transistor 834 is connected to the LOAD CONTROL ON line with the collector thereof being tied to a positive potential. Thus, during those periods of time when the LOAD CONTROL ON is asserted by the computer, the transistor 834 is not conducting and the output of the comparator 824 is enabled. The resistors 821 and 822 establish an under-limit switching threshold for the comparator 824 for a given $K_1$ selected. When the value of the actual load falls below the preset fraction of the scaled INI- TIAL LOAD at the inverting input of the comparator 824, the comparator switches so that the transistor 829 switches off. This constitutes an alarm signal indicating that the elevator load is under predetermined limit and actuates an interrupt system, halting the program and applying full braking effort as discussed above. The interrupt causes the entire system to revert from an automatic to maual mode.

The level selector 813 operates in a similar manner. The signal at the output of the level controller 813 is applied through a resistor 835 to the inverting input of a comparator 836. The actual load signal carried by the line 826 through a resistor 837 is summed at the inverting input of the amplifier to produce a polarity inversion. The non-inverting input is connected to ground potential through a resistor 838 so that the comparator switching threshold is zero potential. The output of the comparator 836 is connected through a diode 839 and a resistor 840 to the base of an NPN transistor 841 having a base resistor 842. The collector output of the transistor 841 is connected to line 844 and the line 179 to the computer input channel L. This is the LOAD OVER LIMIT signal. A diode 845 is connected between the junction of the diode 839 and the resistor 840. This maintains the transistor 841 in conduction when the transistor 834 is conduction (i.e., when the LOAD CONTROL ON signal is not asserted) Thus, the function of the LOAD OVER LIMIT interrupt is inhibited.

During a hoisting operation, the actual load may be increased over the INITIAL LOAD value through the effect of friction between the pipe and the bore. Therefore, during a hoisting operation, the INITIAL LOAD is scaled by an appropriate factor $K_2$ selected from the level controller 813. The setting of the selector switch establishes the gain of the amplifier 849. This appropriately scaled load is presented by the line 834 to the output line 138M carried to the motor control subsystem 105. As long as the ACTUAL LOAD signal stays within the range of values defined by the constant $K_2$, as described above, the motor control subsystem 106 is permitted is permitted to control the hoisting velocity without being affected by the load factor. However, as in the case of the lowering motion, if the actual loading on the elevator exceeds some preset fraction (set by the ratio of the resistors 835 to 837), an interrupt signal is output on the line 179 indicating that the elevator LOAD OVER LIMIT has been exceeded, interrupting the program and causing the entire system to revert from automatic to manual control. Note that when the LOAD CONTROL ON signal is not asserted, the line 177 is at logic 1 and the transistor 798 conducts and the switch 788 is gated off. At the same time, the switch 805 is gated on. The ACTUAL LOAD value is continuously applied to the load level selector rather than the INITIAL LOAD value. This effectively inhibits the function of the load control subsystem.

The actual load value at the output of the amplifier 742 is also applied by the line 771 to a load acquired network 850. The signal is applied to a high-pass filter network comprising a capacitor 852 and a resistor 853 connected to ground potential. The filter is tied to the non-inverting input of a buffer amplifier 854, the output of which is connected by a line 855 to the inverting input of a comparator 856 through a resistor 857. The non-inverting input of the comparator 856 is conducted by a line 858 through a resistor 859 from the output of a buffer amplifier 860. The non-inverting input of the amplifier 860 is taken from the line 786. The output of the amplifier 860 is applied through a diode 861 and is fed back to the inverting input thereof through a resistor 862. The output of the amplifier 860 taken through the diode 861 is applied through a resistor 863 to an amplifier 864. The non-inverting input of the amplifier 864 is connected to ground potential through a resistor 865 while the output thereof is fed back to the inverting input through a resistor 866. The output of the amplifier 864 is connected to the inverting input of a comparator 868 through a resistor 869. The non-inverting input of the comparator 868 is taken through a resistor 870 from the line 855.

The output of the comparator 856 is connected through a diode 875 and a resistor 876 to the set pin of crosscoupled NAND gates 877A and 877B connected as a flip-flop circuit. The output of the comparator 868 is taken through a diode 878 and a resistor 879 to the reset input of the flip-flop 877. The output of the flip-flop is taken through a resistor 880 connected to the base of an NPN transistor 881. The collector output of the transistor 881 connected by a line 882 to the output line 180 from the elevator load control subsystem 107 to the computer on the input channel N.

The output of the amplifier 854 and the line 855 is the LOAD ACQUIRED signal. It is fed to the two comparators 856 and 868. The other signal being applied to the comparators is, a shown, a reference signal equal to approximately 1/3 the value of the INITIAL LOAD signal as established by the resistors 784 and 785. The reference signal to the comparator 868 is inverted by the amplifier 864 to maintain the proper signal sense. The reference signals are necessary so that the comparators can accomodate a wide range of hook loads. It adjusts the switching point of the comparators 856 and 868 to a level consistent with the drill string load during the previous cycle. The change in weight over a sequence cycle to cycle is equivalent to one stand of pipe and so for a typical drill string make-up the per cent change in weight is negligible. The output of the comparators 856 and 868 drive the flip-flop 877. Prior to load acquisition, the normal steady state outputs of the comparators 856 and 868 are at a logic 1 due to the reference signals applied. The load acquired flip-flop is at a logic 0. The capacitively coupled load acquired signal momentarily switches the comparator 856, so its output switches to logic 0. This sets the flip-flop 877 so its output switches and remains at logic 1. Later, a negative going load released signal momentarily switches the comparator 868 so that its output pulse resets the flip-flop and the flip-flop output switches to logic 0. The transistor 881 conducts during the interval that the elevator 75 is supporting the drill string load. Thus, during the time that load is acquired by the elevator, a current signal on the line 180 is applied to the computer channel N. When the load has been released, the signal current level drops to zero.

ASSOCIATED SAFETY SYSTEMS

Figure 13:
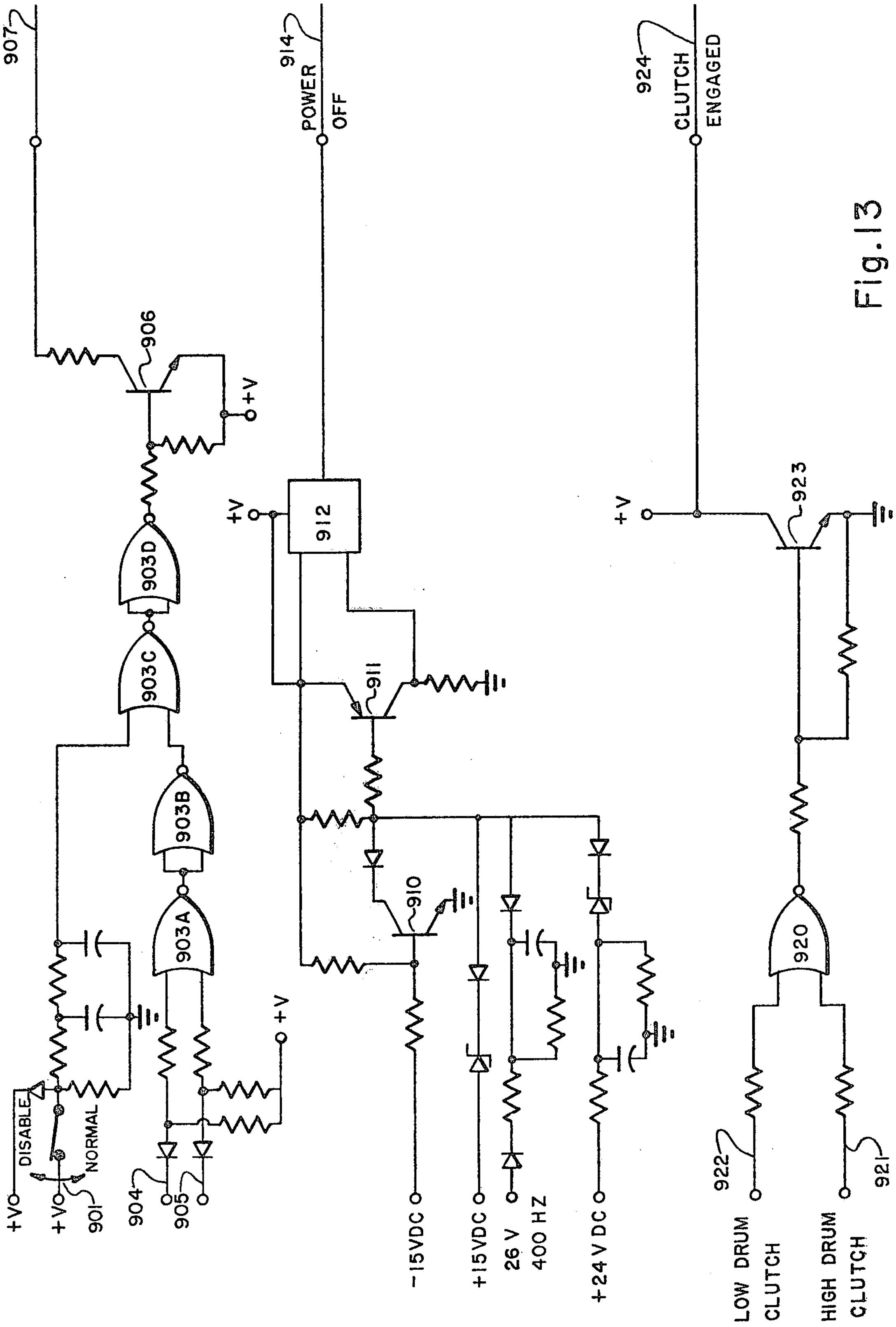

Referring to FIG. 13, a schematic diagram of an automatic sequence disenable and interrupt logic circuit 900 is shown. The purpose of this circuitry is to permit an experienced driller on the derrick to manually correct some physical problem on the rig which is causing the automated sequence to "hang-up" (a temporary halt to the computer program sequencing) and to perform that action without risk of physical injury. Since it is possible that correction of the structural disorder will enable the automated sequence to continue, and perhaps imperil the operator, it is imperative from a personnel safety stand point that the automatic disenable be provided.

The driller's control console is provided with an AUTO MODE switch 901 which in the NORMAL position applies a positive voltage signal to a two-pole low-pass filter and diode limited 902 to apply a logic 1 signal to the A input of NOR gate 903C. When a "hang up" exists in the drawworks program, indicating that the elements controlled by the drawworks elements (FIG. 2) are in a motionless condition, the line 904 from the computer goes to logic 0. Similarly the line 905 from the computer goes to a logic 0 condition each time a "hang-up" exists in the racker control program. Thus, all of the structural elements controlled by that program (numeral 34, FIG. 2) are also static or motionless. A "hang-up" therefore occurs only when an appropriate feedback signal is absent due to a malfunction or at a point where one program is awaiting a function which occurs in the other program to be completed.

The NOR gates 903A, 903B, 903C and 903D are connected as shown so that when the three signals (from the switch 901, and on the lines 904 and 905) are logic 0, a transistor 906 of the NPN type ceases conduction. This constitues an output signal carried by the line 907 which causes the AUTO/MANUAL bus to be de-energized. This inhibits all control function and the entire system reverts to a manual mode, and all sequencing is halted. This condition remains until the AUTO MODE switch is returned to the NORMAL position. Thus, after actuating the AUTO/MODE switch to the DISABLE position, the operator can safely correct a malfunction without the danger of the system immediately continuing on in the automatic sequence. Then the repair has been effected, the switch 901 can be returned to the NORMAL position and the automatic cycle is resumed. Thus, a fault in the structural system (or any other operator correctable malfunction) can therefore be corrected without disrupting the computer program, and thereby avoid the complicated start-up and reloading procedures.

A power-fail sensing system may also be provided. The circuit includes the transistors 910, 911 respectively, of the NPN and PNP types, and the optical coupler 912. This circuitry monitors the power supplies utilized in the invention. The transistor 911 is normally biased off and is non-conducting while the optical coupler 912 is conducting and current in a line 914 is a normal condition. When any of the monitored power sources fail, i.e., +15 VDC, −15 VDC, −24 VDC (tong supply) and 26 V, 400 Hz. AC, the transistor 911 conducts which biases the optical coupler 912 to an off or non-conducting state. Therefore, an output current signal to the line 914 is interrupted. This constitutes an interruptf signal to the computer on the line 914. Of course, loss of +24 VDC control power to the coupler 912 accomplishes the same result.

The EXCLUSIVE OR gate 920 receives input signals on the lines 921 and 922 from the high drum clutch and the low drum clutch feedback switches. The drawworks control utilizes two clutches in the particular embodiment shown. One or the other of the clutches may be damaged by simultaneous engagement of both. The EXCLUSIVE OR gate accepts only one or the other of the clutch signals, but not both. This effectively prevents simultaneous engagement of the clutches. The output of the gate 920 drives a transistor 923 of the NPN type when, conducting supplies a CLUTCH ENEGAGED feedback signal to the computer on the line 924.

APPENDIX

PROGRAM LISTING AND FLOW CHARTS

MAIN, COMMON, TS, INTERRUPTS

```
C     ----------------------------------------------------------
C
C     MAIN PROGRAM
C
C     ----------------------------------------------------------
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
      DIMENSION COSTR(25),ICNST(10),LP(90),LR(90),LC(30),
     1 VELOC(8),DEPTH(7)
      KODE2=0
      IFLG8=-1
      KOD10=126
      KODEP=0
      KODE1=0
      IREAD=1
      NRUBR=0
```

```
      NCOLR=0
      NPLNE=0
      NSTD=0
      XP=0.
      XR=0.
      XC=0.
      IWRTE=1
      IDATA=0
      KODE3=0
S     CLA CLL CMA       /LOAD A 7777
S     6130              /CLEAR CLOCK REGISTER PER BITS SET IN AC
S     CLA CLL
S     6035     /DISABLE KEYBOARD INTERRUPT
S     6020     /DISABLE PAPER TAPE READ-PUNCH INTERRUPT
S     6305     /DISABLE CRT INTERRUPT
S     6365     /DISABLE UDC INTERRUPT
S     6762     /DISABLE DECTAPE INTERRUPT
S     6001     /TURN INTERRUPT ON
      CALL VT05
C     ----------------------------------------------------------
C
C     ROUTINE TO ACCEPT AND DECODE INPUT COMMANDS
C
C     ----------------------------------------------------------
      KODE2=0
10    CALL CRT(2,26,158)
      CALL CRT(5,26,158)
      WRITE(IWRTE,200)
200   FORMAT('INPUT CODE-DATA-TO READ RIG DATA')
      CALL CRT(6,38,0)
      WRITE(IWRTE,210)
210   FORMAT('PIPE-TO INPUT PIPE DATA')
      CALL CRT(7,38,0)
      WRITE(IWRTE,220)
220   FORMAT('OUT-TO COME OUT,  IN-TO GO IN')
      CALL CRT(8,38,0)
      WRITE(IWRTE,230)
230   FORMAT('EXIT-TO EXIT FROM PROGRAM')
C     POSITION CURSOR AT READ
      CALL CRT(4,26,158)
      CALL CRT(18,1,0)
C     TURN YELLOW LAMP ON
      IDATA=IDATA+1
      CALL LDUDC(3,IDATA)
      READ(IREAD,40)KODEA,KODEB
40    FORMAT(2A2)
C     YELLOW LAMP OFF
      IDATA=IDATA-1
      CALL LDUDC(3,IDATA)
C     ERASE INSTRUCTIONS
      CALL CRT(5,26,158)
      CALL CRT(6,26,158)
      CALL CRT(7,38,158)
      CALL CRT(8,38,158)
      CALL CRT(18,1,159)
      CALL PRLOW
C     CHECK IF KODEA=DA     DATA
      IF(KODEA-257)60,50,60
50    CALL CRT(5,26,0)
      WRITE(IPRTE,55)
55    FORMAT('PUT TAPE IN HSR,TURN HSR ON AND PRESS CONTINUE')
S     HLT
      CALL RIG1
      CALL CRT (5,26,158)
      GO TO 10
C     CHECK IF KODEA=PI     PIPE
60    IF(KODEA-1033)80,70,80
70    IDATA=0
      CALL DATA(1)
      GO TO 10
C     CHECK IF KODEA=OU     OUT
80    IF(KODEA-2[illegible]1)[illegible], ,1
90    CALL I[illegible]
      CALL OUT
      GO TO 10
```

```
C     CHECK IF KODEA=IN    IN
100   IF(KODEA-590)120,110,120
110   CALL INTCK
      CALL IN
      GO TO 10
120   IF(KODEA-344)140,130,140
130   GO TO 300
140   CALL CRT(4,26,0)
      WRITE(IWRTE,150)
150   FORMAT('ERROR IN INPUT CODE,ENTER CODE AGAIN')
      GO TO 10
300   CALL CRT(5,26,0)
      WRITE(IWRTE,101)
101   FORMAT('PROGRAM EXITING--TO RESTART PRESS CONTINUE')
5     HLT
      GO TO 5
      END
/
/
/
/       TIME SHARING          6/24/75
/
/
/
 OPDEF   CLAB    6133    /AC TO CLOCK BUFFER
 OPDEF   CLZE    6130    /CLEAR CLOCK ENABLE REGISTER PER AC
 OPDEF   CLDE    6132    /SET CLOCK ENABLE REGISTER PER AC
 OPDEF   CLSA    6135    /CLEAR CLOCK FLAG, TRANSFER STATUS TO AC
 OPDEF   UDLA    6363    /LOAD UDC ADDRESS
 OPDEF   UDRD    6366    /READ UDC DATA WORD
 OPDEF   UDLD    6367    /LOAD AC INTO UDC WORD
/
 SKPDF   UDSS    6351    /SKIP ON SCAN NOT BUSY
 SKPDF   CLSK    6131    /SKIP ON CLOCK FLAG
 SKPDF   SPL     6102    /SKIP ON POWER LOW FLAG
 SKPDF   UDSF    6361    /SKIP ON UDC FLAG, CLEAR FLAG
/
 OPDEF   ACL     7701    /LOAD MQ INTO AC
/
 OPDEF   GTF     6004    /GET THE FLAGS
 OPDEF   RTF     6005    /RESTORE THE FLAGS
 OPDEF   CDF0    6201    /CHANGE TO DATA FIELD 0
 OPDEF   CDF1    6211    /CHANGE TO DATA FIELD 1
 OPDEF   TADI    1400    /ADD INDIRECT
 OPDEF   DCAI    3400    /DEPOSIT INDIRECT
/
/
/
/       SAVE THE ENVIRONMENT
/
/
SAVE,   3416    /DCA I 0016       STORE AC
        7701    /ACL              LOAD MQ
        3416    /DCA I 0016       STORE MQ
        6004    /GTF              GET FLAGS
        3416    /DCA I 0016       STORE FLAGS
        1000    /TAD   0000       LOAD PC
        3416    /DCA I 0016       STORE PC
        6211    /CDF 1            LOAD FLOATING
        1624    /TAD I ACHI         AC HIGH
        6201    /CDF 0            STORE IT IN
        3416    /DCA I 0016         FIELD 0
        6211    /CDF 1            LOAD FLOATING
        1625    /TAD I ACMD         AC MID
        6201    /CDF 0            STORE IT IN
        3416    /DCA I 0016         FIELD 0
        6211    /CDF 1            LOAD FLOATING
        1626    /TAD I ACLO         AC LOW
        6201    /CDF 0            STORE IT IN
        3416    /DCA I 0016         FIELD 0
        JMP     CLKSK   /DETERMINE SOURCE OF INTERRUPT
ACHI,   0020    /FLOATING AC HIGH ADDRESS
ACMD,   0021    /FLOATING AC MID ADDRESS
ACLO,   0022    /FLOATING AC LO ADDRESS
TEMAC,  BLOCK 1
TEMFLG, BLOCK 1
TEMPC,  BLOCK 1
KCLAST, LAST
```

```
KESTAK, KESTAK   /POINTER TO FIRST WORD MINUS 1
RAC,    BLOCK 1  /RACKER AC
RMQ,    BLOCK 1  /       MQ
RFLAG,  BLOCK 1  /       FLAGS
RPC,    BLOCK 1  /       PC
RACHI,  BLOCK 1  /       ACHI
RACMD,  BLOCK 1  /       ACMD
RACLO,  BLOCK 1  /       ACLO
DAC,    BLOCK 1  /DRAW   AC
DMQ,    BLOCK 1  /       MQ
DFLAG,  BLOCK 1  /       FLAGS
DPC,    BLOCK 1  /       PC
DACHI,  BLOCK 1  /       ACHI
DACMD,  BLOCK 1  /       ACMD
LAST,   BLOCK 1  /       ACLO
N7,     7771     /MINUS7
CLKSK,  6131     /CLSK              CLOCK INTERRUPT?
        JMP      SHUTDN  /SHUTDOWN OPERATION IF NOT CLOCK INTERRUPT
        6135     /CLSA              YES-CLEAR CLOCK FLAG
        7300     /CLA CLL
CHKDYN, 1016     /TAD    0016       DOES AUTO0
        7041     /CIA                 POINT TO
        1232     /TAD    KELAST        END OF
        7440     /SZA                  STACK?
        5266     /JMP    CLKPOP     -NO
        1233     /TAD    KESTAK     -YES
        3016     /DCA    0016         RESET AUTO0
CLKPOP, 7300     /CLACLL
        1416     /TAD I  0016       RESTORE AC
        3227     /DCA    TEMAC        TEMPORARILY
        1416     /TAD I  0016       RESTORE MQ
        7421     /MQL                 AC TOMQ, CLEAR AC
        1416     /TAD I  0016       LOAD FLAGS
        3230     /DCA    TEMFLG       STORE TEMPORARILY
        1416     /TAD I  0016       LOAD PC
        3231     /DCA    TEMPC        STORE TEMPORARILY
        1416     /TAD I  0016       LOAD ACHI
        6211     /CDF 1                RESTORE
        3624     /DCA I  ACHI           IT
        6201     /CDF 0             LOAD
        1416     /TAD I  0016         ACMD
        6211     /CDF 1             RESTORE
        3625     /DCA I  ACMD           IT
        6201     /CDF 0             LOAD
        1416     /TAD I  0016         ACLO
        6211     /CDF 1             RESTORE
        3626     /DCA I  ACLO           IT
        6201     /CDF 0             RESET DATA FIELD
        1016     /TAD    0016       RESET AUTO0
        1252     /TAD    N7           FOR NEXT
        3016     /DCA    0016           INTERRUPT
        AND      (6777   /DO NOT RESTORE INTERRUPT BUS!!
        1230     /TAD    TEMFLG     LOAD FLAGS
        6005     /RTF                 RESTORE THEM
        7200     /CLA               DONT CLEAR LINK
        1227     /TAD    TEMAC      RESTORE AC
        5631     /JMP I  TEMPC        PROGRAM
\       ENTRY SHARE
SHARE,  BLOCK 2
CLSTRT, CLA CLL
        6221             /CDF 2
        TADI    (7604    /PICK UP RACKER S.A.
        DCA     RPC      /DEPOSIT IT IN THE STACK
        TADI    (7605    /PICK UP RACKER FLAGS
        DCA     RFLAG    /DEPOSIT IT IN THE STACK
        6201             / CDF 0 (CURRENT)
        DCA     RAC      /CLEAR EVERYTHING ELSE IN THE STACK
        DCA     RMQ
        DCA     RACHI
        DCA     RACMD
        DCA     RACLO
CLSTR2, CLA CLL
```

```
        6221             /CDF 2
        TADI    (7606    /PICK UP DRAWWORKS S.A.
        DCA     DPC      /DEPOSIT IT IN THE STACK
        TADI    (7607    /PICK UP DRAWWORKS FLAGS
        DCA     DFLAG    /DEPOSIT IT IN THE STACK
        6201             /CDF 0 (CURRENT)
        DCA     DAC
        DCA     DACHI
        DCA     DACMD
        DCA     LAST
        TAD     (7777    /DRAWWORKS MQ WILL CONTAIN A 7777
        DCA     DMQ
                         /QUERY UDC CHANNEL 1, BIT 7
                         /FOR AUTO/MANUAL STAYUS OF
                         /DRAWWORKS
        CLA CLL IAC      /LOAD A 1
        UDLA             /ADDRESS LOAD
        UDRD             /READ MODULE 1
        AND     (0020    /LOOK AT BIT 7
        SZA              /SKIP IF LO (=MANUAL)
        JMP     DEDINT   /AUTOMATIC OPERATION
        TAD     (7610    /MANUAL - POINT TIME SHARING
        DCA     DPC      /TO DUMMY DRAWWORKS PROGRAM
        TAD     (0022    /(IE LOCATION 27610)
        DCA     DFLAG
        /THE FOLLOWING CODE ASSUMES THIS ROUTINE IS LOADED
        /INTO FIELD 0. THIS PROGRAM MUST BE IN THE SAME
        /FIELD AS DEDICATED INTERRUPT LOCATION 00000.
DEDINT, CLA CLL
        TAD     KISAVE   /LOAD POINTER TO INTERRUPT ROUTINE
        DCA     0002     /DEPOSIT IT AT 00002
        TAD     INTJMP   /LOAD A 'JMP I 0002'
        DCA     0001     /DEPOSIT IT AT 00001
        TAD     KIPOWR   /LOAD POINTER TO POWER UP SEQUENCE
        DCA     0003     /STORE IT IN LOCATION 0003
        /SUBROUTINE EROR WHEN PROVIDED WITH A NEGATIVE ARGUMENT
        /WILL RETURN THE VALUE OF ICNST(10), WHICH IS THE NORMAL
        /STATUS OF THE INTERRUPT CHANNEL.
        CLA CLL CMA      /LOAD A MINUS 1
        DCA     NORMST
        CALL    1,EROR
        ARG     NORMST
UDCCL,  6364             /ENABLE UDC
        CLA CLL
        6355             /READ UDC STATUS
        SNA              /SKIP ON NON-ZERO AC
        JMP     UDCOK
        6353             /START SCAN
BUSY1,  UDSS             /SKIP ON SCAN NOT BUSY
        JMP     BUSY1
        6356             /READ ADDRESS SCANNER
        JMP     UDCCL    /CLEAR IT AGAIN
UDCOK,  UDSF             /CLEAR UDC FLAG
        NOP
        6035             /DISABLE TTY
        6020             /DISABLE PAPER TAPE
        6305             /CRT
        6762             /DECTAPE
        6364             /UDC ENABLE!!!!!
        CLA CLL CMA      /LOAD A 7777
        CLZE             /CLEAR CLOCK ENABLE REGISTER
        CLA CLL
        TAD     COUNT    /LOAD CLOCK BUFFER WORD
        CLAB             /LOAD CLOCK BUFFER
        CLA CLL
        TAD     ENABLE   /LOAD CLOCK ENABLE WORD
        CLDE             /SET ENABLE REGISTER
        CLA CLL
        TAD     KISTAK   /SET AUTO0 TO
        DCA     0016     / BEGINNING OF STACK
        JMP     CLKPOP
COUNT,  7773             /5 PULSES TO INTERRUPT
ENABLE, 5410             /1014 PULSES PER SECOND
KISAVE, SAVE             /POINTER TO INTERRUPT ENTRY
INTJMP, 5402             /JMP I 0002 FOR INTERRUPT
KIPOWR, POWRUP           /POINTER TO POWER UP SEQUENCE
PWRJMP, 5403             /JMP I 0003 FOR POWER UP
```

```
            /
            /EMERGENCY SHUTDOWN FOR POWER FAIL OR UDC INTERRUPT
            /
SHUTDN, CLA CLL
        TAD     (0003   /DE-ENERGIZE AUTO/MANUAL BUS
        UDLA
        CLA CLL
        UDLD
        TAD     PWRJMP  /LOAD A JMP I 0003 IN LOC 00000
        DCA     0000    /THIS IS IN CASE OF POWER FAIL RESTART
        SPL             /POWER FAILURE?
        JMP     UDCSK   /NO
        CLA CLL IAC     /YES-LOAD A 1
        DCA     LAMP
        JMP     STOP
UDCSK,  UDSF            /UDC INTERRUPT?
        JMP     UNREC   /NO-UNRECOGNIZED INTERRUPT
        CLA CLL         /YES-LOAD A ZERO
        UDLA            /LOAD ADDRESS OF INTERRUPT MODULE
        TAD     NORMST  /LOAD NORMAL STATUS OF CONTACT INTERRUPTS
        6357            /READ CHANGE OF STATE
        DCA     LAMP    /USE THIS TO SIGNAL REASON FOR INTERRUPT
        JMP     POWRUP
UNREC,  CLA CLL         /NO LAMP IS LIT FOR UNRECOGNIZED INTERRUPT
        DCA     LAMP
        JMP     POWRUP
STOP,   HLT
POWRUP, TAD     0016    /SET UP TO RESTORE THE PROGRAM
        TAD     M7      /THAT WAS INTERRUPTED. (IN CASE
        DCA     0016    /T.S. WAS NOT OPERATING)
        CALL    1,PWRUP
        ARG     LAMP
LAMP,   BLOCK 1
NORMST, 0000            /FROM COMMON (ICNST(10))
        ENTRY   CLPOP
CLPOP,  BLOCK 2
        JMP     CLKPOP  /USED TO RESTORE THE PROGRAM THAT WAS
                        /RUNNING AT TIME OF INTERRUPT
                        /(NO TIME-SHARING)
        ENTRY SHARI
SHARI,  BLOCK 2
        JMP     CLSTR2  /USED TO RESTART THE RACKER
                        /PROGRAM FROM THE POINT IT
                        /WAS INTERRUPTED AT,BUT
                        /RESTART THE DRAWWORKS FROM
                        /ITS BEGINNING OF CYCLE
        END
        SUBROUTINE PWRUP (LAMP)
S       SKPDF   CLSK    6131
S       SKPDF   UDSF    6361
S       OPDEF   TADI    1400
S       OPDEF   DCAI    3400
        COMMON  COSTR,XP,XR,XC,XSTOR,YSTOU,YSTOI,XWST,YWELL,YSTBY,
      1 XSTP1,XSTP2,YSTP1,YSTP2,DROWU,SROWU,XLIFT,DRW1,DRW2,
      2 DRW3,DRW4,DRW5,DRW6,DRW7,DRW8,DRW9,DRW10,XHOLE,
      3 VELOC,DEPTH,
      4 ICNST,NPLNE,NRUBR,NCOLR,NSTD,IBSX,IBSYU,IBSYI,IBWSX,
      5 IBWY,IBSTY,IBYU,IBYI,NY1,NY2,NXSW1,NXSW2,NYSU1,
      6 NYSU2,NYSI1,NYSI2,NYSS1,NYSS2,NSTAB,IBSTB,
      7 IDRW1,IDRW2,IDRW3,IDRW4,IDRW5,IDRW6,IDRW7,IDRW8,
      8 IDRW9,IDR10,IDR11,IDR12,IDR13,IDR14,IDR15,IDR16,
      9 IDR17,IDR18,IDR19,IFLG1,IFLG2,IFLG3,IFLG4,IFLG5,
      A IFLG6,IFLG7,IFLG8,IFLG9,IREAD,IWRTE,KODE1,KODE2,
      B KODE3,KODEP,IDATA,LP,LR,LC,KOD7,KOD10,KOD11,KOD12,
      C KOUNT,NRUBT
        DIMENSION COSTR(25),ICNST(10),LP(90),LR(90),LC(30),
      1 VELOC(8),DEPTH(7)
C       DISABLE ALL INTERRUPTS
S       CLA CLL
S       6040    /SET TELEPRINTER FLAG FOR POWERFAIL
S       6035    /KEYBOARD
S       6020    /PAPER TAPE
S       6305    /CRT
S       6762    /DECTAPE
```

```
S        CLA CLL CMA
S        6130   /DISABLE CLOCK
S        CLA CLL
S        CLSK     /CLEAR CLOCK FLAG
S        NOP
S        UDSF     /CLEAR UDC FLAG
S        NOP
C        RED LAMP ON
         IWORD=4
         IBITS=2
S        JMS      LDIOF    /LOAD THE UDC
C        INTERRUPT LAMP ON
         IWORD=7
         IBITS=LAMP
S        JMS      LDIOF    /LOAD THE UDC
C        IF INTERRUPT WAS POWER FAIL, SET KODEP
         IF (LAMP-1) 3Ø,2Ø,3Ø
    2Ø   KODEP=1
    3Ø   CALL PRLOW
C        WAS TIME-SHARING ACTIVE?
         IF (IFLG8) 1ØØ,15Ø,1ØØ
C        TIME SHARING WASN'T ACTIVE
C        TYPE 1 RESTART
   1ØØ   ITYPE=1
S        TAD      \ITYPE   /DISPLAY ITYPE IN AC
S        HLT               /WAIT FOROPERATOR TO HIT CONTINUE
S        CLA CLL
         IWORD=1Ø
         IBITS=KOD1Ø
S        JMS      LDIOF    /LOAD THE UDC
         IWORD=3
         IBITS=IDATA
S        JMS      LDIOF    /LOAD THE UDC
         IWORD = 4
         IBITS=KODE3
         JMS      LDIOF    /LOAD THE UDC
C        TURN OFF INTERRUPT LAMP
         IWORD=7
         IBITS=0
S        JMS      LDIOF
         CALL CLPOP
C
C        TIME SHARING WAS ENABLED
C        RESET ALL FLAGS
   15Ø   IFLG1=-1
         IFLG2=-1
         IFLG3=-1
         IFLG6=-1
         IFLG7=-1
C        WERE CALCULATIONS IN PROGRESS?
C        (IE WERE RACKERS AT PAUSE?)
         IF (KODE2) 2ØØ,4ØØ,2ØØ
C        RACKERS WERE AT PAUSE
   2ØØ   ITYPE=2
         GO TO 6ØØ
C
C        RACKERS WERE NOT AT PAUSE
   4ØØ   ITYPE=3
C        RESTART DRAWWORKS AND RACKERS FROM BEGINNING OF CYCLE
C        SET UP RACKER RESTART ADDRESS AS THE RACKER STARTING ADDRESS
S        6224              /RIF
S        TAD      (62Ø1    /SET UP CDF CURRENT INSTRUCTION
S        DCA      CDFC
S        6221              /CDF2
S        TADI     (7611    /LOAD RACKER RESTART ADDRESS
S        DCAI     (76Ø4    /USE IT AS RACKER STARTING ADDRESS
S CDFC,  BLOCK 1
   6ØØ   CONTINUE
S        TAD      \ITYPE   /DISPLAY TYPE OF RESTART IN AC
S        HLT
S        CLA CLL
S        TAD      \IDATA
S        AND      (ØØ26    /PRESERVE LEFT/RIGHT AND AUTO/MAN BITS
S        DCA      \IDATA
         IWORD=1Ø
C        SELECT PROPER TONG SEQUENCE
```

```
          IBITS=0
          GO TO (620,610),KODE1
    610   IBITS=128
    620.  CONTINUE
  S       JMS       LDIOF    /LOAD THE UDC
          IWORD=3
          IBITS=IDATA
  S       JMS       LDIOF    /LOAD THE UDC
          IWORD=4
          IBITS=1536
  S       JMS       LDIOF    /Y AXIS AND GREEN LAMP
          IWORD=7
          IBITS=0
  S       JMS       LDIOF    /TURN OFF INTERRUPT LAMP
  C       WAIT FOR RESTART
  S WAIT, CLA CLL IAC
  S       6363      /LOAD ADDRESS
  S       6366      /READ DATA
  S       AND       (0400    /RESTART BIT ON?
  S       SNA
  S       JMP       WAIT     /NOT YET
  S       CLA CLL            /YES-CONTINUE
  C       DELAY TO ALLOW AUTO BUS TO ACTUATE
          CALL DELAY (60)
          KODE3=1024
          IWORD=4
          IBITS=1024
  S       JMS       LDIOF    /LOAD THE UDC
  C       CHECK THAT INTERRUPTS ARE RESTORED TO NORMAL STATUS
          CALL INTCK
  S       IOF
    700   GO TO (700,800,900),ITYPE
          GO TO 700
    800   CALL SHAR1
    900   CALL SHARE
  S LDIOF,          0000     /LOADS THE UDC, BUT DOESN'T MESS WITH INTERRUPT
  S       CLA CLL
  S       TAD       \IWORD
  S       6363               /LOAD ADDRESS
  S       TAD       \IBITS
  S       6367               /LOAD DATA
  S       JMP I     LDIOF    /RETURN
          END
```

IN, OUT, INB, OUT B

```
  C       --------------------------------------------------------------
  C
  C       ROUTINE TO GO IN THE HOLE
  C
  C       --------------------------------------------------------------
          SUBROUTINE IN
  S       OPDEF   TADI     1400
  S       OPDEF   DCAI     3400
          COMMON  COSTR,XP,XR,XC,XSTOR,YSTOU,YSTOI,XWST,YWELL,YSTBY,
      1   XSTP1,XSTP2,YSTP1,YSTP2,DROWU,SROWU,XLIFT,DRW1,DRW2,
      2   DRW3,DRW4,DRW5,DRW6,DRW7,DRW8,DRW9,DRW10,XHOLE,
      3   VELOC,DEPTH,
      4   ICNST,NPLNE,NRUBR,NCOLR,NSTD,IBSX,IBSYU,IBSYI,IBWSX,
      5   IBWY,IBSTY,IBYU,IBYI,NY1,NY2,NXSW1,NXSW2,NYSU1,
      6   NYSU2,NYSI1,NYSI2,NYSS1,NYSS2,NSTAB,IBSTB,
      7   IDRW1,IDRW2,IDRW3,IDRW4,IDRW5,IDRW6,IDRW7,IDRW8,
      8   IDRW9,IDR10,IDR11,IDR12,IDR13,IDR14,IDR15,IDR16,
      9   IDR17,IDR18,IDR19,IFLG1,IFLG2,IFLG3,IFLG4,IFLG5,
      A   IFLG6,IFLG7,IFLG8,IFLG9,IREAD,IWRTE,KODE1,KODE2,
      B   KODE3,KODEP,IDATA,LP,LR,LC,KOD7,KOD10,KOD11,KOD12,
      C   KOUNT,NRUBT
          DIMENSION COSTR(25),ICNST(10),LP(90),LR(90),LC(30),
      1   VELOC(8),DEPTH(7)
          KODE1=2
          IFLG4=-1
          IFLG5=-1
          IFLG6=-1
          IFLG7=-1
          JCOD1=1
          JCOD2=3
  C       SET IC'S FOR DRAWWORKS OPERATIONS (TONG MAKE-UP SEQUENCE SELECTE
     D)
```

```
          KOD10=128
          CALL LDUDC (10,KOD10)
          IDATA=18
          IF(KOUNT-90)5,5,1
 1        JCOD1=3
          JCOD2=1
          IDATA=20
 5        JDATA=IDATA
          CALL LDUDC(3,IDATA)
          CALL CRT(2,26,0)
          WRITE(IWRTE,10)
 10       FORMAT('GOING IN THE HOLE')
          CALL DSCHG(NN)
          IF(NN)80,120,60
 C        READ SINGLES DATA
 60       CALL DATA(2)
          GO TO 120
 80       NN=-NN
 C        COMPUTE NEW COLLAR LENGTH IN THE HOLE
          XP1=0.
          DO 90 N=1,NN
          XX=LC(N)
          XX=XX/100.+30.
 90       XP1=XP1+XX
          XC=XC-XP1
 C        REARRANGE LENGTHS OF REMAINING SINGLES IN THE MEMORY
          N1=NN+1
          DO 100 N=N1,NCOLR
          NN1=N-NN
 100      LC(NN1)=LC(N)
 C        COMPUTE NO OF SINGLE COLLARS IN HOLE
          NCOLR=NCOLR-NN
 120      CALL TTY
 C        DISPLAY DATA ON CRT
 C        SELECT Y AXIS
          KODE3=1024
          CALL LDUDC(4,KODE3)
 C        SEE IF VELOCITY CHANGE IS DESIRED
          CALL VELIN
          NADD=0
          NLIFT=-2
          CALL SPEED
          CALL INB (X,NADD,NLIFT)
          ISKP=-1
 C        PROGRAM PAUSE=YAXIS+GREEN LAMP
          KODE3=1536
          CALL EROR(1)
 C        DELAY TO ALLOW AUTO BUS TO ACTUATE
          CALL DELAY (30.)
 C        INTERROGATE DRAWWORKS AUTO/MANUAL CHANNEL
 C        MODE=0 FOR AUTO
 C        MODE=-1 FOR MANUAL
          CALL INTRG (1,7,MODE)
          MODE=MODE-2
 C        TURN ON DRAWWORKS 'AUTO DISABLE' IF DRAWWORKS IS MANUAL
          IF (MODE) 130,135,135
   130    CALL LDUDC (13,2)
   135    CONTINUE
 C
 C        ENTER TIME SHARING MODE
 C
 S        IOF
 S        6224              /RIF
 S        TAD      (6201    /SET UP CDF INSTRUCTION
 S        DCA      CDF1
 S        TAD      CDF1
 S        DCA      CDF2
 S        TAD      CDF1
 S        DCA      CDF3
 S        TAD      POINT    /LOAD POINTER TO IN
 S        6221              /CDF 2
 S        DCAI     (7604    /DEPOSIT IT AT 27604
 S        TADI     (7602    /LOAD 'PUSH' SA FROM 27602
 S        DCAI     (7606    /DEPOSIT IT AT 27606
 S        TADI     (7603    /LOAD 'PUSH' FLAG
 S        DCAI     (7607    /DEPOSIT IT AT 27607
 S CDF1,  BLOCK 1           /CDF WILL GO HERE
 S        6224              /RIF
```

```
S       DCA     CDF1    /SET UP FLAG FOR 'IN'
S       CLL
S       TAD     CDF1
S       RTR
S       RAR
S       TAD     CDF1
S       6221            /CDF 2
S       DCAI    (7605   /DEPOSIT FLAG AT 27605
S CDF2, BLOCK 1         /CDF WILL GO HERE
S       TAD     POIN
S       6221
S       DCAI    (7611
S CDF3, BLOCK 1
        IFLG8=0
        CALL SHARE
S       JMP     ENTER
S POINT,        ENTER   /POINTER TO CONTINUING ADDRESS OF 'OUT'
S ENTER,        NOP     /TIME SHARING WILL BEGIN HERE
        CALL CLAWS(1)
C       MOVE RACKERS BACK 8 IN. FROM STORAGE POSITION
        CALL RACK(NY1,NY1,NY2,NY2,IBSYU,IBSYI,2)
C       SELECT X AXIS
        CALL AXCHG(1)
C       MOVE RACKERS TO WELL C. L.
        CALL RACK(NXSW1,NXSW1,NXSW2,NXSW2,IBSX,IBSX,3)
C       SELECT Y AXIS
        CALL AXCHG(2)
C       MOVE RACKERS TO STANDBY POSITION
        CALL RACK(NYSU1,NYSI1,NYSU2,NYSI2,IBYU,IBYI,4)
        IRYU=IBSTY
        YRAKU=YSTBY-YWELL
        KODE2=-1
        GO TO 204
  200   CONTINUE
        NADD=0
C       CHECK PAUSE SWITCH
        CALL INTRG (2,0,IEROR)
        GO TO  (204,202),IEROR
C       RETRACT TO STANDBY FOR PAUSE
  202   CALL RACK(NYSS1,NYSS1,NYSS2,NYSS2,IBWY,IBWY,2)
C       DRAWWORKS: RACKERS CLEAR OF WELL CL
        IFLG7=0
S       JMP     ENTE
S POIN, ENTE
S ENTE, NOP
        KODE2=-1
C       INTERROGATE DS AND NO DS CHANGE BUTTONS
        CALL DSCHG(NADD)
        IRYU=IBSTY
        YRAKU=YSTBY-YWELL
  204   KODE2=-1
        IF (NSTD) 600,600,205
  205   IF (ISKP) 209,208,209
  208   CONTINUE
        CALL INB (X,NADD,NLIFT)
  209   CONTINUE
        ISKP=0
C       TURN ON PAUSE LAMP, ALLOW AUTO DISABLE
        CALL QUERY (0,0,-1,11)
C       CHECK PAUSE SWITCH
        CALL INTRG (2,0,IEROR)
        GO TO (215,210),IEROR
C       IS VELOCITY CHANGE DESIRED?
  210   CALL INTRG (2,9,IEROR)
        GO TO (209,211),IEROR
  211   CALL VELIN
        GO TO 209
  215   CALL QUERY(2,0,0,11)
        CALL SPEED
        XYY=(X/100.+30.)*12.+16.+COSTR(17)
        X=(X/100.+30.)*12.-4.+COSTR(1)
        XY=X
```

```
      X=X+4.
      CALL PRLOW
      DROWL=D(COSTR(5),COSTR(6),X)
      SROWL=D(COSTR(9),COSTR(10),X)
      CALL LOCAN(KOUNT,DROWU,SROWU,NROW,NCOLN,XUL,YU)
      CALL LOCAN(KOUNT,DROWL,SROWL,NROW,NCOLN,XUL,YL)
C     GET THE DISTANCE IN Y DIRECTION
      X=YU-YRAKU+10.
      XX=YL-YRAKU+10.
      CALL RAMP(X,YSTP1,YSTP2,N1UY,N2UY)
      CALL RAMP(XX,YSTP1,YSTP2,N1IY,N2IY)
      NSTD=NSTD-1
      KOUNT=KOUNT-1
      KODE2=0
C     MOVE RACKERS TO REQ'D ROW+10. INCHES
      CALL RACK(N1UY,N1IY,N2UY,N2IY,IRYU,IRYU,2)
C     SIGNAL DRAWWORKS THAT RACKERS ARE CLEAR OF WELL CL
      IFLG7=0
C     SELECT X AXIS
C     GET RAMP DATA
      CALL RAMP(XUL,XSTP1,XSTP2,N1UX,N2UX)
C     MOVE RACKERS TO REQ'D COLUMN POSITION
      CALL AXCHG(1)
      CALL RACK(N1UX,N1UX,N2UX,N2UX,IBWSX,IBWSX,JCOD1)
      CALL LIFTH(1,XY)
      X=YU+YWELL+10.
      XX=YL+YWELL+10.
      CALL BITS(COSTR(16),X,IRYU)
      CALL BITS(COSTR(16),XX,IRYI)
      CALL AXCHG(2)
C     REOPEN CLAWS IN CASE THEY DRIFTED CLOSED 4/25/75
      CALL CLAWS(1)
      CALL RACK(NY1,NY1,NY2,NY2,IRYU,IRYI,4)
C     CLOSE UPPER AND LOWER CLAWS. DELAY 2 SEC TO LET PIPE SETTLE 4/2
 /75
      CALL DELAY (COSTR(20))
      CALL CLAWS(2)
C     OPEN FINGER LATCH
      CALL LATCH(NCOLN,NROW,2)
C     LIFT HEAD TO ENGAGE JOINT AT CREEP VELECITY, THEN RAISE
C     IT BY NOMINAL HT + TOLERENCE - NORMAL VELOCITY
      XLIF=XLIFT
      CALL LIFTH (2,XLIF)
C     MOVE RACKERS TO WELL C. L.
      GO TO (220,220,218),JCOD1
  218 XUL=-XUL
  220 X=XUL+XWST
      CALL BITS(COSTR(15),X,IRX)
      CALL AXCHG(1)
      CALL RACK(N1UX,N1UX,N2UX,N2UX,IRX,IRX,JCOD2)
C     SELECT Y AXIS
C     MOVE RACKERS TO STAND BY POSITION
      YRAKI=YL+YWELL
      YRAKU=YU+YWELL
      CALL BITS(COSTR(16),YRAKI,IRYI)
      CALL BITS(COSTR(16),YRAKU,IRYU)
      YL=YRAKI-YSTBY
      YU=YRAKU-YSTBY
      CALL RAMP(YU,YSTP1,YSTP2,N1UY,N2UY)
      CALL RAMP(YL,YSTP1,YSTP2,N1IY,N2IY)
      CALL AXCHG(2)
      CALL RACK(N1UY,N1IY,N2UY,N2IY,IRYU,IRYI,4)
C     POSITION LIFTING HEAD ABOVE JOINT HEIGHT
      CALL LIFTH(1,XYY)
      IDATA=JDATA
C     RESTART IF MANUAL DRAWWORKS
      IF (MODE) 310,320,310
  310 KODE3=1536
      CALL EROR (1)
      GO TO 330
  320 CONTINUE
C     IS BLOCK RETRACTED?
      CALL QUERY (1,5,1,5)
C     IS STABBER EXTENDED?
      CALL QUERY (2,2,1,12)
  330 CONTINUE
C     SIGNAL RACKERS AT WELL CENTERLINE
      IFLG7=-1
```

```
C       MOVE PIPE BEYOND WELL CL FOR STABBING
        CALL RACK(NYSS1,NYSS1,NYSS2+NSTAB,NYSS2+NSTAB,IBSTY,IBSTY,4)
        CALL LIFTH(4,X)
C       BACK OFF FROM STABBING POSITION TO WELL CL   4/28/75
        CALL RACK (0,0,NSTAB,NSTAB,IBSTB,IBSTB,2)
C       SIGNAL DRAWWORKS THAT PIPE HAS BEEN STABBED
        IFLG6=0
C       SIGNAL TONGS TO MAKE-UP JOINT
        CALL LDUDC (8,2)
        CALL TTY
        CALL CRT (17,28,0)
        WRITE (IWRTE,350) NSTD
  350   FORMAT (I3)
C       RESTART IF MANUAL DRAWWORKS
        IF (MODE) 360,370,360
  360   KODE3=1536
        CALL EROR (1)
        CALL QUERY (1,6,1,6)
        GO TO 400
  370   CONTINUE
C       JOINT MADE UP, JAWS RETRACTED?
        CALL QUERY (2,8,1,8)
C       IS ELEVATOR LOCKED?
        CALL QUERY (1,6,1,6)
C       IS ELEVATOR LOAD ACQUIRED?
        CALL QUERY (2,1,1,13)
 400    CALL CLAWS(1)
 410    IRYU=IBWY
        YRAKU=0.
        GO TO 200
C       DRAWWORKS: NO MORE PIPE TO BE TRIPPED
  600   IFLG4=0
        YU=YSTOU+10.-YRAKU
        YL=YSTOI+10.-YRAKU
        CALL RAMP(YU,YSTP1,YSTP2,N1UY,N2UY)
        CALL RAMP(YL,YSTP1,YSTP2,N1IY,N2IY)
        CALL RACK(N1UY,N1IY,N2UY,N2IY,IRYU,IRYU,2)
        IFLG7=0
        CALL AXCHG(1)
        CALL RACK(NXSW1,NXSW1,NXSW2,NXSW2,IBWSX,IBWSX,1)
        CALL AXCHG(2)
        CALL RACK(NY1,NY1,NY2,NY2,IBYU,IBYI,4)
C       CLOSE CLAWS
        CALL CLAWS(2)
C       DISCONTINUE TIME SHARING WHEN DRAWWORKS CYCLE IS COMPLETE
        IF (MODE) 680,670,680
C       TURN ON AUTO DISABLE FOR RACKERS
  670   CALL LDUDC (12,2)
        IF (IFLG5) 670,680,670
  680   IFLG5=-1
C
C       DISCONTINUE TIME SHARING
C
S       IOF
S       CLA CLL          /DISABLE
S       CMA              /CLOCK
S       6130             /INTERRUPT
S       ION
S       CLA CLL
        IFLG8=-1
        CALL CRT(5,26,0)
        WRITE(IWRTE,700)
 700    FORMAT('GOING IN SEQUENCE COMPLETED')
        IDATA=0
        CALL LDUDC(3,IDATA)
        KODE3=0
        CALL LDUDC(4,KODE3)
        CALL LDUDC (12,0)
        CALL LDUDC (13,0)
        KOD10=0
        CALL LDUDC (10,KOD10)
        CALL CRT(5,26,158)
        CALL PRLOW
        RETURN
        END
```

```
C     ------------------------------------------------------------------
C
C      ROUTINE TO COME OUT OF HOLE
C
C     ------------------------------------------------------------------
       SUBROUTINE OUT
S      OPDEF    TADI      1400
S      OPDEF    DCAI      3400
       COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
       DIMENSION COSTR(25),ICNST(10),LP(90),LR(90),LC(30),
     1 VELOC(8),DEPTH(7)
       KODE1=1
       IFLG1=-1
       IFLG2=-1
       IFLG3=-1
       IFLG4=-1
       IFLG5=-1
       KNTRL=1
C      SET IC'S FOR DRAWWORKS OPERATION (TONG BREAK OUT SELECTED)
       KOD10=0
       CALL LDUDC (10,KOD10)
       IDATA=16
       CALL LDUDC(3,IDATA)
       CALL CRT(2,26,0)
       WRITE(IWRTE,10)
10     FORMAT('COMING OUT OF HOLE')
       CALL CRT(5,26,0)
       WRITE(IWRTE,15)
15     FORMAT(41HINPUT SIDE OF R B FROM DERRICKMAN'S SIDE,)
       CALL CRT(6,26,0)
       WRITE(IWRTE,16)
16     FORMAT('L-LEFT, R-RIGHT')
       IDATA=17
       CALL LDUDC(3,IDATA)
20     CALL CRT(18,1,0)
       READ(IREAD,30)ISIDE
30     FORMAT(A1)
       IF(ISIDE-800)50,40,50
40     JCODE=1
       IKODE=3
       KOUNT=90
       IDATA=20
       GO TO 60
50     IF(ISIDE-1184)52,55,52
52     CALL CRT(4,26,0)
       WRITE(IWRTE,53)
53     FORMAT('ERROR IN INPUT,ENTER SIDE AGAIN')
       I=0
       J=-20
S LOOP, NOP
S      ISZ      \I
S      JMP      LOOP
S      ISZ      \J
S      JMP      LOOP
S      CLA CLL
       CALL CRT(18,1,158)
       CALL CRT(4,26,158)
       GO TO 20
55     IKODE=1
       JCODE=3
       KOUNT=0
       IDATA=18
60     CALL CRT(18,1,158)
```

```
         JDATA=IDATA
         CALL CRT(5,26,158)
         CALL CRT(6,26,158)
         CALL LDUDC (3,IDATA)
C        GET INITIAL DRAWWORKS POSITION DATA
         CALL OUTB (XL,KNTRL,NDISD,2)
         IDRW7=IDR17
C        PAUSE BEFORE BEGINNING OPERATIONS
         CALL VELIN
         CALL SPEED
         KODE3=1536
         CALL EROR (1)
C        DELAY TO ALLOW AUTO BUS TO ACTUATE
         CALL DELAY (30.)
C        INTERROGATE DRAWWORKS AUTO/MANUAL CHANNEL
C        MODE = 0 FOR AUTO
C        MODE = -1 FOR MANUAL
         CALL INTRG (1,7,MODE)
         MODE =MODE-2
C        TURN ON DRAWWORKS 'AUTO DISABLE' IF DRAWWORKS IS MANUAL
         IF (MODE) 70,75,75
      70 CALL LDUDC (13,2)
      75 CONTINUE
C
C        ENTER TIME SHARING MODE
C
S        IOF
S        6224               /RIF
S        TAD      (6201     /SET UP CDF INSTRUCTION
S        DCA      CDF1
S        TAD      CDF1
S        DCA      CDF2
S        TAD      CDF1
S        DCA      CDF3
S        TAD      POINT     /LOAD POINTER TO OUT
S        6221               /CDF 2
S        DCAI     (7604     /DEPOSIT IT AT 27604
S        TADI     (7600     /LOAD 'PULL' SA FROM 27600
S        DCAI     (7606     /DEPOSIT IT AT 27606
S        TADI     (7601     /LOAD PULL FLAG
S        DCAI     (7607     /DEPOSIT IT AT 27607
S CDF1,  BLOCK 1            /CDF WILL GO HERE
S        6224               /RIF
S        DCA      CDF1      /SET UP FLAG FOR 'OUT'
S        CLL
S        TAD      CDF1
S        RTR
S        RAR
S        TAD      CDF1
S        6221               /CDF 2
S        DCAI     (7605     /DEPOSIT FLAG AT 27605
S CDF2,  BLOCK 1            /CDF WILL GO HERE
S        TAD      POIN
S        6221
S        DCAI     (7611
S CDF3,  BLOCK 1
         IFLG8=0
         CALL SHARE
S        JMP      ENTER
S POINT,          ENTER     /POINTER TO CONTINUING ADDRESS OF 'OUT'
S ENTER,          NOP       /TIME SHARING WILL BEGIN HERE
         CALL CLAWS(1)
         KODE3=1024
         CALL LDUDC(4,KODE3)
         CALL RACK(NY1,NY1,NY2,NY2,IBSYU,IBSYI,2)
         CALL AXCHG(1)
         CALL RACK(NXSW1,NXSW1,NXSW2,NXSW2,IBSX,IBSX,3)
         CALL AXCHG(2)
         CALL RACK(NYSU1,NYSI1,NYSU2,NYSI2,IBYU,IBYI,4)
S        JMP      ENTE
S POIN,  ENTE
S ENTE,  NOP
     100 CONTINUE
         KODE2=-1
         IDATA=JDATA
         NDISD=0
```

```
C       CHECK FOR PAUSE SWITCH
        CALL INTRG (2,0,IEROR)
        GO TO (180,150),IEROR
  150   CALL DSCHG (NDISD)
  180   CALL OUTB (XL,KNTRL,NDISD,1)
        GO TO (201,650),KNTRL
C       SUBTRACT 12 INCHES FROM PDL 4/25/75
  201   PDL=XL*12.+COSTR(17)-COSTR(22)-12.
        CALL LIFTH(1,PDL)
C       WAIT FOR RESTART IF MANUAL DRAWWORKS
        IF (MODE) 220,209,220
  220   KODE3=1536
        CALL EROR (1)
        GO TO 225
  209   CONTINUE
C       CHECK FOR PAUSE SWITCH
        CALL INTRG (2,0,IEROR)
        GO TO (215,210),IEROR
  210   CALL QUERY (0,0,-1,11)
C       VELOCITY CHANGE DESIRED?
        CALL INTRG (2,9,IEROR)
        GOTO (209,211),IEROR
  211   CALL VELIN
        GO TO 209
C       SIGNAL DRAWWORKS HANG-UP
  215   CALL QUERY (0,0,-1,10)
        IF (IFLG1) 209,217,209
C       THIS IS JUST IN CASE AUTO DISABLE HAD BEEN ACTUATED
  217   CALL QUERY (2,0,0,11)
        CALL SPEED
        IFLG1=-1
  225   CONTINUE
        IDRW7=IDR17
        KODE2=0
C       OPEN CLAW IN CASE IT DRIFTED CLOSED 4/25/75
        CALL CLAWS(1)
        CALL RACK(NYSS1,NYSS1,NYSS2,NYSS2,IBSTY,IBSTY,4)
        CALL CLAWS(2)
C       SIGNAL DRAWWORKS THAT RACKER ARMS HAVE PIPE
        IFLG2=0
C       WAIT FOR RESTART IF MANUAL DRAWWORKS
        IF(MODE) 230,235,230
  230   KODE3=1536
        CALL EROR (1)
        GO TO 240
  235   CONTINUE
C       JOINT BROKEN OUT?
        CALL QUERY (2,8,1,8)
  240   CONTINUE
        CALL LIFTH(2,COSTR(23))
        PSN=XL*12.+COSTR(1)
        DROWL=D(COSTR(5),COSTR(6),PSN)
        SROWL=D(COSTR(9),COSTR(10),PSN)
        CALL LOCAN(KOUNT,DROWU,SROWU,NROW,NCOLN,XUL,YU)
        CALL LOCAN(KOUNT,DROWL,SROWL,NROW,NCOLN,XUL,YL)
        CALL RAMP(YU,YSTP1,YSTP2,N1UY,N2UY)
        CALL RAMP(YL,YSTP1,YSTP2,N1IY,N2IY)
C       BLOCK RETRACTED?
        CALL QUERY (1,5,1,5)
        CALL RACK(N1UY,N1IY,N2UY,N2IY,IBWY,IBWY,2)
C       SIGNAL DRAWWORKS THAT ARMS ARE CLEAR OF WELL CL
        IFLG3=0
        CALL AXCHG(1)
        CALL RAMP(XUL,XSTP1,XSTP2,N1UX,N2UX)
        CALL RACK(N1UX,N1UX,N2UX,N2UX,IBWSX,IBWSX,IKODE)
        CALL LIFTH(3,XL)
        CALL LATCH(NCOLN,NROW,1)
        CALL CLAWS(1)
        CALL CRT(17,28,0)
        WRITE(IWRTE,300)NSTD
  300   FORMAT(I3)
        YRAKI=YL+YWELL
        CALL BITS(COSTR(16),YRAKI,IRYI)
        YRAKU=YU+YWELL
        CALL BITS(COSTR(16),YRAKU,IRYU)
```

```
      CALL AXCHG (2)
      CALL RACK(NY1,NY1,NY2,NY2,IRYU,IRYI,2)
      GO TO (440,440,430),IKODE
430   XUL=-XUL
440   XRACK=XUL+XWST
      CALL BITS(COSTR(15),XRACK,IRX)
      CALL AXCHG(1)
      CALL RACK(N1UX,N1UX,N2UX,N2UX,IRX,IRX,JCODE)
      YRAKU=YRAKU+10.
      YRAKI=YRAKI+10.
      CALL BITS(COSTR(16),YRAKU,IRYU)
      CALL BITS(COSTR(16),YRAKI,IRYI)
      YU=YRAKU-YSTBY
      YL=YRAKI-YSTBY
      CALL RAMP(YU,YSTP1,YSTP2,N1U,N2U)
      CALL RAMP(YL,YSTP1,YSTP2,N1I,N2I)
      CALL AXCHG(2)
      CALL RACK(N1U,N1I,N2U,N2I,IRYU,IRYI,4)
      GO TO 100
650   KODE2=0
      CALL RACK(NYSU1,NYSI1,NYSU2,NYSI2,IBSTY,IBSTY,2)
      CALL AXCHG(1)
      CALL RACK(NXSW1,NXSW1,NXSW2,NXSW2,IBWSX,IBWSX,1)
      CALL AXCHG(2)
      CALL RACK(NY1,NY1,NY2,NY2,IBYU,IBYI,4)
      CALL CLAWS (2)
      IF (MODE) 680,670,680
670   CALL LDUDC (12,2)
      IF (IFLG5) 670,680,670
680   IFLG5=-1
      IFLG4=-1
C
C
S     IOF
S     CLA CLL         /DISABLE
S     CMA              /CLOCK
S     6130              /INTERRUPT
S     CLA CLL
      IFLG8=-1
S     ION
      IDATA=0
      CALL LDUDC(3,IDATA)
      KODE3=0
      CALL LDUDC(4,KODE3)
      CALL LDUDC (12,0)
      CALL LDUDC (13,0)
      KOD10=0
      CALL LDUDC (10,KOD10)
      CALL CRT(5,26,0)
      WRITE(IWRTE,700)
700   FORMAT('COMING OUT SEQUENCE COMPLETED')
      RETURN
      END
C     ------------------------------------------------------------
C
C     ROUTINE TO INSERT SINGLES INTO DRILL STRING (IN HOLE ONLY)
C
C     ------------------------------------------------------------
      SUBROUTINE INB (X,NADD,NLIFT)
      COMMON COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
      DIMENSION COSTR(25),ICNST(10),LP(90),LR(90),LC(30),
     1 VELOC(8),DEPTH(7)
C     IF NO PIPES ADDED, SKIP THE REARRANGING
      IF (NADD) 340,340,90
```

```
   90      IF (NRUBR) 100,100,250
C
C          ADD PLAIN PIPES
C
  100      NN=3*NSTD-NRUBT
           NTOT=NPLNE+NN+NADD
           DO 200 J=1,NN
           KK=NTOT-J+1
           LL=KK-NADD
  200      LP(KK)=LP(LL)
           GO TO 320
C
C          ADD RUBBER PIPES
C
  250      NN=3*NSTD
           NTOT=NRUBR+NN+NADD
           DO 300 J=1,NN
           KK=NTOT-J+1
           LL=KK-NADD
  300      LR(KK)=LR(LL)
C
C          READ IN AND DISPLAY DATA
C
  320      CALL DATA (2)
           CALL TTY
C
C          UPDATE INHOLE PIPE LENGTHS
C
  340      NLIFT=NLIFT+3+NADD
           X=LP(NLIFT)
           XX=0.
           STLEN=0.
  350      IF (NSTD-NRUBT/3-1) 360,370,390
C
C          NEXT STAND IS ALL RUBBERS
  360      NRUBR=NRUBR+3
           LL=NRUBR-2
           DO 365 J=LL,NRUBR
  365      XX=XX+FLOAT(LR(J))/100.+30.
           XR=XR+XX
           X=LR(NLIFT)
           GO TO 400
C
C          NEXT STAND IS PART PLAIN, PART RUBBER
C
  370      LL=NPLNE+1
           NRUBR=NRUBT-(NRUBT/3)*3
           NPLNE=3-NRUBR+NPLNE
           DO 375 J=LL,NPLNE
  375      XX=XX+FLOAT(LP(J))/100.+30.
           XP=XP+XX
           STLEN=XX
           XX=0.
           DO 380 J=1,NRUBR
  380      XX=XX+FLOAT(LR(J))/100.+30.
           XR=XR+XX
           NLIFT=NRUBR-2
           GO TO 400
C
C          NEXT STAND IS ALL PLAIN
C
  390      NPLNE=NPLNE+3
           LL=NPLNE-2
           DO 395 J=LL,NPLNE
  395      XX=XX+FLOAT(LP(J))/100.+30.
           XP=XP+XX
  400      CONTINUE
           STLEN=STLEN+XX
           IDRW7=IFIX((STLEN*12.+DRW4-DRW1)*DRW2+0.5)
           RETURN
           END
C          -----------------------------------------------------
C
C          ROUTINE TO READ  NO OF DISCARDED SINGLES AND TO REARRANGE
C          SINGLES DATA
C
```

```
C       -----------------------------------------------------------
        SUBROUTINE OUTB(XL,KNTRL,NDISD,JTROL)
        COMMON  COSTR,XP,XR,XC,XSTOR,YSTOU,YSTOI,XWST,YWELL,YSTBY,
      1 XSTP1,XSTP2,YSTP1,YSTP2,DROWU,SROWU,XLIFT,DRW1,DRW2,
      2 DRW3,DRW4,DRW5,DRW6,DRW7,DRW8,DRW9,DRW10,XHOLE,
      3 VELOC,DEPTH,
      4 ICNST,NPLNE,NRUBR,NCOLR,NSTD,IBSX,IBSYU,IBSYI,IBWSX,
      5 IBWY,IBSTY,IBYU,IBYI,NY1,NY2,NXSW1,NXSW2,NYSU1,
      6 NYSU2,NYSI1,NYSI2,NYSS1,NYSS2,NSTAB,IBSTB,
      7 IDRW1,IDRW2,IDRW3,IDRW4,IDRW5,IDRW6,IDRW7,IDRW8,
      8 IDRW9,IDR10,IDR11,IDR12,IDR13,IDR14,IDR15,IDR16,
      9 IDR17,IDR18,IDR19,IFLG1,IFLG2,IFLG3,IFLG4,IFLG5,
      A IFLG6,IFLG7,IFLG8,IFLG9,IREAD,IWRTE,KODE1,KODE2,
      B KODE3,KODEP,IDATA,LP,LR,LC,KOD7,KOD10,KOD11,KOD12,
      C KOUNT,NRUBT
        DIMENSION COSTR(25),ICNST(10),LP(90),LR(90),LC(30),
      1 VELOC(8),DEPTH(7)
        KTROL=0
        GO TO (10,500),JTROL
   10   IF (NDISD) 100,110,104
  100   NDISD=-NDISD
C       IF SINGLES WERE REMOVED AND DRAWWORKS HAVE NOT YET PULLED
C       THE STAND, THEN RECOMPUTE IDRW7.
  104   IF (IFLG9) 110,106,110
  106   KTROL=-1
C       GET THE LENGTH OF THE BOTTOM SINGLE OF THE STAND PULLED OUT
  110   IF (NRUBR) 200,200,112
  112   NRUBD=NDISD
        IF (NRUBR-NRUBD) 120,130,130
  120   NRUBD=NRUBR
        NPLND=NDISD-NRUBD
  130   NN=NRUBR-NDISD-2
        IF(NN)147,147,146
  146   XL=LR(NN)
        XL=XL/100.+30.
        NSTD=NSTD+1
        KOUNT=KOUNT+1
        GO TO 148
  147   NRUBT=3*NSTD+NRUBR-NRUBD
        GO TO 160
C       L OF STRING PULLED OUT
  148   XP1=0.
        DO 150 N=NN,NRUBR
        XX=LR(N)
  150   XP1=XP1+XX/100.+30.
C       L OF R SECTION IN THE HOLE
        XR=XR-XP1
C       TAKE OUT LENGTH OF SINGLES DISCARED FROM MEMORY
C       MOVE LENGTH OF SINGLES IN RACK APPROPRIATELY
        IF(NDISD)180,180,160
  160   IF (NSTD) 180,180,165
  165   N1=NRUBR+1
        N2=NRUBR+3*NSTD
        DO 170 M=N1,N2
        MM=M-NRUBD
  170   LR(MM)=LR(M)
  180   NRUBR=NRUBR-NDISD-3
        IF (NRUBR) 205,181,500
  181   XR=0.
        NRUBT=3*NSTD
        GO TO 500
C       -----------------------------------------------------------
C       HANDLING OF PLAIN PIPES
C
  200   NPLND=NDISD
        GO TO 208
  205   NRUBR=NRUBR+3
        NDISD=0
        XR=0.
  208   NN=NPLNE+NRUBR-2-NDISD
        NRUBR=0
  210   NSTD1=NSTD
        IF(NN) 247,247,246
  246   XL=LP(NN)
```

```
      XL=XL/100.+30.
      NSTD=NSTD+1
      KOUNT=KOUNT+1
      GO TO 248
  247 NN=1
      NPLND=NPLNE
      KNTRL=2
  248 XP1=0.
      DO 250 N=NN,NPLNE
      XX=LP(N)
  250 XP1=XP1+XX/100.+30.
      XP=XP-XP1
      IF (NPLND) 289,280,260
  260 N=3*NSTD1-NRUBT
      IF (N) 280,280,265
  265 N1=NPLNE+1
      N2=NPLNE+N
      DO 270 M=N1,N2
      MM=M-NPLND
  270 LP(MM)=LP(M)
  280 NPLNE=NN-1
      IF(NPLNE) 281,281,500
  281 NPLNE=0
      XP=0.
C     DISPLAY DATA ON CRT
C
C     STAND LENGTH CALCULATIONS FOR DRAWWORKS
C
  500 CONTINUE
      STLEN=0.
      NBOT1=1
      IF (NRUBR) 700,700,600
  600 NBOT=NRUBR-2
      IF (NBOT) 610,610,630
  610 NBOT1=NBOT
      NBOT=1
  630 DO 640 N=NBOT,NRUBR
  640 STLEN=STLEN+FLOAT (LR(N))/100.+30.
      IF (NBOT1) 650,650,750
  650 NBOT=NPLNE+NBOT1
      GO TO 710
  700 NBOT=NPLNE-2
  710 IF (NBOT) 740,740,720
  720 DO 730 N=NBOT,NPLNE
  730 STLEN=STLEN+FLOAT (LP(N))/100.+30.
      GO TO 750
C     LESS THAN 1 STAND OF PLAINS REMAIN - SIGNAL
C     NEGATIVE STLEN INDICATES NO PIPES LEFT TO BE PULLED
  740 STLEN=-100.
  750 CALL TTY
      IDR17=IFIX((STLEN*12.+DRW3-DRW1)*DRW2+0.5)
      IF (KTROL) 800,999,800
  800 XP1=0.
      IF (NRUBR) 810,810,850
  810 M1=NSTD*3-NRUBT
      IF (M1) 850,850,820
  820 IF (M1-3) 950,900,900
C     STAND COMING OUT OF HOLE IS ALL RUBBERS
  850 M=NRUBR+1
      N=NRUBR+3
      DO 860 MM=M,N
      XX=LR(MM)
  860 XP1=XP1+XX/100.+30.
      GO TO 990
C     STAND COMING OUT IS ALL PLAIN
  900 M=NPLNE+1
      N=NPLNE+3
      DO 910 MM=M,N
      XX=LP(MM)
  910 XP1=XP1+XX/100.+30.
      GO TO 990
C     STAND COMING OUT IS MIXED
  950 M=NPLNE+1
      N=NPLNE+M1
      DO 960 MM=M,N
      XX=LP(MM)
  960 XP1=XP1+XX/100.+30.
```

```
      N=3-M1
      DO 970 MM=1,N
      XX=LR(MM)
970   XP1=XP1+XX/100.+30.
990   IDRW7=IFIX((XP1*12.+DRW3-DRW1)+DRW2+0.5)
      IDR17=IDRW7
999   RETURN
      END
```

RACKING FUNCTIONS

```
    $$
C     ----------------------------------------------------------
C
C     ROUTINE TO COMPUTE ROW,COLUMN,X AND Y CO-ORDINATES W.R.T.
C     WELL C. L. OF A GIVEN LOCATION KOUNT
C
C     ----------------------------------------------------------
      SUBROUTINE LOCAN(KOUNT,A,C,NROW,NCOLN,X,Y)
      COMMON COSTR
      DIMENSION COSTR(25)
      NPIPE=KOUNT
      B=COSTR(8)
      IF(KOUNT-90)10,10,5
5     NPIPE=KOUNT-90
      B=COSTR(7)
10    NROW=(NPIPE-1)/12+1
      NCOLN=NPIPE-(NROW-1)*12
      COLN=NCOLN
      ROW=NROW
      X=B+COSTR(11)*(12.-COLN)
      Y=A+C*(ROW-1.)
      RETURN
      END
            $$
      FUNCTION D(Y1,Y2,H)
      COMMON COSTR
      DIMENSION COSTR(25)
      D=COSTR(1)
      DD=D-COSTR(3)
      D=(Y1-Y2)*(H-D)
      D=Y1+D/DD
      RETURN
      END
C     ----------------------------------------------------------
C
C     ROUTINE TO COMPUTE BIT PATTERN FOR A GIVEN POSITION
C
C     ----------------------------------------------------------
      SUBROUTINE BITS(DMAX,POSN,IBITS)
      FACTR=DMAX/4095.
      IF(POSN-DMAX/2.)20,15,25
15    IBITS=2047
      RETURN
20    IBITS=POSN/FACTR+.5
      RETURN
25    IBITS=(POSN-DMAX)/FACTR-.5
      RETURN
      END
*
            $$
C     ----------------------------------------------------------
C
C     SUBROUTINE TO COMPUTE RAMP DATA
C
C     ----------------------------------------------------------
      SUBROUTINE RAMP(X,STP1,STP2,N1,N2)
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
```

```
8   IDRW9,IDR10,IDR11,IDR12,IDR13,IDR14,IDR15,IDR16,
9   IDR17,IDR18,IDR19,IFLG1,IFLG2,IFLG3,IFLG4,IFLG5,
A   IFLG6,IFLG7,IFLG8,IFLG9,IREAD,IWRTE,KODE1,KODE2,
B   KODE3,KODEP,IDATA,LP,LR,LC,KOD7,KOD10,KOD11,KOD12,
C   KOUNT,NRUBT
    DIMENSION COSTR(25),ICNST(10),LP(90),LR(90),LC(30),
1   VELOC(8),DEPTH(7)
    XRR=ICNST(6)
    IF(X)10,10,20
10  X=-X
20  XRR=X-XRR*STP2
    N1=XRR/STP1
    XRR=N1
    XRR=X-XRR*STP1
    N2=XRR/STP2+.5
    RETURN
    END
*

C       -----------------------------------------------------
C       SUBROUTINE TO MOVE UPPER AND INT. RACKERS
C       -----------------------------------------------------
C
C       SABR OP CODE DEFINITIONS:
C
S OPDEF UDLA    6363    /LOAD MODULE ADDRESS
S OPDEF UDLD    6367    /LOAD DATA WORD
C
        SUBROUTINE RACK(N1U,N1I,N2U,N2I,IBITU,IBITI,ICODE)
        COMMON  COSTR,XP,XR,XC,XSTOR,YSTOU,YSTOI,XWST,YWELL,YSTBY,
      1 XSTP1,XSTP2,YSTP1,YSTP2,DROWU,SROWU,XLIFT,DRW1,DRW2,
      2 DRW3,DRW4,DRW5,DRW6,DRW7,DRW8,DRW9,DRW10,XHOLE,
      3 VELOC,DEPTH,
      4 ICNST,NPLNE,NRUBR,NCOLR,NSTD,IBSX,IBSYU,IBSYI,IBWSX,
      5 IBWY,IBSTY,IBYU,IBYI,NY1,NY2,NXSW1,NXSW2,NYSU1,
      6 NYSU2,NYSI1,NYSI2,NYSS1,NYSS2,NSTAB,IBSTB,
      7 IDRW1,IDRW2,IDRW3,IDRW4,IDRW5,IDRW6,IDRW7,IDRW8,
      8 IDRW9,IDR10,IDR11,IDR12,IDR13,IDR14,IDR15,IDR16,
      9 IDR17,IDR18,IDR19,IFLG1,IFLG2,IFLG3,IFLG4,IFLG5,
      A IFLG6,IFLG7,IFLG8,IFLG9,IREAD,IWRTE,KODE1,KODE2,
      B KODE3,KODEP,IDATA,LP,LR,LC,KOD7,KOD10,KOD11,KOD12,
      C KOUNT,NRUBT
        DIMENSION COSTR(25),ICNST(10),LP(90),LR(90),LC(30),
      1 VELOC(8),DEPTH(7)
        IBTU=IBITU
        IBTI=IBITI
        MOD6=6
        MOD5=5
        MOD4=4
        II2=-2047-1
        GO TO (10,20,30,40),ICODE
10      IBIT1=ICNST(1)
        IBIT2=ICNST(2)
        GO TO 50
20      IBIT1=ICNST(3)
        IBIT2=ICNST(4)
        II2=1024
        GO TO 50
30      IBIT1=-ICNST(1)
        IBIT2=-ICNST(2)
        GO TO 50
40      IBIT1=-ICNST(3)
        IBIT2=-ICNST(4)
        II2=1024
50      N1DIF=N1I-N1U
        II1=II2+384
        IF(N1DIF)60,60,70
60      J2=N2I
        J3=0
        J4=0
        NB2I=IBIT2
        NB3U=0
        NB3I=0
        NB4I=0
        NB4U=0
```

```
        GO TO 140
70      IF(N1I-(N1U+N2U))90,90,80
80      J2=N2U
        J3=N1I-N1U-N2U
        J4=N2I
        NB2I=IBIT1
        NB3U=0
        NB3I=IBIT1
        NB4I=IBIT2
        NB4U=0
        GO TO 140
90      J2=N1DIF
        NB2I=IBIT1
        IF(N2I-(N2U-N1DIF))100,100,110
100     J3=N2I
        NB3U=IBIT2
        NB3I=IBIT2
        J4=N2U-N2I-N1DIF
        NB4U=IBIT2
        NB4I=0
        GO TO 140
110     J3=N2U-N1DIF
        J4=N2I-J3
        NB3U=IBIT2
        NB3I=IBIT2
        NB4U=0
        NB4I=IBIT2
140     DO 250 J=1,4
        GO TO (150,160,170,180),J
150     NSTEP=N1U
        IBU=IBIT1
        IBI=IBU
        GO TO 200
160     NSTEP=J2
        IBU=IBIT2
        IBI=NB2I
        GO TO 200
170     NSTEP=J3
        IBU=NB3U
        IBI=NB3I
        GO TO 200
180     NSTEP=J4
        IBU=NB4U
        IBI=NB4I
200     DO 250 N=1,NSTEP
        L=ICNST(7)
        IBTU=IBTU+IBU
        IBTI=IBTI+IBI
 S      CLA CLL
 S      TAD     \MOD5
 S      IOF     /NO INTERRUPTS DURING THIS SEQUENCE
 S      UDLA
 S      TAD     \IBTU
 S      UDLD
 S      TAD     \MOD6
 S      UDLA
 S      TAD     \IBTI
 S      UDLD
 S      ION     /RESTORE INTERRUPT
 S B,   NOP
 S      ISZ     \L
 S      JMP     B
 S      TAD     \MOD4
 S      IOF     /INTERRUPT OFF
 S      UDLA
 S      TAD     \I11
 S      UDLD
 S      NOP
 S      NOP
 S      TAD     \I12
 S      UDLD
 S      ION     /RESTORE INTERRUPT
250     CONTINUE
260     CALL QUERY (1,9,1,9)
        RETURN
        END
```

HARDWARE ACTUATORS

```
C       ------------------------------------------------------------
C
C       ROUTINE TO CHANGE AN AXIS OF THE SERVO
C
C       ------------------------------------------------------------
        SUBROUTINE AXCHG(KODE)
        COMMON  COSTR,XP,XR,XC,XSTOR,YSTOU,YSTOI,XWST,YWELL,YSTBY,
     1  XSTP1,XSTP2,YSTP1,YSTP2,DROWU,SROWU,XLIFT,DRW1,DRW2,
     2  DRW3,DRW4,DRW5,DRW6,DRW7,DRW8,DRW9,DRW10,XHOLE,
     3  VELOC,DEPTH,
     4  ICNST,NPLNE,NRUBR,NCOLR,NSTD,IBSX,IBSYU,IBSYI,IBWSX,
     5  IBWY,IBSTY,IBYU,IBYI,NYI,NY2,NXSW1,NXSW2,NYSU1,
     6  NYSU2,NYSI1,NYSI2,NYSS1,NYSS2,NSTAB,IBSTB,
     7  IDRW1,IDRW2,IDRW3,IDRW4,IDRW5,IDRW6,IDRW7,IDRW8,
     8  IDRW9,IDR10,IDR11,IDR12,IDR13,IDR14,IDR15,IDR16,
     9  IDR17,IDR18,IDR19,IFLG1,IFLG2,IFLG3,IFLG4,IFLG5,
     A  IFLG6,IFLG7,IFLG8,IFLG9,IREAD,IWRTE,KODE1,KODE2,
     B  KODE3,KODEP,IDATA,LP,LR,LC,KOD7,KOD10,KOD11,KOD12,
     C  KOUNT,NRUBT
        DIMENSION COSTR(25),ICNST(10),LP(90),LR(90),LC(30),
     1  VELOC(8),DEPTH(7)
C       KODE=1          FROM Y TO X
C       KODE=2          FROM X TO Y
        I1=1056
        I2=-2016
        I3=-2047-1
        GO TO (20,10),KODE
   10   I1=-2016
        I2=1056
        I3=1024
   20   I=-700
C       SERVO VALVE INHIBIT ON
        KODE3=I1
        CALL LDUDC(4,KODE3)
C       SET 10 M.S. DELAY
S B,    NOP
S       ISZ     \I
S       JMP     B
C       CHANGE THE AXIS
        KODE3=I2
        CALL LDUDC(4,KODE3)
C       SET 200 M. S. DELAY
        J=-20
   25   I=-2000
S C,    NOP
S       ISZ     \I
S       JMP     C
S       ISZ     \J
S       JMP     \25
S       CLA CLL
C       SERVO VALVE INHIBIT OFF
        KODE3=I3
        CALL LDUDC(4,KODE3)
        RETURN
        END
C       ------------------------------------------------------------
C
C       ROUTINE TO CONTROL THE LIFTING HEAD
C
C       ------------------------------------------------------------
        SUBROUTINE LIFTH(KODEA,XD)
        COMMON  COSTR,XP,XR,XC,XSTOR,YSTOU,YSTOI,XWST,YWELL,YSTBY,
     1  XSTP1,XSTP2,YSTP1,YSTP2,DROWU,SROWU,XLIFT,DRW1,DRW2,
     2  DRW3,DRW4,DRW5,DRW6,DRW7,DRW8,DRW9,DRW10,XHOLE,
     3  VELOC,DEPTH,
     4  ICNST,NPLNE,NRUBR,NCOLR,NSTD,IBSX,IBSYU,IBSYI,IBWSX,
     5  IBWY,IBSTY,IBYU,IBYI,NYI,NY2,NXSW1,NXSW2,NYSU1,
     6  NYSU2,NYSI1,NYSI2,NYSS1,NYSS2,NSTAB,IBSTB,
     7  IDRW1,IDRW2,IDRW3,IDRW4,IDRW5,IDRW6,IDRW7,IDRW8,
     8  IDRW9,IDR10,IDR11,IDR12,IDR13,IDR14,IDR15,IDR16,
     9  IDR17,IDR18,IDR19,IFLG1,IFLG2,IFLG3,IFLG4,IFLG5,
     A  IFLG6,IFLG7,IFLG8,IFLG9,IREAD,IWRTE,KODE1,KODE2,
```

```
     B  KODE3,KODEP,IDATA,LP,LR,LC,KOD7,KOD1Ø,KOD11,KOD12,
     C  KOUNT,NRUBT
        DIMENSION COSTR(25),ICNST(1Ø),LP(9Ø),LR(9Ø),LC(3Ø),
     1  VELOC(8),DEPTH(7)
C       KODEA=1 UP OR DOWN-NORMAL
C       KODEA=2 CREEP UP UNTIL LOAD , THEN UP NORMAL
C       KODE1=3 DOWN NORMAL THEN CREEP DOWN UNTIL NO LOAD
C       KODEA=4 CREEP DOWN UNTIL NO LOAD
        XL=XD
        IAXIS=KODE3
C       GET THE POSITION OF LIFTING HEAD
        CALL ADCON(Ø,Ø,VOLT)
        IF(VOLT)35,35,36
35      VOLT=Ø.Ø
C       COMPUTE THE POSITION W R T FLOOR
36      PLIFT=VOLT*COSTR(21)+COSTR(2)-COSTR(18)
        GO TO (4Ø,14Ø,24Ø,34Ø),KODEA
4Ø      IF(PLIFT-XL)5Ø,65Ø,6Ø
C       SELECT UP, NORMAL AND GO
5Ø      KODE3=IAXIS+28
        K=1
        GO TO 7Ø
C       SELECT DOWN, NORMAL AND GO
6Ø      KODE3=IAXIS+2Ø
        K=2
7Ø      CALL LDUDC(4,KODE3)
8Ø      CALL ADCON(Ø,Ø,VOLT)
        IF(VOLT)81,81,82
81      VOLT=Ø.Ø
82      PLIFT=VOLT*COSTR(21)+COSTR(2)-COSTR(18)
        GO TO (9Ø,1ØØ),K
9Ø      IF(PLIFT-XL)8Ø,6ØØ,6ØØ
1ØØ     IF(PLIFT-XL)6ØØ,6ØØ,8Ø
C       SELECT UP, CREEP AND GO
14Ø     KODE3=IAXIS+12
145     CALL LDUDC(4,KODE3)
C       CHECK FOR THE LIFTING HEAD LOAD
        ISTAT=1
        LIGHT=2
        GO TO (152,152,151,151),KODEA
151     ISTAT=Ø
        LIGHT=3
152     CALL QUERY (1,2,ISTAT,-LIGHT)
        GO TO (16Ø,16Ø,6ØØ,6ØØ),KODEA
C       CHANGE MODE TO NORMAL
16Ø     KODE3=KODE3+16
17Ø     CALL LDUDC(4,KODE3)
C       GET THE POSITION OF THE LIFTING HEAD
        CALL ADCON(Ø,Ø,VOLT)
        IF(VOLT)171,171,172
171     VOLT=Ø.Ø
172     PLIFT=VOLT*COSTR(21)
18Ø     CALL ADCON(Ø,Ø,VOLT)
        IF(VOLT)181,181,182
181     VOLT=Ø.Ø
182     PSHLN=VOLT*COSTR(21)
        PDIFF=ABS(PSHLN-PLIFT)
        IF(PDIFF-XL)18Ø,19Ø,19Ø
19Ø     GO TO (2ØØ,6ØØ,2ØØ,2ØØ),KODEA
C       CHANGE MODE TO CREEP
2ØØ     KODE3=KODE3-16
        GO TO 145
C       SELECT NORMAL GO AND DOWN
24Ø     KODE3=IAXIS+2Ø
C       XD - LENGTH OF THE BOTTOM SINGLE OF THE STAND PULLED
C       OUT - FT
C       XL - LENGTH BY WHICH STAND IS TO BE LOWERED AT NORMAL
C       VELOCITY - INCHES
        XL=PLIFT-XD*12.-COSTR(1)-COSTR(22)
        GO TO 17Ø
34Ø     KODE3=IAXIS+4
        GO TO 145
6ØØ     KODE3=IAXIS
        CALL LDUDC(4,KODE3)
65Ø     RETURN
        END
```

```
C       ---------------------------------------------------
C
C       ROUTINE TO OPEN OR CLOSE A FINGER AND TO CHECK THAT
C       IT HAS OPENED OR CLOSED
C
C       ---------------------------------------------------
        SUBROUTINE LATCH(NCOLN,NROW,ICODE)
        COMMON  COSTR,XP,XR,XC,XSTOR,YSTOU,YSTOI,XWST,YWELL,YSTBY,
     1  XSTP1,XSTP2,YSTP1,YSTP2,DROWU,SROWU,XLIFT,DRW1,DRW2,
     2  DRW3,DRW4,DRW5,DRW6,DRW7,DRW8,DRW9,DRW10,XHOLE,
     3  VELOC,DEPTH,
     4  ICNST,NPLNE,NRUBR,NCOLR,NSTD,IBSX,IBSYU,IBSY1,IBWSX,
     5  IBWY,IBSTY,IBYU,IBYI,NY1,NY2,NXSW1,NXSW2,NYSU1,
     6  NYSU2,NYSI1,NYSI2,NYSS1,NYSS2,NSTAB,IBSTB,
     7  IDRW1,IDRW2,IDRW3,IDRW4,IDRW5,IDRW6,IDRW7,IDRW8,
     8  IDRW9,IDR10,IDR11,IDR12,IDR13,IDR14,IDR15,IDR16,
     9  IDR17,IDR18,IDR19,IFLG1,IFLG2,IFLG3,IFLG4,IFLG5,
     A  IFLG6,IFLG7,IFLG8,IFLG9,IREAD,IWRTE,KODE1,KODE2,
     B  KODE3,KODEP,IDATA,LP,LR,LC,KOD7,KOD10,KOD11,KOD12,
     C  KOUNT,NRUBT
        DIMENSION COSTR(25),ICNST(10),LP(90),LR(90),LC(30),
     1  VELOC(8),DEPTH(7)
C       ICODE=1           CLOSE LATCH
C       ICODE=2           OPEN LATCH
C       GET THE DATA WORD FOR COLUMN SELECTOR
        LIGHT=7
        LOHI=1
        IF(NCOLN-8)20,20,15
15      IBIT1=2
        GO TO 35
20      IF(NCOLN-4)30,30,25
25      IBIT1=1
        GO TO 35
30      IBIT1=0
35      NUM=NCOLN-4*IBIT1
        IBIT2=NUM+2
        NUM=2**(11-IBIT1)
        IF(IBIT1)40,40,50
40      NUM=-NUM
50      NUM=NUM+2**(11-IBIT2)
C       SELECT FINGER LATCH CLOSE
        GO TO (70,60),ICODE
C       SELECT FINGER LATCH OPEN
60      NUM=NUM+8
        LIGHT=4
70      IDATA=IDATA+NUM
C       GET DATA FOR ROW
        NUM=2**(12-NROW)
        IF(NROW-1)120,120,125
120     NUM=-NUM
C       LOAD DATA IN MOD 3
125     CALL LDUDC(3,IDATA)
C       LOAD DATA IN MOD 8
        CALL LDUDC(8,NUM)
C       DON'T ALLOW AUTO DISABLE WHILE LOOKING FOR LATCH SIGNAL
  135   CALL QUERY (1,4,LOHI,-LIGHT)
        LOHI=LOHI-1
        IF (LOHI) 240,135,135
  240   CONTINUE
        RETURN
        END
     $$
C       ---------------------------------------------------
C
C       ROUTINE TO OPEN OR CLOSE CLAWS AND TO CHECK THAT CLAWS ARE
C       OPEN OR CLOSED
C
C       ---------------------------------------------------
        SUBROUTINE CLAWS(IKODE)
C       IKODE=1           OPEN CLAWS
C       IKODE=2           CLOSE CLAWS
C       CLOSE CLAWS
        II=4
        GO TO (10,20),IKODE
C       OPEN CLAWS
```

```
10        II=8
20        CALL LDUDC(8,II)
C         ARE CLAWS CLOSED?
          NBIT=1
          IF(IKODE-1)30,30,40
C         ARE CLAWS OPEN?
30        NBIT=0
   40     MBIT=NBIT
          CALL QUERY (1,NBIT,1,MBIT)
          RETURN
          END
*
```

FORMATTED I/O

```
      $$
C         ------------------------------------------------------------
C
C         ROUTINE TO DISPLAY FORMATS AND DATA ON CRT INCASE OF PREVIOUS
C         POWER LOW
C
C         ------------------------------------------------------------
          SUBROUTINE PRLOW
          COMMON  COSTR,XP,XR,XC,XSTOR,YSTOU,YSTOI,XWST,YWELL,YSTBY,
        1 XSTP1,XSTP2,YSTP1,YSTP2,DROWU,SROWU,XLIFT,DRW1,DRW2,
        2 DRW3,DRW4,DRW5,DRW6,DRW7,DRW8,DRW9,DRW10,XHOLE,
        3 VELOC,DEPTH,
        4 ICNST,NPLNE,NRUBR,NCOLR,NSTD,IBSX,IBSYU,IBSYI,IBWSX,
        5 IBWY,IBSTY,IBYU,IBYI,NY1,NY2,NXSW1,NXSW2,NYSU1,
        6 NYSU2,NYSI1,NYSI2,NYSS1,NYSS2,NSTAB,IBSTB,
        7 IDRW1,IDRW2,IDRW3,IDRW4,IDRW5,IDRW6,IDRW7,IDRW8,
        8 IDRW9,IDR10,IDR11,IDR12,IDR13,IDR14,IDR15,IDR16,
        9 IDR17,IDR18,IDR19,IFLG1,IFLG2,IFLG3,IFLG4,IFLG5,
        A IFLG6,IFLG7,IFLG8,IFLG9,IREAD,IWRTE,KODE1,KODE2,
        B KODE3,KODEP,IDATA,LP,LR,LC,KOD7,KOD10,KOD11,KOD12,
        C KOUNT,NRUBT
          DIMENSION COSTR(25),ICNST(10),LP(90),LR(90),LC(30),
        1 VELOC(8),DEPTH(7)
          IF(KODEP)50,50,10
10        KODEP=0
          CALL VT05
          CALL TTY
          CALL CRT(15,28,0)
          WRITE(IWRTE,20)XHOLE
20        FORMAT(F8.2)
          IF(KODE1)50,50,30
30        CALL CRT(2,26,0)
          IF(KODE1-1)35,35,40
35        WRITE(IWRTE,36)
36        FORMAT('COMING OUT OF HOLE')
          RETURN
40        WRITE(IWRTE,41)
41        FORMAT('GOING IN THE HOLE')
50        RETURN
          END
*
      $$
C         ------------------------------------------------------------
C
C         ROUTINE TO INTERROGATE DS OR NO DS CHANGE BUTTONS AND
C         TO READ NO OF SINGLES ADDED OR TAKEN OUT
C
C         ------------------------------------------------------------
          SUBROUTINE DSCHG(NN)
          COMMON  COSTR,XP,XR,XC,XSTOR,YSTOU,YSTOI,XWST,YWELL,YSTBY,
        1 XSTP1,XSTP2,YSTP1,YSTP2,DROWU,SROWU,XLIFT,DRW1,DRW2,
        2 DRW3,DRW4,DRW5,DRW6,DRW7,DRW8,DRW9,DRW10,XHOLE,
        3 VELOC,DEPTH,
        4 ICNST,NPLNE,NRUBR,NCOLR,NSTD,IBSX,IBSYU,IBSYI,IBWSX,
        5 IBWY,IBSTY,IBYU,IBYI,NY1,NY2,NXSW1,NXSW2,NYSU1,
        6 NYSU2,NYSI1,NYSI2,NYSS1,NYSS2,NSTAB,IBSTB,
        7 IDRW1,IDRW2,IDRW3,IDRW4,IDRW5,IDRW6,IDRW7,IDRW8,
        8 IDRW9,IDR10,IDR11,IDR12,IDR13,IDR14,IDR15,IDR16,
        9 IDR17,IDR18,IDR19,IFLG1,IFLG2,IFLG3,IFLG4,IFLG5,
        A IFLG6,IFLG7,IFLG8,IFLG9,IREAD,IWRTE,KODE1,KODE2,
        B KODE3,KODEP,IDATA,LP,LR,LC,KOD7,KOD10,KOD11,KOD12,
        C KOUNT,NRUBT
          DIMENSION COSTR(25),ICNST(10),LP(90),LR(90),LC(30),
```

```
      1   VELOC(8),DEPTH(7)
C         NN= NO OF SINGLES ADDED OR TAKEN OUT
          CALL CRT(5,26,0)
          WRITE(IWRTE,110)
 110      FORMAT('PUSH NO DS OR DS CHANGE BUTTON')
C         YELLOW LAMP ON
          IDATA=IDATA+1
          CALL LDUDC(3,IDATA)
C         CHECK NO DS CHANGE BUTTON
 125      CALL INTRG(1,8,IEROR)
          GO TO (130,160),IEROR
C         CHECK DS CHANGE BUTTON
 130      CALL INTRG(1,10,IEROR)
          GO TO (125,135),IEROR
C         YELLOW LAMP OFF
 135      IDATA=IDATA-1
          CALL LDUDC(3,IDATA)
          CALL CRT(6,26,0)
          WRITE(IWRTE,140)
 140      FORMAT('INPUT NO OF C OR R SINGLES ADDED OR TAKEN OUT')
          CALL CRT(7,26,0)
          WRITE(IWRTE,145)
 145      FORMAT('INPUT NEGATIVE IF TAKEN OUT-I2')
C         ENERGIZE YELLOW LAMP
          CALL CRT(18,1,0)
          IDATA=IDATA+1
          CALL LDUDC(3,IDATA)
          READ(IREAD,150)NN
 150      FORMAT(I2)
          GO TO 170
  160     CONTINUE
          NN=0
 170      CONTINUE
C         DE ENERGIZE YELLOW LAMP
          IDATA=IDATA-1
          CALL LDUDC(3,IDATA)
          CALL CRT(5,26,158)
          CALL CRT(6,26,158)
          CALL CRT(7,26,158)
          CALL CRT(18,1,159)
          RETURN
          END
 *

 S OPDEF CRTLS  6046     /OUTPUT A CHARACTSR
 S OPDEF CRTSF  6041     /SKIP ON A FLAG
          SUBROUTINE CRT (NLINE,NCOLN,NWORD)
 S LOOP,  CRTSF
 S        JMP LOOP
 S        CLA CLL
          IYAD=NLINE
          IXAD=NCOLN
 S        TAD     K237   /CONVERT LINE #TO OCTAL EQUIV.
 S        TAD     \IYAD
 S        DCA     \IYAD
 S        TAD     K237
 S        TAD     \IXAD
 S        DCA     \IXAD
 S        TAD     CAD
 S        JMS     POSN
 S        TAD     \IYAD
 S        JMS     POSN
 S        TAD     \IXAD
 S        JMS     POSN
          IWRD=NWORD
 S        TAD     \IWRD
 S        SPA SNA
 S        JMP     \10
 S        JMS     POSN
 10       RETURN
 S POSN,  0
 S        CRTLS
 S        CLA CLL
```

```
S WAIT, CRTSF
S       JMP WAIT
S       CLA CLL
S       JMP I POSN
S K237, 0237
S CAD,  0216
        END
*
  $$
        SUBROUTINE VT05
        COMMON  COSTR,XP,XR,XC,XSTOR,YSTOU,YSTOI,XWST,YWELL,YSTBY,
     1  XSTP1,XSTP2,YSTP1,YSTP2,DROWU,SROWU,XLIFT,DRW1,DRW2,
     2  DRW3,DRW4,DRW5,DRW6,DRW7,DRW8,DRW9,DRW10,XHOLE,
     3  VELOC,DEPTH,
     4  ICNST,NPLNE,NRUBR,NCOLR,NSTD,IBSX,IBSYU,IBSYI,IBWSX,
     5  IBWY,IBSTY,IBYU,IBYI,NY1,NY2,NXSW1,NXSW2,NYSU1,
     6  NYSU2,NYSI1,NYSI2,NYSS1,NYSS2,NSTAB,IBSTB,
     7  IDRW1,IDRW2,IDRW3,IDRW4,IDRW5,IDRW6,IDRW7,IDRW8,
     8  IDRW9,IDR10,IDR11,IDR12,IDR13,IDR14,IDR15,IDR16,
     9  IDR17,IDR18,IDR19,IFLG1,IFLG2,IFLG3,IFLG4,IFLG5,
     A  IFLG6,IFLG7,IFLG8,IFLG9,IREAD,IWRTE,KODE1,KODE2,
     B  KODE3,KODEP,IDATA,LP,LR,LC,KOD7,KOD10,KOD11,KOD12,
     C  KOUNT,NRUBT
        DIMENSION COSTR(25),ICNST(10),LP(90),LR(90),LC(30),
     1  VELOC(8),DEPTH(7)
 1001   FORMAT (10X,'BYRON JACKSON AUTOMATIC VERTICAL PIPE HANDLING SYS.
     1EM'/'OPERATION MODE:'/'ABNORMAL ERROR:'/17HOPERATOR'S ERROR:/24HOP
     2ERATOR'S INSTRUCTIONS://///72('-')/24X,'DRILL STRING MAKE-UP'/30X,'
     3PLAIN     RUBBER     COLLAR')

 1002   FORMAT ('NO OF STANDS IN HOLE'/'NO OF REMAINING SINGLES'/'SECTIC
     1N LENGTH-FEET'/'HOLE DEPTH-FEET'/'BIT DEPTH-FEET'/'NO OF STANDS II
     2 RACK')
        CALL CRT (1,1,159)
        WRITE (IWRTE,1001)
        WRITE (IWRTE,1002)
        RETURN
        END
*

     $$
C        ----------------------------------------------------------
C
C        ROUTINE TO READ SINGLE'S DATA DURING DRILLING AND PIPE
C        HANDLING
C
C        ----------------------------------------------------------
         SUBROUTINE DATA(KODE)
         COMMON  COSTR,XP,XR,XC,XSTOR,YSTOU,YSTOI,XWST,YWELL,YSTBY,
     1   XSTP1,XSTP2,YSTP1,YSTP2,DROWU,SROWU,XLIFT,DRW1,DRW2,
     2   DRW3,DRW4,DRW5,DRW6,DRW7,DRW8,DRW9,DRW10,XHOLE,
     3   VELOC,DEPTH,
     4   ICNST,NPLNE,NRUBR,NCOLR,NSTD,IBSX,IBSYU,IBSYI,IBWSX,
     5   IBWY,IBSTY,IBYU,IBYI,NY1,NY2,NXSW1,NXSW2,NYSU1,
     6   NYSU2,NYSI1,NYSI2,NYSS1,NYSS2,NSTAB,IBSTB,
     7   IDRW1,IDRW2,IDRW3,IDRW4,IDRW5,IDRW6,IDRW7,IDRW8,
     8   IDRW9,IDR10,IDR11,IDR12,IDR13,IDR14,IDR15,IDR16,
     9   IDR17,IDR18,IDR19,IFLG1,IFLG2,IFLG3,IFLG4,IFLG5,
     A   IFLG6,IFLG7,IFLG8,IFLG9,IREAD,IWRTE,KODE1,KODE2,
     B   KODE3,KODEP,IDATA,LP,LR,LC,KOD7,KOD10,KOD11,KOD12,
     C   KOUNT,NRUBT
         DIMENSION COSTR(25),ICNST(10),LP(90),LR(90),LC(30),
     1   VELOC(8),DEPTH(7)
C        KODE=1  DRILLING
C        KODE=2  PIPE HANDLING
C        IDATA=1 DRILLING
         IDATA=IDATA+1
         CALL PRLOW
 5       IF(KODE-1)10,10,25
 10      CALL CRT(2,26,0)
         WRITE(IWRTE,20)
 20      FORMAT('DRILLING')
 25      CALL CRT(5,26,0)
         WRITE(IWRTE,30)
```

```
30      FORMAT('INPUT PIPE DATA-LENGTH:FEET(2 DIGITS)')
        CALL CRT(6,42,0)
        WRITE(IWRTE,40)
40      FORMAT('TENTH OF A FOOT(1 DIGIT)')
        CALL CRT(7,42,0)
        WRITE(IWRTE,45)
45      FORMAT('HUNDREDTH OF A FOOT(1 DIGIT)')
        CALL CRT(8,26,0)
        WRITE(IWRTE,50)
50      FORMAT('TYPE:R-RUBBER GUARD,P-PLAIN,C-COLLAR')
C       POSITION CURSOR AT READ
70      CALL CRT(18,1,159)
        CALL CRT(18,1,0)
C       TURN YELLOW LAMP ON
        CALL LDUDC(3,IDATA)
        READ(IREAD,80)LL1,LL2,ITYPE
80      FORMAT(2I2,A1)
        IF(LL1)250,250,90
90      IF(LL1-35)120,120,100
100     CALL CRT(4,26,0)
        WRITE(IWRTE,110)
110     FORMAT('ERROR IN INPUT,ENTER DATA AGAIN')
        I=0
        J=-20
S LOOP, NOP
S       ISZ      \I
S       JMP      LOOP
S       ISZ      \J
S       JMP      LOOP
S       CLA CLL
        CALL CRT(4,26,158)
        GO TO 70
120     IF(LL1-25)100,130,130
130     X1=LL2
        X2=LL1
        X2=X2+X1/100.-30.
        LL1=X2*100.
        X2=X2+30.
        IF(ITYPE-1184)160,150,160
150     NRUBR=NRUBR+1
        LR(NRUBR)=LL1
        XR=XR+X2
        GO TO 200
160     IF(ITYPE-224)180,170,180
170     NCOLR=NCOLR+1
        LC(NCOLR)=LL1
        XC=XC+X2
        GO TO 200
180     IF(ITYPE-1056)100,190,100
190     NPLNE=NPLNE+1
        LP(NPLNE)=LL1
        XP=XP+X2
200     IF(KODE-1)205,205,215
205     XHOLE=XC+XR+XP
        CALL CRT(15,28,0)
        WRITE(IWRTE,210)XHOLE
210     FORMAT(F8.2)
215     IF(KODEP)220,220,225
220     CALL TTY
        GO TO 70
225     CALL PRLOW
        GO TO 5
250     IDATA=IDATA-1
        CALL LDUDC(3,IDATA)
        CALL CRT(5,26,158)
        CALL CRT(6,42,158)
        CALL CRT(7,42,158)
        CALL CRT(8,26,158)
        CALL CRT(18,1,159)
        IF(KODE-1)260,260,270
260     CALL CRT(2,26,158)
270     RETURN
        END
*
```

```
      $$
C     ----------------------------------------------------------
C
C     ROUTINE TO OUTPUT ON TTY.
C
C     ----------------------------------------------------------
      SUBROUTINE TTY
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
      DIMENSION COSTR(25),ICNST(10),LP(90),LR(90),LC(30),
     1 VELOC(8),DEPTH(7)
      NRSTD=NRUBR/3
      NRSIN=NRUBR-3*NRSTD
      NPSTD=NPLNE/3
      NPSIN=NPLNE-3*NPSTD
      NCSTD=NCOLR/3
      NCSIN=NCOLR-3*NCSTD
      CALL CRT(12,31,0)
      WRITE(IWRTE,190)NPSTD,NRSTD,NCSTD
  190 FORMAT(I3,7X,I3,8X,I3)
      CALL CRT(13,33,0)
      WRITE(IWRTE,195)NPSIN,NRSIN,NCSIN
  195 FORMAT(I1,9X,I1,10X,I1)
      CALL CRT(14,30,0)
      WRITE(IWRTE,200)XP,XR,XC
  200 FORMAT(2(F7.2,4X),F7.2)
      XD=XP+XR+XC
      CALL CRT(16,28,0)
      WRITE(IWRTE,210)XD
  210 FORMAT(F8.2)
      RETURN
      END
*
```

UTILITY

```
      $
C     ----------------------------------------------------------
C
C     ROUTINE TO INDICATE ABNORMAL AND PROGRAM PAUSE
C     CONDITIONS
C
C     ----------------------------------------------------------
      SUBROUTINE EROR(KODE)
C     KODE=1          PROGRAM PAUSE-GREEN LAMP
C     KODE=2          ABNORMAL PAUSE-RED LAMP
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
      DIMENSION COSTR(25),ICNST(10),LP(90),LR(90),LC(30),
     1 VELOC(8),DEPTH(7)
      IF (KODE) 100,5,5
    5 CALL LDUDC(4,KODE3)
   10 CALL INTRG (2,7,IEROR)
```

```
        GO TO (12,14),IEROR
12      CALL LDUDC (12,2)
        GO TO 10
14      CALL INTRG(1,3,IEROR)
        GO TO (10,20),IEROR
20      IWORD=512
        GO TO (40,30),KODE
30      IWORD=2
40      KODE3=KODE3-IWORD
        CALL LDUDC(4,KODE3)
        CALL LDUDC (12,0)
        RETURN
C       THE FOLLOWING IS A SPECIAL FUNCTION FOR THE PURPOSE OF
C       RETURNING TO THE TIME SHARING EXECUTIVE THE VALUE OF THE
C       NORMAL STATUS OF THE INTERRUPT CHANNEL.
100     KODE=ICNST(10)
        RETURN
        END
*
C
C
C PURPOSE: TO MONITOR A DIGITAL INPUT POINT UNTIL IT IS FOUND
C         TO HAVE THE DESIRED STATUS (HI OR LO), AT WHICH TIME IT
C         RETURNS TO THE CALLING PROGRAM. BEFORE CHECKING THE
C         DESIGNATED INPUT POINT FOR ITS STATUS, A LAMP IS LIT
C         TO INDICATE WHAT ACTION THE PROGRAM IS CHECKING FOR.
C         NORMALLY WHILE WAITING FOR THE DESIRED STATUS, THE
C         AUTO/MANUAL CHANNEL IS ALSO QUERIED. SHOULD IT BE FOUND
C         TO BE IN THE MANUAL MODE, AN 'AUTO DISABLE' SIGNAL IS SENT
C         OUT, AND THE PROGRAM WILL LOOP AT THIS POINT UNTIL THE
C         SWITCH IS RETURNED TO THE AUTO CONDITION. THE PROGRAM
C         THEN CONTINUES TO EXAMINE THE UDC INPUT POINT. WHEN THE
C         DESIRED STATUS IS FOUND, THE HOLD LAMP IS TURNED OFF, AS
C         IS THE 'AUTO DISABLE' SIGNAL, AND THE PROGRAM RETURNS TO
C         THE CALLING PROGRAM.
C                (THE AUTO DISABLE FUNCTION CAN BE INHIBITED BY
C         SETTING THE JBIT ARGUMENT NEGATIVE.)
C
C
C
C CALL: CALL QUERY (IWORD,IBIT,LOHI,JBIT)
C
C         IWORD = UDC WORD NUMBER (DECIMAL)
C         IBIT  = BIT NUMBER FOR THAT WORD (DECIMAL)
C         LOHI  = DESIRED STATUS ( 1 OR 0 )
C         JBIT  = BIT NUMBER FOR INDICATOR LAMP (0-21)
C                 NEGATIVE INDICATES AUTO DISABLE IS NOT TO BE ISSUED!!!
C
C
C
S OPDEF UDLA    6363     /LOAD ADDRESS
S OPDEF UDRD    6366     /READ UDC DATA WORD
C
C
C
        SUBROUTINE QUERY (IWORD,IBIT,LOHI,JBIT)
        IPASS=0
        ISWCH=JBIT
        MANEN=0
S       TAD     \ISWCH
S       SMA              /SKIP IF AUTO DISABLE NOT ALLOWED
S       JMP     Q6       /IT IS ALLOWED, LEAVE MANEN SET TO 0
S       CLA CLL          /NOT ALLOWED- MANEN=-1,ISWCH POSITIVE
        MANEN=-1
        ISWCH=-ISWCH
S Q6,   CLA CLL
        JBI=-(ISWCH+2)
S       TAD     \ISWCH
S       TAD     (7767
S       SPA SNA          /SKIP IF JBIT IS 10 OR GREATER
S       JMP     Q1A      /JBIT<10, SWITCH NEED NOT BE SET
S       CLA CLL IAC
S       DCA     \ISWCH   /SET THE SWITCH
S       TAD     \JBI     /MODIFY # OF BIT ROTATIONS
```

```
S            TAD      (0012
S            DCA      \JBI
S            JMP      Q1B
S  Q1A,      CLA CLL
S            DCA      \ISWCH   /CLEAR THE SWITCH
S  Q1B,      CLA CLL  IAC
S  Q1,       RAR               /CONVERT BIT # TO DATA WORD
S            ISZ      \JBI
S            JMP      Q1
S            TAD      \ISWCH
S            DCA      \JBI
             IWOR=IWORD
             IBI=IBIT+2
             LOH=LOHI
             ICNT=0
      50     CALL LDUDC (12,JBI)
S  Q5,       CLA CLL
             IF (IPASS) 150,60,150
      60     IPASS=1
S            CLA CLL
S            TAD      \MANEN
S            SZA               /SKIP IF AUTO DISABLE PERMITTED
S            JMP      Q2       /AUTO DISABLE NOT ALLOWED-CHECK STATUS OF WORD
S  Q4,       CLA CLL           /CHECK THE AUTO/MANUAL SWITCH
S            TAD      (7767
S            DCA      \ICNT
S            TAD      (0002
S            JMS      READ
S            SZA               /SKIP IF SWITCH IS MANUAL
S            JMP      Q2       /AUTO- GO AHEAD AND CHECK POINT STATUS
S            CLA CLL           /MANUAL- SEND AUTO DISABLE SIGNAL
S            TAD      \JBI     /LOGICAL OR JBI WITH 0002
S            CMA
S            AND      (7775    /7775=NOT0002
S            CMA
S            DCA      \JBI
S            JMP      \50
S  Q2,       CLA CLL
S            TAD      \IBI
S            CIA
S            DCA      \ICNT    /INDEX TO # OF BIT ROTATIONS
S            TAD      \IWOR
S            JMS      READ
S            TAD      \LOH
S            SZA               /INDICATE DESIRED RESULTS?
S            JMP      Q5       /NO
     100     CALL LDUDC (12,0)
             RETURN
     150     IF (LOHI) 160,60,60
     160     RETURN
C
C
C
S  READ,     0000              /SUBROUTINE TO READ A UDC WORD
S            IOF
S            UDLA              /LOAD UDC ADDRESS
S            UDRD              /READ UDC WORD
S            ION      /RESTORE INTERRUPT
S  Q3,       RAL               /ROTATE UNTIL DESIRED
S            ISZ      \ICNT    /BIT IS IN POSITION 11
S            JMP      Q3
S            AND      (1       /MASK OUT ALL OTHER BITS
S            CIA
S            JMP I    READ
C
C
C
             END
C
C
C PURPOSE: TO MONITOR A DIGITAL INPUT POINT UNTIL IT IS FOUND
C          TO HAVE THE DESIRED STATUS (HI OR LO), AT WHICH TIME IT
C          RETURNS TO THE CALLING PROGRAM. BEFORE CHECKING THE
C          DESIGNATED INPUT POINT FOR ITS STATUS, A LAMP IS LIT
C          TO INDICATE WHAT ACTION THE PROGRAM IS CHECKING FOR.
C          NORMALLY WHILE WAITING FOR THE DESIRED STATUS, THE
```

```
C        AUTO/MANUAL CHANNEL IS ALSO QUERIED. SHOULD IT BE FOUND
C        TO BE IN THE MANUAL MODE, AN 'AUTO DISABLE' SIGNAL IS SENT
C        OUT, AND THE PROGRAM WILL LOOP AT THIS POINT UNTIL THE
C        SWITCH IS RETURNED TO THE AUTO CONDITION. THE PROGRAM
C        THEN CONTINUES TO EXAMINE THE UDC INPUT POINT. WHEN THE
C        DESIRED STATUS IS FOUND, THE HOLD LAMP IS TURNED OFF, AS
C        IS THE 'AUTO DISABLE' SIGNAL, AND THE PROGRAM RETURNS TO
C        THE CALLING PROGRAM.
C             (THE AUTO DISABLE FUNCTION CAN BE INHIBITED BY
C        SETTING THE JBIT ARGUMENT NEGATIVE.)
C
C
C
C CALL: CALL QUERY (IWORD,IBIT,LOHI,JBIT)
C
C        IWORD = UDC WORD NUMBER (DECIMAL)
C        IBIT  = BIT NUMBER FOR THAT WORD (DECIMAL)
C        LOHI  = DESIRED STATUS ( 1 OR 0 )
C        JBIT  = BIT NUMBER FOR INDICATOR LAMP (0-21)
C                NEGATIVE INDICATES AUTO DISABLE IS NOT TO BE ISSUED!!!
C
C
C
S OPDEF UDLA     6363     /LOAD ADDRESS
S OPDEF UDRD     6366     /READ UDC DATA WORD
C
C
C
         SUBROUTINE QUERY (IWORD,IBIT,LOHI,JBIT)
         IPASS=0
         ISWCH=JBIT
         MANEN=0
S        TAD      \ISWCH
S        SMA                /SKIP IF AUTO DISABLE NOT ALLOWED
S        JMP      Q6        /IT IS ALLOWED, LEAVE MANEN SET TO 0
S        CLA CLL            /NOT ALLOWED- MANEN=-1,ISWCH POSITIVE
         MANEN=-1
         ISWCH=-ISWCH
S Q6,    CLA CLL
         JBI=-(ISWCH+2)
S        TAD      \ISWCH
S        TAD      (7767
S        SPA SNA            /SKIP IF JBIT IS 10 OR GREATER
S        JMP      Q1A       /JBIT<10, SWITCH NEED NOT BE SET
S        CLA CLL IAC
S        DCA      \ISWCH    /SET THE SWITCH
S        TAD      \JBI      /MODIFY # OF BIT ROTATIONS
S        TAD      (0012
S        DCA      \JBI
S        JMP      Q1B
S Q1A,   CLA CLL
S        DCA      \ISWCH    /CLEAR THE SWITCH
S Q1B,   CLA CLL IAC
S Q1,    RAR
S        ISZ      \JBI
S        JMP      Q1
S        TAD      \ISWCH
S        DCA      \JBI
         IWOR=IWORD
         IBI=IBIT+2
         LOH=LOHI
         ICNT=0
   50    CALL LDUDC (13,JBI)
S Q5,    CLA CLL
         IF (IPASS) 150,60,150
   60    IPASS=1
S        CLA CLL
S        TAD      \MANEN
S        SZA                /SKIP IF AUTO DISABLE PERMITTED
S        JMP      Q2        /AUTO DISABLE NOT ALLOWED-CHECK STATUS OF WORD
S Q4,    CLA CLL            /CHECK THE AUTO/MANUAL SWITCH
S        TAD      (7767
S        DCA      \ICNT
S        TAD      (0002
S        JMS      READ
```

```
S          SZA                /SKIP IF SWITCH IS MANUAL
S          JMP      Q2        /AUTO- GO AHEAD AND CHECK POINT STATUS
S          CLA CLL            /MANUAL- SEND AUTO DISABLE SIGNAL
S          TAD      \JBI      /LOGICAL OR JBI WITH 0002
S          CMA
S          AND      (7775     /7775=NOT0002
S          CMA
S          DCA      \JBI
S          JMP      \50
S Q2,      CLA CLL
S          TAD      \IBI
S          CIA
S          DCA      \ICNT     /INDEX TO # OF BIT ROTATIONS
S          TAD      \IWOR
S          JMS      READ
S          TAD      \LOH
S          SZA                /INDICATE DESIRED RESULTS?
S          JMP      Q5        /NO
  100      CALL LDUDC (13,0)
           RETURN
  150      IF (LOHI) 160,60,60
  160      RETURN
C
C
C
S READ,    0000               /SUBROUTINE TO READ A UDC WORD
S          IOF
S          UDLA               /LOAD UDC ADDRESS
S          UDRD               /READ UDC WORD
S          ION      /RESTORE INTERRUPT
S Q3,      RAL                /ROTATE UNTIL DESIRED
S          ISZ      \ICNT     /BIT IS IN POSITION 11
S          JMP      Q3
S          AND      (1        /MASK OUT ALL OTHER BITS
S          CIA
S          JMP I    READ
C
C
C
           END
C          PURPOSE: DETERMINE STATUS OF A SPECIFIC BIT IN AN
C                   INCOME BINARY DATA WORD
C
C          HARDWARE: UDC-8 UNIVERSAL DIGITAL CONTROL
C
C          CALLING PROCEDURE: CALL INTRG (MODUL, NBIT, NSTAT)
C
C          ARGUMENTS:  MODUL = MODULE ADDRESS
C                      NBIT = BIT POSITION TO BE EXAMINED
C                      NSTAT = RESULT OF EXAMINATION (1=OFF, 2=ON)
C
C          SABR OP CODE DEFINITIONS:
C
S OPDEF UDLA     6363         /LOAD ADDRESS
S OPDEF UDRD     6366         /READ UDC-8 DATA WORD
C
           SUBROUTINE INTRG (MODAD, MBIT, MSTAT)
           MODUL = MODAD
           NBIT = MBIT
           NSTAT = 0
           MSTAT = 1
S          TAD      \MODUL
S          IOF                /INHIBIT INTERRUPTS
S          UDLA
S          UDRD
S          ION                /RE-ENABLE INTERRUPTS
S          DCA      \NSTAT
S          TAD      \NBIT
S          CMA
S          DCA      \NBIT
S          STL
S MOVE,    RAR
S          ISZ      \NBIT
S          JMP      MOVE
```

```
S         AND      \NSTAT
S         DCA      \NSTAT
          IF (NSTAT) 10,20,10
   10     MSTAT = 2
 20       RETURN
          END
*
      $$
C
C         PURPOSE: READ AND DIGITIZE INCOMING VOLTAGES
C
C         HARDWARE: AD01-A ANALOG TO DIGITAL CONVERTOR
C
C         CALLING PROCEDURE: CALL ADCON (IGAIN, ICHAN, VOLTS)
C
C         ARGUMENTS:  IGAIN = FULL SCALE GAIN SELECTION FACTOR
C                     ICHAN = MULTIPLEXER CHANNEL ADDRESS
C                     VOLTS = DIGITIZED VOLTAGE (BIPOLAR)
C
C         SABR OP CODE DEFINITIONS:
C
S OPDEF BSW     7002    /SWAP BYTES IN ACCUM
S OPDEF ADSC    6535    /SELECT GAIN AND CHANNEL
S OPDEF ADRB    6532    /READ A/D BUFFER
S SKPDF ADSF    6531    /SKIP ON A/D DONE FLAG
C
          SUBROUTINE ADCON (JGAIN, JCHAN, VOLTS)
          IGAIN = JGAIN
          ICHAN = JCHAN
          IVOLT = 0
S         TAD      \IGAIN
S         BSW
S         TAD      \ICHAN
S         IOF
S         ADSC
S WAIT,   ADSF
S         JMP      WAIT
S         ADRB
S         ION
S         DCA      \IVOLT
          IGAIN = IGAIN +1
          GO TO (10, 20, 30, 40), IGAIN
  10      SCALE = 10.0
          GO TO 50
  20      SCALE = 5.00
          GO TO 50
  30      SCALE = 2.50
          GO TO 50
  40      SCALE = 1.00
  50      VOLTS = IVOLT
          VOLTS = VOLTS*SCALE/1023.0
          RETURN
          END
*
      $
C
C         PURPOSE: OUTPUT ANY BINARY WORD
C
C         HARDWARE: UDC-8 UNIVERSAL DIGITAL CONTROL
C
C         CALLING PROCEDURE: CALL LDUDC (MODUL, IWORD)
C
C         ARGUMENTS:  MODUL = MODULE ADDRESS
C                     IWORD = DATA WORD TO BE SENT
C                NOTE: IF MODUL ARGUMENT IS NEGATIVE, RETURN TO
C                      CALLING PROGRAM WILL BE WITH INTERRUPT
C                      TURNED OFF.
C
C         SABR OP CODE DEFINITIONS:
C
S OPDEF UDLA    6363    /LOAD ADDRESS
S OPDEF UDLD    6367    /LOAD DATA WORD
C
```

```
      SUBROUTINE LDUDC (MODAD, JWORD)
      MODUL = MODAD
      IWORD = JWORD
      ISIGN=1
      IF (MODUL) 20,30,30
   20 ISIGN=-1
      MODUL=-MODUL
   30 CONTINUE
S     IOF            /INHIBIT INTERRUPTS
S     TAD     \MODUL
S     UDLA
S     TAD     \IWORD
S     UDLD
      IF (ISIGN) 100,50,50
   50 CONTINUE
S     ION            /RE-ENABLE INTERRUPT
  100 RETURN
      END
*
    $$
C     -------------------------------------------------------
C
C     SUBROUTINE TO SET A NO-OP LOOP FOR REQ'D TIME DELAY
C     .02 SECS <TIME DELAY <40. SECS
C
C     -------------------------------------------------------
      SUBROUTINE DELAY(XTIME)
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
      DIMENSION COSTR(25),ICNST(10),LP(90),LR(90),LC(30),
     1 VELOC(8),DEPTH(7)
C     USE SCALING FACTOR IF TIM SHARING IS ENABLED
      SCALE=1.0
      IF (IFLG8) 30,20,30
   20 SCALE=0.35
   30 CONTINUE
      KNT=(-XTIME/.02048-.5)*SCALE
      I=0
S C,  NOP
S     ISZ     \I
S     JMP     C
S     ISZ     \KNT
S     JMP     C
      RETURN
      END
*
```

FOR DRAWWORKS

```
C     -------------------------------------------------------

C
C     ROUTINE TO READ IN D.S. VELOCITIES AND DEPTHS
C
C     -------------------------------------------------------

      SUBROUTINE VELIN
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
```

```
      8 IDRW9,IDR10,IDR11,IDR12,IDR13,IDR14,IDR15,IDR16,
      9 IDR17,IDR18,IDR19,IFLG1,IFLG2,IFLG3,IFLG4,IFLG5,
      A IFLG6,IFLG7,IFLG8,IFLG9,IREAD,IWRTE,KODE1,KODE2,
      B KODE3,KODEP,IDATA,LP,LR,LC,KOD7,KOD10,KOD11,KOD12,
      C KOUNT,NRUBT
        DIMENSION COSTR(25),ICNST(10),LP(90),LR(90),LC(30),
      1 VELOC(8),DEPTH(7)
        ISKP=1
        CALL CRT (1,1,159)
        WRITE (IWRTE,1010)
        GO TO 320
  250   CALL CRT (12,6,0)
        WRITE (IWRTE,1003)
        CALL CRT (20,5,158)
        READ (IREAD,1004) NOYES
        IF (NOYES-1605) 900,300,900
  300   CONTINUE
        CALL CRT (12,6,0)
        WRITE (IWRTE,1005)
  320   DO 350 IND=1,7
        IF (ISKP) 330,330,340
  330   CALL CRT (4+2*IND,50,158)
        READ (IREAD,1006) DEPTH(IND)
  340   CALL CRT(4+2*IND,43,158)
  350   WRITE (IWRTE,1001) DEPTH(IND)
        DO 400 IND=1,8
        IF (ISKP) 380,380,390
  380   CALL CRT (3+2*IND,67,158)
        READ (IREAD,1006) VELOC(IND)
  390   CALL CRT (3+2*IND,63,158)
  400   WRITE (IWRTE,1002) VELOC(IND)
        CALL CRT (20,5,158)
        CALL CRT (12,1,0)
        WRITE (IWRTE,1007)
        ISKP=0
        GO TO 250
  900   KODEP=1
        CALL PRLOW
        RETURN
 1001   FORMAT (F6.0)
 1002   FORMAT (F3.1)
 1003   FORMAT ('CHANGE? (YES OR NO)')
 1004   FORMAT (A2)
 1005   FORMAT ('ENTER 7 DEPTHS,'//6X'THEN 8 VELOCITIES')
 1006   FORMAT (F8.0)
 1010   FORMAT (32('-'),6X'BIT DEPTH'8X'D.S. VELOCITY'/
      1 48X'(FEET)'9X'(FEET/SECOND)'/9X'DRILL  STRING'
      2 16X'RIG FLOOR-0 FT'//7X'VELOCITY  PROFILE'/
      3 /32('-')////10X'INSTRUCTIONS'////////42X'BOTTOM')
        END
```

```
    $$
C       --------------------------------------------------------------
C
C       ROUTINE TO DETERMINE PROPER LOADED DRILL STRING VELOCITY
C
C       --------------------------------------------------------------
        SUBROUTINE SPEED
        COMMON  COSTR,XP,XR,XC,XSTOB,YSTOU,YSTOI,XWST,YWELL,YSTBY,
      1 XSTP1,XSTP2,YSTP1,YSTP2,DROWU,SROWU,XLIFT,DRW1,DRW2,
      2 DRW3,DRW4,DRW5,DRW6,DRW7,DRW8,DRW9,DRW10,XHOLE,
      3 VELOC,DEPTH,
      4 ICNST,NPLNE,NRUBR,NCOLR,NSTD,IBSX,IBSYU,IBSYI,IBWSX,
      5 IBWY,IBSTY,IBYU,IBYI,NY1,NY2,NXSW1,NXSW2,NYSU1,
      6 NYSU2,NYSI1,NYSI2,NYSS1,NYSS2,NSTAB,IBSTB,
      7 IDRW1,IDRW2,IDRW3,IDRW4,IDRW5,IDRW6,IDRW7,IDRW8,
      8 IDRW9,IDR10,IDR11,IDR12,IDR13,IDR14,IDR15,IDR16,
      9 IDR17,IDR18,IDR19,IFLG1,IFLG2,IFLG3,IFLG4,IFLG5,
      A IFLG6,IFLG7,IFLG8,IFLG9,IREAD,IWRTE,KODE1,KODE2,
      B KODE3,KODEP,IDATA,LP,LR,LC,KOD7,KOD10,KOD11,KOD12,
      C KOUNT,NRUBT
        DIMENSION COSTR(25),ICNST(10),LP(90),LR(90),LC(30),
      1 VELOC(8),DEPTH(7)
        DO 200 I=1,7
        IF (DEPTH(I)-(XP+XR+XC)) 200,200,300
  200   CONTINUE
        I=8
```

```
300   IDRW6=IFIX(VELOC(I)*DRW5)
      RETURN
      END
*
                          DRAWWORKS
C     -----------------------------------------------------------------
C
C     'PULL' - ROUTINE TO OPERATE DRAWWORKS IN OUTHOLE SEQUENCE
C
C     -----------------------------------------------------------------
C
S     OPDEF   JMPI    5400
S     OPDEF   DCAI    3400
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLME,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODEP,IDATA,LP,LR,LC,KOD7,KOD10,KOD11,KOD12,
     C KOUNT,NRUBT
      DIMENSION COSTR(25),ICNST(10),LP(90),LR(90),LC(30),
     1 VELOC(8),DEPTH(7)
C
C
C     THIS SECTION OF THE PROGRAM DETERMINES PUSH AND PULL
C     STARTING ADDRESSES AND TRANSFERS THEM TO MAILBOX
C     LOCATIONS SO THAT TIME-SHARING CAN PICK THEM UP.
C     (MAILBOX LOCATIONS ART 20000-20003.)
C
C
S     CLA CLL
S     6224                /READ INSTRUCTION FIELD
S     TAD     (6201       /SET UP CDF
S     DCA     INS1        /DEPOSIT INSTRUCTION WHERE NEEDED
S     TAD     INS1
S     DCA     INS2
S     TAD     INS1
S     DCA     INS3
S     TAD     INS1
S     DCA     INS4
S     TAD     POINT       /LOAD 'PULL' STARTING ADDRESS
S     6221                /CDF 2
S     DCAI    (7600
S INS1, BLOCK 1           /CDF TO BE DEPOSITED HERE
S     6224                /READ 'PULL' FIELD
S     DCA     INS1        /CONVERT IT TO A FLAG FOR RTF INSTRUCTION
S     CLL                 /CLEAR LINK BEFORE ROTATES
S     TAD     INS1
S     RTR
S     RAR
S     TAD     INS1
S     6221                /CDF 2
S     DCAI    (7601       /DEPOSIT FLAG AT 27601
S INS2, BLOCK 1
      CALL PUSH (IADRS,IFLAG)
S     TAD     \IADRS      /LOAD 'PULL' STARTING ADDRESS
S     6221                /CDF 2
S     DCAI    (7602       /DEPOSIT II AT 27602
S INS3, BLOCK 1
S     TAD     \IFLAG      /LOAD 'PULL' FLAG
S     6221                /CDF 2
S     DCAI    (7603       /DEPOSIT IT AT 27603
S     TAD     (5210       /DEPOSIT 'JUMP TO SELF' PROGRAM AT 76010
S     DCAI    (7610       /THIS IS FOR USE AS A DUMMY DRAWWORKS
S                         /PROGRAM WHEN DRAWWORKS ARE TO BE RUN MANUALLY
S INS4, BLOCK 1
S     6201
S     6202                /RETURN TO KEYBOARD MONITOR
```

```
S           JMPI      (7600
S POINT,              ENTER
S ENTER,              CLA CLL
C
C
C           THIS SECTION OPERATES THE DRAWWORKS
C
C
C           SAMPLE ZERO LOAD
   100      KOD10=16
            CALL LDUDC (10,KOD10)
            CALL IDLAY (10)
            KOD10=0
            CALL LDUDC (10,KOD10)
C           CHECK ELEVATOR LOCKED
            CALL QUERY (1,6,1,2)
C           ENGAGE LOW DRUM CLUTCH, CREEP MOTOR TO ENGAGE CLUTCH
            KOD10=320
            CALL LDUDC (10,KOD10)
C           WAIT FOR CLUTCH ENGAGED
            CALL QUERY (2,10,1,12)
C           STOP 'CREEP TO ENGAGE CLUTCH'
            KOD10=256
            CALL LDUDC (10,KOD10)
C           SPECIFY FINAL ELEVATOR POSITION
            CALL LDUDC (11,IDRW7+1024)
C           SPECIFY CREEP VELOCITY
            CALL LDUDC (11,IDRW4)
C           SET DRAWWORKS CREEP FLIP FLOP
            CALL LDUDC (9,512)
C           MOTOR MODE SELECT
            KOD10=-1792
            CALL LDUDC (10,KOD10)
C           WAIT FOR ELEVATOR LOAD ACQUIRED SIGNAL
            CALL QUERY (2,1,1,-4)
C           RAISE SLIPS
            CALL LDUDC (9,128)
C           WAIT FOR CONFIRMATION OF SLIPS RAISED
            CALL QUERY (2,4,1,1)
C           SAMPLE LOAD BEFORE GOING TO FULL SPEED
            KOD10=-1760
            CALL LDUDC (10,KOD10)
            CALL IDLAY (10)
C           ENABLE LOAD CONTROL
            KOD10=-1784
            CALL LDUDC (10,KOD10)
C           SPECIFY MAXIMUM VELOCITY
            CALL LDUDC (11,IDRW6)
C           SIGNAL DRAWWORKS NOT POSITIONED
            CALL LDUDC (13,32)
C           WAIT FOR ELEVATOR TO LIFT OUT OF TONGS' WAY
   130      CALL ATOD (1,JBITS)
            IF (IDR12-JBITS) 132,132,130
   132      CONTINUE
C           SIGNAL TONGS TO RAISE TO STANDBY
            CALL LDUDC (9,8)
C           WAIT FOR FINAL BLOCK POSITION ACHIEVED
   230      CALL ATOD (1,JBITS)
            IF (IDRW7-JBITS-IDR18) 232,232,230
   232      CONTINUE
C           WAIT FOR ZERO VELOCITY
            CALL QUERY (2,5,1,-11)
C           SET SLIPS
            CALL LDUDC (9,64)
C           SIGNAL RACKERS TO PROCEED
            IFLG1=0
C           DELAY TO ALLOW SLIPS AND BRAKE TO ACTUATE
            CALL IDLAY (IDRW1)
C           DE-ENERGIZE MOTOR, DISABLE 'LOAD CONTROL ENABLE'
            KOD10=256
            CALL LDUDC (10,KOD10)
C           DELAY, THEN CLUTCH OUT LOW DRUM
            CALL IDLAY (IDRW2)
            KOD10=0
            CALL LDUDC (10,KOD10)
```

```
C       SET DESIRED FINAL POSITION + N FEET
        CALL LDUDC (11,IDR12+1024)
C       SET CREEP VELOCITY
        CALL LDUDC (11,IDRW5)
C       SET CREEP FLIP FLOP
        CALL LDUDC (9,512)
C       CHECK FOR SLIPS SET
        CALL QUERY (2,3,1,0)
C       CHECK FOR CLUTCH DISENGAGED
        CALL QUERY (2,10,0,14)
C       SELECT BRAKE MODE
        KOD10=1024
        CALL LDUDC (10,KOD10)
C       MONITOR BLOCK POSITION, SLIPS SET CHANNEL, AND
C       ELEVATOR LOAD FOR RELEASE OF LOAD
        CALL UNLD
C       CHECK THE PAUSE SWITCH
        CALL INTRG (2,0,IEROR)
        GO TO (245,240),IEROR
C       PAUSE INDICATED,SET BRAKE
  240   KOD10=0
        CALL LDUDC (10,KOD10)
C       WAIT FOR PAUSE SWITCH TO BE TURNED OFF
        CALL QUERY (2,0,0,8)
  245   CONTINUE
C       CHECK TO SEE IF RACKER ARMS HAVE THE PIPE
  250   IF (IFLG2) 251,265,251
C       APPLY THE BRAKE
  251   KOD10=0
        CALL LDUDC (10,KOD10)
        CALL CFLAG(IFLG2)
  265   CONTINUE
C       RELEASE THE BRAKE
        IFLG2=-1
        KOD10=1024
        CALL LDUDC (10,KOD10)
C       SIGNAL TONGS TO BREAK OUT JOINT
        CALL LDUDC (8,2)
C       RETRACT BLOCK
        CALL LDUDC (9,1024)
        IFLG9=0
C       MONITOR FOR BLOCK RETRACTED WHILE CHECKING ELEVATOR HEIGHT
C       GET THE CURRENT BLOCK POSITION
        CALL ATOD (1,JBITS)
        ISTRT = JBITS
C       HAS BLOCK RETRACTED YET?
        CALL LDUDC (13,256)
  266   CALL INTRG (1,5,IEROR)
        GO TO (267,269),IEROR
C       BLOCK NOT RETRACTED YET, READ POSITION AGAIN
  267   CALL ATOD (1,JBITS)
C       HAS SPECIFIED DISTANCE BEEN TRAVELED WITHOUT
C       RECEIVING BLOCK RETRACTED SIGNAL?
        IF (ISTRT-JBITS-IDR16) 266,268,268
C       YES-BRAKE ON
  268   KOD10=0
        CALL LDUDC (10,KOD10)
C       WAIT UNTIL BLOCK IS RETRACTED, SEND MANUAL ENABLE SIGNAL
        CALL QUERY (1,5,1,3)
C       BRAKE OFF AND CONTINUE
        KOD10=1024
        CALL LDUDC (10,KOD10)
  269   CALL LDUDC (13,0)
C       FULL SPEED AHEAD
        CALL LDUDC (11,IDR11)
C       CHECK FOR TONG SEQUENCE COMPLETE
        CALL QUERY (2,6,1,-9)
C       SIGNAL 'BLOCK NOT POSITIONED'
        CALL LDUDC (13,32)
C       RESET FINAL POSITION TO JUST BELOW JOINT HEIGHT
        CALL LDUDC (11,IDRW9+1024)
C       CHECK FOR FINAL POSITION ATTAINED
  275   CALL ATOD (1,JBITS)
        IF (IDRW9-JBITS+IDR18) 275,280,280
C       DISABLE BRAKE CONTROLLER
```

```
  280   KOD10=0
        CALL LDUDC (10,KOD10)
C       WAIT FOR ZERO BLOCK VELOCITY
        CALL QUERY (2,5,1,-11)
C       WAIT FOR RACKERS TO BE RETRACTED
        CALL CFLAG (IFLG3)
  295   IFLG3=-1
C       EXTEND BLOCK
        CALL LDUDC (9,2047+1)
C       CHECK FOR PAUSE
        CALL QUERY (2,0,0,8)
        IFLG9=-1
C       IS THERE ANOTHER STAND LEFT IN THE HOLE?
        IF (IDRW7) 300,300,100
C       SIGNAL END OF TRIP AND SEND AUTO DISABLE
  300   CALL LDUDC (13,-2045)
        IFLG4=-1
        IFLG5=0
  310   GO TO 310
S       ENTRY OPEN
S OPEN, BLOCK 2
S       RETRN OPEN
S       ENTRY EXIT
S EXIT, BLOCK 2
S       RETRN EXIT
        END
C       ----------------------------------------------------------------
C
C
C       'PUSH' - ROUTINE TO OPERATE DRAWWORKS INHOLE SEQUENCE
C
C       ----------------------------------------------------------------
C
C       CALLING THIS SUBROUTINE RETURNS ITS STARTING ADDRESS
C       AND FIELD AS AS REQUIRED BY THE TIME SHARING EXECUTIVE
C
        SUBROUTINE PUSH (IADRS,IFLAG)
        COMMON  COSTR,XP,XR,XC,XSTOR,YSTOU,YSTOI,XWST,YWELL,YSTBY,
      1 XSTP1,XSTP2,YSTP1,YSTP2,DROWU,SROWU,XLIFT,DRW1,DRW2,
      2 DRW3,DRW4,DRW5,DRW6,DRW7,DRW8,DRW9,DRW10,XHOLE,
      3 VELOC,DEPTH,
      4 ICNST,NPLNE,NRUBR,NCOLR,NSTD,IBSX,IBSYU,IBSYI,IBWSX,
      5 IBWY,IBSTY,IBYU,IBYI,NYI,NY2,NXSW1,NXSW2,NYSU1,
      6 NYSU2,NYSI1,NYSI2,NYSS1,NYSS2,NSTAB,IBSTB,
      7 IDRW1,IDRW2,IDRW3,IDRW4,IDRW5,IDRW6,IDRW7,IDRW8,
      8 IDRW9,IDR10,IDR11,IDR12,IDR13,IDR14,IDR15,IDR16,
      9 IDR17,IDR18,IDR19,IFLG1,IFLG2,IFLG3,IFLG4,IFLG5,
      A IFLG6,IFLG7,IFLG8,IFLG9,IREAD,IWRTE,KODE1,KODE2,
      B KODE3,KODEP,IDATA,LP,LR,LC,KOD7,KOD10,KOD11,KOD12,
      C KOUNT,NRUBT
        DIMENSION COSTR(25),ICNST(10),LP(90),LR(90),LC(30),
      1 VELOC(8),DEPTH(7)
C
C
C       THIS SECTION RETURNS THE STARTING ADDRESS
C
C
S       CLA CLL
S       TAD     POINT   /THIS IS THE STATING ADDRESS
S       DCA     \IADR
S       6224            /READ THE INSTRUCTION FIELD
S       DCA     \IFL    /SET UP THE FLAG FOR
S       TAD     \IFL     /TIME-SHARING'S RTF
S       RTR               /INSTRUCTION
S       RAR                /↑
S       TAD     \IFL        /↑
S       DCA     \IFL         /↑
        IADRS=IADR
        IFLAG=IFL
        RETURN
S POINT,        ENTER
S ENTER,        CLA CLL
C
```

```
C
C     THIS SECTION OPERATES THE DRAWWORKS
C
C
C     ENGAGE HIGH DRUM CLUTCH, BRAKE STILL ON
  100 CONTINUE
      KOD10=640
      CALL LDUDC (10,KOD10)
C     OPEN ELEVATOR/RETRACT BLOCK
      CALL LDUDC (9,1024)
C     SPECIFY EMPTY BLOCK ASCENT VELOCITY
      CALL LDUDC (11,IDR10)
C     SPECIFY FINAL POSITION (10..4 ADDED FOR D/A CHAN. ...)
      CALL LDUDC (11,IDRW7+1024)
C     CHECK FOR BLOCK RETRACTED
      CALL QUERY (1,5,1,3)
C     CHECK FOR CLUTCH ENGAGED
      CALL QUERY (2,10,1,12)
C     SIGNAL MOTOR CONTROLLER SELECT
      KOD10=-1408
      CALL LDUDC (10,KOD10)
C     MONITOR FOR ELEVATOR OUT OF TONGS WAY
  110 CALL ATOD (1,JBITS)
      IF (IDR12-JBITS) 112,110,110
  112 CONTINUE
C     SIGNAL TONGS TO PROCEED TO STANDBY
      CALL LDUDC (9,8)
C     MONITOR FOR BLOCK POSITION ACHIEVED
      CALL LDUDC (13,32)
  130 CALL ATOD (1,JBITS)
      IF (IDRW7-JBITS-IDR18) 132,132,130
  132 CONTINUE
C     MONITOR FOR ZERO VELOCITY
      CALL QUERY (2,5,1,-11)
C     MOTOR DE-SELECT, CLUTCH OUT HIGH DRUM
      KOD10=128
      CALL LDUDC (10,KOD10)
C     SAMPLE ZERO LOAD
      KOD10=144
      CALL LDUDC (10,KOD10)
      CALL IDLAY (10)
      KOD10=128
      CALL LDUDC (10,KOD10)
C     CHECK CLUTCH DISENGAGED
      CALL QUERY (2,10,0,14)
C     WAIT UNTIL PIPE IS AT WELL CENTER LINE AND
C     LIFTING HEAD LOAD HAS BEEN RELIEVED
      CALL CFLAG (IFLG6)
      IFLG6=-1
C     EXTEND BLOCK AND CLOSE ELEVATOR
      CALL LDUDC (9,2047+1)
C     CHECK THAT ELEVATOR LOCKED
      CALL QUERY (1,6,1,2)
C     WAIT UNTIL JOINT IS MADE UP
      CALL QUERY (2,8,1,9)
C     ENGAGE LOW DRUM CLUTCH AND CREEP TO ENGAGE CLUTCH
      KOD10=448
      CALL LDUDC (10,KOD10)
C     WAIT FOR CLUTCH ENGAGED
      CALL QUERY (2,10,1,12)
C     CANCEL 'CREEP TO ENGAGE CLUTCH'
      KOD10=384
      CALL LDUDC (10,KOD10)
C     SPECIFY MAXIMUM ELEVATOR POSITION
      CALL LDUDC (11,2047)
C     SPECIFY CREEP VELOCITY
      CALL LDUDC (11,IDRW4)
C     SET CREEP FLIP FLOP
      CALL LDUDC (9,512)
C     MOTOR MODE SELECT
      KOD10=-1664
      CALL LDUDC (10,KOD10)
C     MONITOR FOR ELEVATOR LOAD
      CALL QUERY (2,1,1,4)
C     RAISE SLIPS
```

```
      CALL LDUDC (9,128)
C     MONITOR FOR SLIPS RAISED
      CALL QUERY (2,4,1,1)
C     SAMPLE DRILL STRING LOAD
      KOD10=-1632
      CALL LDUDC (10,KOD10)
      CALL IDLAY (10)
      KOD10=-1664
      CALL LDUDC (10,KOD10)
C     MOTOR DE-ENERGIZE
      KOD10=384
      CALL LDUDC (10,KOD10)
C     DELAY BEFORE RELEASING CLUTCH
      CALL IDLAY (IDRW2)
C     RELEASE LOW DRUM CLUTCH
      KOD10=128
      CALL LDUDC (10,KOD10)
C     SPECIFY ELEVATION CLEAR OF TONGS
      CALL LDUDC (11,IDR12+1024)
C     SPECIFY DESCENT VELOCITY
      CALL LDUDC (11,IDRW7)
C     CHECK THAT ARMS HAVE BEEN RETRACTED
      CALL CFLAG (IFLG7)
      IFLG7=-1
C     CHECK CLUTCH DISENGAGED
      CALL QUERY (2,10,0,14)
C     BRAKE MODE SELECT, LOAD CONTROL ENABLE
      KOD10=1160
      CALL LDUDC (10,KOD10)
C     CHECK FOR TONGS LOWERED TO FLOOR
      CALL QUERY (2,6,1,-9)
C     SIGNAL DRILL STRING NOT POSITIONED
      CALL LDUDC (13,32)
C     SPECIFY TOOL JOINT ELEVATION
      CALL LDUDC (11,IDRW8+1024)
C     MONITOR FOR FINAL BLOCK POSITION ATTAINED
  340 CALL ATOD (1,JBITS)
      IF (JBITS-IDRW8+IDR18) 342,342,340
  342 CONTINUE
C     MONITOR FOR ZERO VELOCITY
      CALL QUERY (2,5,1,-11)
C     TURN BRAKE CONTROLLER AND LOAD CONTROL OFF
      KOD10=128
      CALL LDUDC (10,KOD10)
C     SET SLIPS
      CALL LDUDC (9,64)
C     SPECIFY CREEP VELOCITY
      CALL LDUDC (11,IDRW5)
C     SPECIFY MINIMUM BLOCK POSITION
      CALL LDUDC (11,1024)
C     SET CREEP FLIP FLOP
      CALL LDUDC (9,512)
C     CHECK FOR SLIPS SET
      CALL QUERY (2,3,1,0)
C     BRAKE CONTROLLER ON
      KOD10=1152
      CALL LDUDC (10,KOD10)
      CALL UNLD
C     BRAKE CONTROLLER OFF
      KOD10=128
      CALL LDUDC (10,KOD10)
C     CHECK FOR PAUSE
      CALL QUERY (2,0,0,8)
C     IS THERE ANOTHER STAND LEFT IN THE RACK?
      IF (IFLG4) 100,400,100
  400 IFLG5=0
C     SIGNAL END OF TRIP, SEND AUTO DISABLE
      CALL LDUDC (13,-2045)
  410 GO TO 410
      END

C     ----------------------------------------------------------------
C
C     ROUTINE TO MONITOR SETTING OF D.S. AUTO SLIPS
C
C     ----------------------------------------------------------------
```

```
C
      SUBROUTINE UNLD
      COMMON  COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,ANGLE,
     3 VELOC,DEPTH,
     4 ICNST,NPLNE,NRUBR,NCOLR,NSTD,IBSX,IBSYU,IBSYI,IBWSX,
     5 IBWY,IBSTY,IBYU,IBYI,NY1,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19,IFLG1,IFLG2,IFLG3,IFLG4,IFLG5,
     A IFLG6,IFLG7,IFLG8,IFLG9,IREAD,IWRTE,KODE1,KODE2,
     B KODE3,KODE5,IDATA,LP,LB,LC,KOD7,KOD10,KOD11,KOD12,
     C KOCNT,NRUBT
      DIMENSION COSTR(25),ICNST(10),LP(90),LB(90),LC(30),
     1 VELOC(8),DEPTH(7)
C     SELECT PROPER DISTANCE TO LOWER FOR CLEARING JOINT
      GO TO (10,20),KODE1
   10 IDIST=IDR15
      IADD=0
      GO TO 30
   20 IDIST=IDR14
      IADD=128
   30 CONTINUE
C     READ THE CURRENT POSITION OF THE BLOCK
      CALL ATOD (1,JBITS)
      ISTRT=JBITS
C     SIGNAL 'BLOCK LOAD NOT RELEASED' HOLD LAMP
      CALL LDUDC (13,64)
C     CHECK FOR BLOCK LOAD
  130 CALL INTRG (2,1,IEROR)
C     GO TO 200 IF LOAD RELEASED, 150 IF NOT
      GO TO (200,150),IEROR
  150 CONTINUE
C     READ BLOCK POSITION
      CALL ATOD (1,JBITS)
C     HAS BLOCK LOWERED SPECIFIED DISTANCE YET?
C     NO-GO TO 130, YES-GO TO 170
      IF (ISTRT-JBITS-IDR13) 130,170,170
C     SLIPS NOT HOLDING, SET BRAKE
  170 KOD10=IADD
      CALL LDUDC (10,KOD10)
C     LOOP UNTIL BLOCK LOAD RELEASED
      CALL QUERY (2,1,0,5)
      RETURN
C
C
C     BLOCK LOAD HAS BEEN RELEASED,LOWER AN ADDITIONAL
C     DISTANCE
C     TURN HOLDING LAMP OFF
  200 CALL LDUDC (13,0)
C     READ AND SAVE THE CURRENT BLOCK POSITION
      CALL ATOD (1,JBITS)
      ISTRT=JBITS
  230 CALL ATOD (1,JBITS)
      IF (ISTRT-JBITS-IDIST) 230,270,270
  270 RETURN
      END

$$
C     -------------------------------------------------------------
C
C     SUBROUTINE TO PROVIDE A DELAY OF A SPECIFIED NUMBER OF SECONDS.
C     ARGUMENT IS INTEGER IN HUNDREDTHS OF SECONDS.
C
C     -------------------------------------------------------------
      SUBROUTINE IDLAY (ITIME)
      I=0
      ITIM=ITIME
S     CLA CLL
S     TAD     \ITIM
S     RAR
S     CLL
```

```
S        RAR
S        CIA
S        DCA     \ITIM
S C,     ISZ     \I
S        JMP     C
S        ISZ     \ITIM
S        JMP     C
         RETURN
         END
*

         $$
C        -----------------------------------------------------------
C
C        ROUTINE TO WAIT FOR A FLAG TO BE SET
C
C        -----------------------------------------------------------
C
         SUBROUTINE CFLAG(IFLAG)
         COMMON  COSTR,XP,XR,XC,XSTOR,YSTOU,YSTOI,XWST,YWELL,YSTBY,
       1 XSTP1,XSTP2,YSTP1,YSTP2,DROWU,SROWU,XLIFT,DRW1,DRW2,
       2 DRW3,DRW4,DRW5,DRW6,DRW7,DRW8,DRW9,DRW10,XHOLE,
       3 VELOC,DEPTH,
       4 ICNST,NPLNE,NRUBR,NCOLR,NSTD,IBSX,IBSYU,IBSYI,IBWSX,
       5 IBWY,IBSTY,IBYU,IBYI,NY1,NY2,NXSW1,NXSW2,NYSU1,
       6 NYSU2,NYSI1,NYSI2,NYSS1,NYSS2,NSTAB,IBSTB,
       7 IDRW1,IDRW2,IDRW3,IDRW4,IDRW5,IDRW6,IDRW7,IDRW8,
       8 IDRW9,IDR10,IDR11,IDR12,IDR13,IDR14,IDR15,IDR16,
       9 IDR17,IDR18,IDR19,IFLG1,IFLG2,IFLG3,IFLG4,IFLG5,
       A IFLG6,IFLG7,IFLG8,IFLG9,IREAD,IWRTE,KODE1,KODE2,
       B KODE3,KODEP,IDATA,LP,LR,LC,KOD7,KOD10,KOD11,KOD12,
       C KOUNT,NRUBT
        DIMENSION COSTR(25),ICNST(10),LP(90),LR(90),LC(30),
       1 VELOC(8),DEPTH(7)
C       SIGNAL RACKERS NOT READY
        MANAU=16
 211    CALL LDUDC (13,MANAU)
C       CHECK THE AUTO/MANUAL SWITCH
 212    CALL INTRG (2,7,IEROR)
        GO TO (213,215),IEROR
C       SEND OUT AUTO DISABLE
 213    MANAU=18
        GO TO 211
C       CHECK THE FLAG
 215    IF (IFLAG) 212,217,212
C       TURN OFF HOLD LAMP, AUTO DISABLE
 217    CALL LDUDC (13,0)
        RETURN
[redacted]  END
*

     $$
C       PURPOSE:          TO DIGITIZE AN INCOMING 10V SIGNAL INTO
C                         A 10 BIT WORD.
C
C       HARDWARE:         AD01-A ANALOG TO DIGITAL CONVERTER
C
C       CALLING SEQUENCE: CALL ATOD (JCHAN,JBITS)
C
C       ARGUMENTS:        JCHAN = MULTIPLEXER CHANNEL ADDRESS
C                         JBITS = DIGITIZED 10V BIT PATTERN
C
C
S       OPDEF   ADSC     6535    /SELECT GAIN AND CHANNEL
S       OPDEF   ADRB     6532    /READ A/D BUFFER
S       SKPDF   ADSF     6531    /SKIP ON A>D DONE FLAG
C
        SUBROUTINE ATOD (JCHAN,JBITS)
        ICHAN=JCHAN
S       TAD     \ICHAN
S       IOF
S       ADSC
S WAIT, ADSF
S       JMP     WAIT
S       ADRB
```

```
S         ION
S         DCA      \IBITS
          JBITS=IBITS
          IF (IBITS) 50,100,100
   50     JBITS=-IBITS
  100     RETURN
          END
*
```

RIG DATA

```
C         ----------------------------------------------------------
C
C         PROGRAM TO READ, COMPUTE, INITIALIZE AND PUNCH OUT RIG
C         DATA FOR ROUTINE RIG1
C
C         ----------------------------------------------------------
          COMMON  COSTR,XP,XR,XC,XSTOR,YSTOU,YSTOI,XWST,YWELL,YSTBY,
        1 XSTP1,XSTP2,YSTP1,YSTP2,DROWU,SROWU,XLIFT,DRW1,DRW2,
        2 DRW3,DRW4,DRW5,DRW6,DRW7,DRW8,DRW9,DRW10,XHOLE,
        3 VELOC,DEPTH,
        4 ICNST,NPLNE,NRUBR,NCOLR,NSTD,IBSX,IBSYU,IBSYI,IBWSX,
        5 IBWY,IBSTY,IBYU,IBYI,NY1,NY2,NXSW1,NXSW2,NYSU1,
        6 NYSU2,NYSI1,NYSI2,NYSS1,NYSS2,NSTAB,IBSTB,
        7 IDRW1,IDRW2,IDRW3,IDRW4,IDRW5,IDRW6,IDRW7,IDRW8,
        8 IDRW9,IDR10,IDR11,IDR12,IDR13,IDR14,IDR15,IDR16,
        9 IDR17,IDR18,IDR19,IFLG1,IFLG2,IFLG3,IFLG4,IFLG5,
        A IFLG6,IFLG7,IFLG8,IFLG9,IREAD,IWRTE,KODE1,KODE2,
        B KODE3,KODEP,IDATA,LP,LR,LC,KOD7,KOD10,KOD11,KOD12,
        C KOUNT,NRUBT
          DIMENSION COSTR(25),ICNST(10),LP(90),LR(90),LC(30),
        1 VELOC(8),DEPTH(7),REAL(35),INT(10)
C         READ RIG DATA
          OVSHT=10.
          IREAD=1
          IWRTE=1
          CALL CRT(1,1,159)
          CALL CRT(1,1,0)
          WRITE(IWRTE,5)
    5     FORMAT('INPUT RIG DATA (F10.3)')
          READ(IREAD,10)COSTR
   10     FORMAT(F10.3)
C         READ RAMP DATA
          CALL CRT(1,1,159)
          CALL CRT(1,1,0)
          WRITE(IWRTE,15)
   15     FORMAT('INPUT RAMP DATA (I4)')
          READ(IREAD,25)ICNST
   25     FORMAT(I4)
          CALL CRT (1,1,159)
          CALL CRT (1,1,0)
          WRITE (IWRTE,30)
   30     FORMAT ('INPUT DRAWWORKS REAL DATA (F10.3)')
          READ (IREAD,10) REAL
          CALL CRT (1,1,159)
          CALL CRT (1,1,0)
          WRITE (IWRTE,35)
   35     FORMAT ('INPUT DRAWWORKS INTEGER DATA (I4)')
          READ (IREAD,20) INT
          ICNST(7)=-ICNST(7)*45
   20     FORMAT(I5)
C         COMPUTE THE FOLLOWING
C         DISTANCE BETWEEN X=XMAX LINE AND STORAGE POSITION.
C         ALSO DISTANCE BETWEEN FIRST COLUMN ON THE LEFT
C         SIDE AND THE REFRENCE AXIS
          D2=.5*(COSTR(15)-COSTR(8)-COSTR(7)-22.*COSTR(11)
        1 -COSTR(12))
C         X CO-ORDINATE OF STORAGE POSITION
          XSTOR=COSTR(15)-D2
C         Y CO-ORDINATE AOF STORAGE POSITION AT FINGER BOARD LEVEL .
          YSTOF=COSTR(13)+COSTR(6)+7.*COSTR(10)
C         Y CO-ORDINATE OF STORAGE POSITION AT SET BACK LEVEL
          YSTOS = COSTR (13) + COSTR (5) + 7.x COSTR (9)
C         Y CO-ORDINATE OF STORAGE POSITION AT [illegible] LEVEL
          YSTOU=D(YSTOS,YSTOF,COSTR(4))
C         Y CO-ORDINATE OF STORAGE POSITION AT INT. ARM LEVEL
          YSTOI=D(YSTOS,YSTOF,COSTR(2))
C         BIT PATTERN OF X CO-ORDINATE OF STORAGE POSITION
          CALL BITS(COSTR(15),XSTOR,IBSX)
```

```
C     BIT PATTERN OF Y CO-ORDINATE OF STORAGE POSITION AT
C     AT UPPER ARM LEVEL
      CALL BITS(COSTR(16),YSTOU,IBSYU)
C     BIT PATTERN OF Y CO-ORDINATE OF STORAGE POSITION AT
C     INT. ARM LEVEL
      CALL BITS(COSTR(16),YSTOI,IBSYI)
C     X CO-ORDINATE OF WELL C.L. AND ST.BY POSITION
      XWST=D2+11.*COSTR(11)+COSTR(8)
C     Y CO-ORDINATE OF WELL C.L.
      YWELL=COSTR(13)
C     Y CO-ORDINATE OF ST.BY POSITION
      YSTBY=COSTR(13)+COSTR(14)
C     BIT PATTERN OF X CO-ORDINATE OF WELL C.L. AND STAND BY POSITION
      CALL BITS(COSTR(15),XWST,IBWSX)
C     BIT PATTERN OF Y CO-ORDINATE OF WELL C.L.
      CALL BITS(COSTR(16),YWELL,IBWY)
C     BIT PATTERN OF Y CO-ORDINATE OF STAND BY POSITION
      CALL BITS(COSTR(16),YSTBY,IBSTY)
C     BIT PATTERN OF Y STORAGE+10. AT UPPER ARM
      Y=YSTOU+OVSHT
      CALL BITS(COSTR(16),Y,IBYU)
C     BIT PATTERN OF Y STORAGE+10. AT THE INT. ARM LEVEL
      Y=YSTOI+OVSHT
      CALL BITS(COSTR(16),Y,IBYI)
C     STEP SIZE ON RAMP 1 ALONG X AXIS
      X=ICNST(1)
      XSTP1=COSTR(15)*X/4095.
C     STEP SIZE ON RAMP 2 ALONG X AXIS
      X=ICNST(2)
      XSTP2=COSTR(15)*X/4095.
C     STEP SIZE ON RAMP 1 ALONG YAXIS
      X=ICNST(3)
      YSTP1=COSTR(16)*X/4095.
C     STEP SIZE ON RAMP 2 ALONG Y AXIS
      X=ICNST(4)
      YSTP2=COSTR(16)*X/4095.
C     NO. OF STEPS ON RAMP 1 AND 2 TO MOVE RACKERS BACK BY
C     10. INCHES
      CALL RAMP(OVSHT,YSTP1,YSTP2,NY1,NY2)
C     NO OF STEPS ON RAMPS 1 AND 2 TO MOVE RACKERS FROM STORAGE
C     TO WELL C. L. ON X AXIS
      X=XSTOR-XWST
      CALL RAMP(X,XSTP1,XSTP2,NXSW1,NXSW2)
C     NO OF STEPS ON RAMPS 1 AND 2 TO MOVE RACKERS FROM STORAGE
C     +10. IN. TO STANDBY POSITION ON Y AXIS AT UPPER ARM
      Y=YSTOU+OVSHT-YSTBY
      CALL RAMP(Y,YSTP1,YSTP2,NYSU1,NYSU2)
C     SAME AT INT. ARM
      Y=YSTOI+OVSHT-YSTBY
      CALL RAMP(Y,YSTP1,YSTP2,NYSI1,NYSI2)
C     NO OF STEPS TO MOVE RACKERS FROM STAND BY TO WELL C. L.
      Y=YSTBY-YWELL
      CALL RAMP(Y,YSTP1,YSTP2,NYSS1,NYSS2)
C     DISTANCE BETWEEN WELL C.L. AND FIRST ROW OF D.P. AT THE
C     UPPER LELEL
      DROWU=D(COSTR(5),COSTR(6),COSTR(4))
C     SPACING BETWEEN EACH ROW AT THE UPPER LEVEL
      SROWU=D(COSTR(9),COSTR(10),COSTR(4))
C     DISTANCE TO LIFT STAND AT SETBACK ON INHOLE SEQUENCE
      XLIFT=COSTR(17)+COSTR(22)-COSTR(1)
C     NUMBER OF STEPS TO MOVE ON Y AXIS WHEN STABBING PIPE
      NSTAB=IFIX((COSTR(19)/YSTP2)+0.5)
C     BIT PATTERN OF STABBING POSITION
      CALL BITS(COSTR(16),YWELL-COSTR(19),IBSTB)
C     INITIALIZE THE FOLLOWIG PARAMETERS
C     NO OF PLAIN SINGLES IN THE HOLE
      NPLNE=0
C     NO OF RUBBER GUARDS IN THE HOLE
      NRUBR=0
C     NO OF SINGLE COLLARS IN THE HOLE
      NCOLR=0
C     TOTAL LENGTH OF PLAIN SECTION IN THE HOLE
      XP=0.
C     TOTAL LENGTH OF RUBBERD SECTION IN THE HOLE
      XR=0.
```

```
C       TOTAL LENGTH OF COLLAR SECTION IN THE HOLE
        XC=0.
C       NO OF STANDS IN THE HOLE
        NSTD=0
C       COMPUTE #BITS /INCH FOR TRAVELING BLOCK
        DRW2=FLOAT (INT(1)-INT(2))/(REAL(1)-REAL(2))
C       COMPUTE ELEVATION AT WHICH BLOCK POSITION WOULD CORRESPOND
C       TO BIT PATTERN 0000 (NO LOAD, BLOCK EXTENDED)
        DRW1=REAL(2)-FLOAT(INT(2))/DRW2
C       DISTANCE TO BE ADDED TO STAND LENGTH IN OUT-HOLE SEQUENCE
C       TO YIELD PROPER CARRIAGE ELEVATION WHEN RAISING LOADED BLOCK
        DRW3=COSTR(17)-COSTR(24)+REAL(5)
C       DISTANCE TO BE ADDED TO STAND LENGTH IN IN-HOLE SEQUENCE
C       TO YIELD PROPER CARRIAGE ELEVATION
        RL=REAL(7)-REAL(6)-1080.-COSTR(17)
        DZ=RL-SQRT(RL*RL-REAL(3)*REAL(3))
        DRW4=COSTR(17)+DZ+REAL(4)-COSTR(24)-COSTR(22)
     1  -COSTR(25)-REAL(8)
C       COMPUTE #BITS/(FT/SEC) ON VELOCITY SCALE
        DRW5=1023./REAL(20)
        DRW6=0.0
        DRW7=0.0
        DRW8=0.0
        DRW9=0.0
        DRW10=0.0
C       DELAY TO ALLOW SLIPS AND BRAKE TO ACTUATE
        IDRW1=IFIX(100.*REAL(13)+0.5)
C       DELAY BETWEEN DE-ENERGIZING MOTOR AND CLUTCHING OUT LOW DRUM
        IDRW2=IFIX(100.*REAL(14)+0.5)
        IDRW3=0
C       BIT PATTERN FOR MOTOR CREEP VELOCITY
        IDRW4=IFIX(DRW5*REAL(21)+0.5)
C       BIT PATTERN FOR BRAKE CREEP VELOCITY
        IDRW5=IFIX(DRW5*REAL(22)+0.5)
        IDRW6=0
        IDRW7=0
C       COMPUTE 'LOWER LOADED' POSITION BIT PATTERN (IN-HOLE)
        EE=COSTR(17)-COSTR(24)
        EC=EE+REAL(5)
        IDRW8=IFIX((EC-DRW1)*DRW2+0.5)
C       COMPUTE 'LOWER EMPTY' POSITION BIT PATTERN (OUT-HOLE)
        EE=COSTR(17)-COSTR(24)-COSTR(22)-REAL(9)
        RL=REAL(7)-REAL(6)-COSTR(17)
        DZ=RL-SQRT(RL*RL-REAL(3)*REAL(3))
        EC=EE+DZ+REAL(4)
        IDRW9=IFIX((EC-DRW1)*DRW2+0.5)
C       EMPTY BLOCK ASCENT VELOCITY BIT PATTERN
        IDR10=IFIX(DRW5*REAL(23)+0.5)
C       EMPTY BLOCK DESCENT VELOCITY BIT PATTERN
        IDR11=IFIX(DRW5*REAL(24)+0.5)
C       WITH ELEVATOR
        IDR12=IFIX((REAL(25)-DRW1)*DRW2+0.5)
C       MAXIMUM DISTANCE (IN BITS) PERMISSIBLE TO LOWER
C       D.S. ONTO SLIPS WITHOUT RECEIVING 'BLOCK LOAD RELIEVED' SIGNAL
        IDR13=IFIX(REAL(26)*DRW2+0.5)
C       COMPUTE DISTANCE (IN BITS) FOR ELEVATOR TO LOWER AFTER
C       RELEASING LOAD, BUT BEFORE RETRACTING BLOCK (IN-HOLE)
        IDR14=IFIX(REAL(10)*DRW2+0.5)
C       COMPUTE SAME, BUT FOR OUT-HOLE
        IDR15=IFIX(REAL(11)*DRW2+0.5)
C       COMPUTE DISTANCE (IN BITS) WITHIN WHICH BLOCK RETRACTION
C       MUST OCCUR ONCE THE 'RETRACT BLOCK' SIGNAL HAS BEEN
C       SENT (OUT-HOLE)
        IDR16=IFIX(REAL(27)*DRW2+0.5)
        IDR17=0
C       COMPUTE DISTANCE (IN BITS) WHICH ELEVATOR CAN ACCEPTABLY
C       STOP SHORT OF THE PROGRAMMED FINAL POSITION
        IDR18=IFIX(REAL(28)*DRW2+0.5)
        IDR19=0
        CALL CRT(1,1,159)
        CALL CRT(1,1,0)
        WRITE(IWRTE,40)
   40   FORMAT ('TURN HSP ON AND PRESS CONTINUE ONLY')
S       HLT
```

```
      DO 100 IODEV=1,2
      WRITE (IODEV,10)
     1 COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10
      WRITE (IODEV,20)
     4 ICNST,NPLNE,NRUBR,NCOLR,NSTD,IBSX,IBSYU,IBSYI,IBWSX,
     5 IBWY,IBSTY,IBYU,IBYI,NYL,NY2,NXSW1,NXSW2,NYSU1,
     6 NYSU2,NYSI1,NYSI2,NYSS1,NYSS2,NSTAB,IBSTB,
     7 IDRW1,IDRW2,IDRW3,IDRW4,IDRW5,IDRW6,IDRW7,IDRW8,
     8 IDRW9,IDR10,IDR11,IDR12,IDR13,IDR14,IDR15,IDR16,
     9 IDR17,IDR18,IDR19
 100  CONTINUE
      END
   $
C     -----------------------------------------------------------
C
C     ROUTINE TO READ RIG DATA
C
C     -----------------------------------------------------------
      SUBROUTINE RIG1
      COMMON REAL1,REAL2,INT1,INT2,IREAD,IWRTE
      DIMENSION REAL1(51),REAL2(16),INT1(53),INT2(9)
      READ (2,10) REAL1
      READ (2,20) INT1
 10   FORMAT (F10.3)
 20   FORMAT (I5)
      RETURN
      END
*
```

RELOCATION

```
 R PAL8
*DTA1:RELOC.BN,TTY:<DTA1:RELOC.PA
```

```
------
```

```
/RELOC - MOVES LINKAGE ROUTINE FROM FIE   PAL8-V9B  06/07/76  PAGE 1

            /RELOC - MOVES LINKAGE ROUTINE FROM FIELD 0 TO FIELD N
            /       PROGRAM TO MOVE THE LINKAGE ROUTINES OF ANY
            /       FORTRAN PROGRAM FROM FIELD 0 TO FIELD N, WHERE
            /       FIELD N HAS HAD A DUMMY SUBROUTINE LOADED INTO ITS
            /       FIRST THREE AVAILABLE PAGES (N0200-N1000). RELOC
            /       OVERLAYS THE DUMMY SUBROUTINE WITH THE LINKAGE
            /       ROUTINES AND MAKES APPROPRIATE MODIFICATIONS TO THE

            /       LINKAGE ROUTINES. IF NO ROUTINES WERE INITIALLY LOA
DED
            /       INTO FIELD 0, THE PROGRAM WILL BE TOTALLY INDEPEN-
            /       DENT OF FIELD 0.
            /
            /
            /       TO EXECUTE THIS PROGRAM, LOAD IT INTO AN UN-
            /       OCCUPIED FIELD. (RELOC MUST BE LOADED USING THE
            /       ABSLDR.) THEN 'GET' THE FORTRAN PROGRAM
            /       AND START IT TO BE SURE IT IS IN CORE. LOAD THE
            /       STARTING ADDRESS OF RELOC (X0200), PRESS CLEAR
            /       AND CONTINUE. PROGRAM SHOULD HALT AT X0245. LOAD
            /       THE FIELD TO BE TRANSFERRED TO INTO SWITCHES 6-8,
            /       AND PRESS CONTINUE. THE COMPUTER SHOULD AGAIN
            /       HALT (AT X0442), THE TRANSFER AND MODIFICATIONS
            /       HAVING BEEN ACCOMPLISHED. (A CHECK ON WHETHER RELOC

            /       RAN PROPERLY IS TO INSPECT THE DATA FIELD WHEN
            /       THE PROGRAM HALTS THE SECOND TIME. IT SHOULD BE THE
```

```
                    /         SAME AS THE FIELD SET IN DATA SWITCHES 6-8.)
                    /
                    /         NOTE: PROGRAM OPERATION REMAINS THE SAME, BUT
                    /               HALTS HAVE BEEN ELIMINATED FOR RUNNING
                    /               UNDER BATCH,AND PROGRAM TERMINATES BY
                    /               EXITING TO THE KEYBOARD MONITOR.(8/15/75)
                    /
                    /
                    /
                    /
                    /
        0200              *200
00200   5245              JMP     BEGIN
00201   0035    LOC35,    0035
00202   0042    LOC42,    0042
00203   0057    LOC57,    0057
00204   0064    LOC64,    0064
00205   0071    LOC71,    0071
00206   6201    CDFINS,   CDF     00
00207   6202    CIFINS,   CIF     00
00210   6203    CBOTH,    CIF CDF 00
00211   7770    M8,       7770
00212   0000    POINTR,   0000
00213   0000    CDFN,     0000
00214   0000    CIFN,     0000
00215   0000    CBOTHN,   0000
00216   0000    LOC00,    0000
00217   0001    LOC01,    0001
00220   0002    LOC02,    0002
00221   0026    LOC26,    0026
00222   0030    LOC30,    0030

------

/RELOC - MOVES LINKAGE ROUTINE FROM FIE   PAL8-V9B  06/07/76  PAGE 1-1

00223   0034    LOC34,    0034
00224   0041    LOC41,    0041
00225   0047    LOC47,    0047
00226   0056    LOC56,    0056
00227   0063    LOC63,    0063
00230   0070    LOC70,    0070
00231   0110    LOC110,   0110
00232   0112    LOC112,   0112
00233   0411    LOC411,   0411
00234   0422    LOC422,   0422
00235   0443    LOC443,   0443
00236   0462    LOC462,   0462
00237   0524    LOC524,   0524
00240   1000    ADD0,     TAD     0000
00241   1001    ADD1,     TAD     0001
00242   1002    ADD2,     TAD     0002
00243   7000    M1000,    7000
00244   0000    LIMIT,    0000
                /
                /
                /
00245   7000    BEGIN,    NOP             /SWITCH REGISTER SHOULD BE LOADED!!
!!
00246   7300              CLA CLL
00247   7604              LAS             /READ DATA FIELD IN 6-8
00250   1206              TAD     CDFINS
00251   3213              DCA     CDFN
00252   7604              LAS
00253   1207              TAD     CIFINS
00254   3214              DCA     CIFN
00255   7604              LAS
00256   1210              TAD     CBOTH
```

```
00257   3215           DCA     CBOTHN
00260   5261           JMP     MOVFLD
00261   7300   MOVFLD, CLA CLL
00262   1213           TAD     CDFN     /ROUTINE TO TRANSFER DATA FROM
00263   3271           DCA     CDFTO    /FIELD 0 TO FIELD N
00264   3212           DCA     POINTR
00265   1243           TAD     M1000
00266   3244           DCA     LIMIT
                                        /ONLY 00000 TO 00777 ARE TRANSFERRE
D
00267   6201   M1,     CDF     0
00270   1612           TAD I   POINTR
00271   6201   CDFTO,  CDF     0        00274  2244  ISZ  LIMIT
00272   3612           DCA I   POINTR
00273   2212           ISZ     POINTR
00275   5267           JMP     M1
00276   5277           JMP     INSTFL
00277   7300   INSTFL, CLA CLL          /ROUTINE TO REPLACE CIF 0'S WITH
00300   1211           TAD     M8
00301   3212           DCA     POINTR
00302   6201   FEELD,  CDF     0        /CIF N'S ON PAGE 0 IN ALL FIELDS
00303   1214           TAD     CIFN
00304   3601           DCA I   LOC35
00305   1214           TAD     CIFN
```

------

/RELOC - MOVES LINKAGE ROUTINE FROM FIE    PAL8-V9B   06/07/76   PAGE 1-2

```
00306   3602           DCA I   LOC42
00307   1214           TAD     CIFN
00310   3603           DCA I   LOC57
00311   1214           TAD     CIFN
00312   3604           DCA I   LOC64
00313   1214           TAD     CIFN
00314   3605           DCA I   LOC71
00315   7001           IAC;RTL;RAL      /LOAD A 10(8)
00316   7006
00317   7004
00320   1302           TAD     FEELD
00321   3302           DCA     FEELD
00322   2212           ISZ     POINTR
00323   5302           JMP     FEELD
00324   5325           JMP     MODS
00325   1213   MODS,   TAD     CDFN
00326   3327           DCA     M2
00327   6201   M2,     CDF     0
00330   1206           TAD     CDFINS
00331   3616           DCA I   LOC00
00332   1207           TAD     CIFINS
00333   3617           DCA I   LOC01
00334   1210           TAD     CBOTH
00335   3620           DCA I   LOC02
00336   1242           TAD     ADD2
00337   3621           DCA I   LOC26
00340   1215           TAD     CBOTHN
00341   3622           DCA I   LOC30
00342   1213           TAD     CDFN
00343   3623           DCA I   LOC34
00344   1213           TAD     CDFN
00345   3624           DCA I   LOC41
00346   1213           TAD     CDFN
00347   3625           DCA I   LOC47
00350   1213           TAD     CDFN
00351   3626           DCA I   LOC56
00352   1213           TAD     CDFN
00353   3627           DCA I   LOC63
00354   1213           TAD     CDFN
00355   3630           DCA I   LOC70
```

```
00356  1242            TAD     ADD2
00357  3631            DCA I   LOC110
00360  1215            TAD     CBOTHN
00361  3632            DCA I   LOC112
00362  1241            TAD     ADD1
00363  3633            DCA I   LOC411
00364  1240            TAD     ADD0
00365  3634            DCA I   LOC422
00366  1241            TAD     ADD1
00367  3635            DCA I   LOC443
00370  1240            TAD     ADD0
00371  3636            DCA I   LOC462
00372  1215            TAD     CBOTHN
00373  3637            DCA I   LOC524
00374  5777'           JMP     SUBCHK
```

------

```
/RELOC - MOVES LINKAGE ROUTINE FROM FIE     PAL8-V9B  06/07/76  PAGE 1-3

00377  0406
       0400            *400
00400  7700   M100,    7700
00401  0200   P200,    0200
00402  0000   COUNT,   0000
00403  0000   EXAM,    0000
00404  0000   XCDFN,   0000
00405  0000   XCDFIN,  0000
00406  7300   SUBCHK,  CLA CLL
00407  6224            RIF
00410  1212            TAD     CHANGE
00411  3212            DCA     CHANGE
00412  6201   CHANGE,  CDF     0
00413  1777'           TAD     CDFINS
00414  3205            DCA     XCDFIN
00415  1776'           TAD     CDFN
00416  3204            DCA     XCDFN
00417  1204            TAD     XCDFN
00420  3221            DCA     BACK
00421  6201   BACK,    CDF     0
00422  7300            CLA CLL
00423  1200            TAD     M100
00424  3202            DCA     COUNT
00425  1201            TAD     P200
00426  3203            DCA     EXAM
00427  1603   AGAIN,   TAD I   EXAM
00430  7041            CIA
00431  1205            TAD     XCDFIN
00432  7440            SZA
00433  5236            JMP     BUMP
00434  1204            TAD     XCDFN
00435  3603            DCA I   EXAM
00436  7300   BUMP,    CLA CLL
00437  2203            ISZ     EXAM
00440  2202            ISZ     COUNT
00441  5227            JMP     AGAIN
00442  6201            CDF     0
00443  6202            CIF     0
00444  5775            JMP I   (7600    /RETURN TO KEYBOARD MONITOR
00575  7600
00576  0213
00577  0206
                       $
   $$
```

```
      SUBROUTINE FILLR
      COMMON   COSTR,XP,XR,XC,XSTOR,YSTOU,YSTOI,XWST,YWELL,YSTBY,
     1 XSTP1,XSTP2,YSTP1,YSTP2,DROWU,SROWU,XLIFT,DRW1,DRW2,
     2 DRW3,DRW4,DRW5,DRW6,DRW7,DRW8,DRW9,DRW10,XHOLE,
     3 VELOC,DEPTH,
     4 ICNST,NPLNE,NRUBR,NCOLR,NSTD,IBSX,IBSYU,IBSY1,IBWSX,
     5 IBWY,IBSTY,IBYU,IBY1,NY1,NY2,NXSW1,NXSW2,NYSU1,
```

```
      6   NYSU2,NYSI1,NYSI2,NYSS1,NYSS2,NSTAB,IBSTB,
      7   IDRW1,IDRW2,IDRW3,IDRW4,IDRW5,IDRW6,IDRW7,IDRW8,
      8   IDRW9,IDR10,IDR11,IDR12,IDR13,IDR14,IDR15,IDR16,
      9   IDR17,IDR18,IDR19,IFLG1,IFLG2,IFLG3,IFLG4,IFLG5,
      A   IFLG6,IFLG7,IFLG8,IFLG9,IREAD,IWRTE,KODE1,KODE2,
      B   KODE3,KODEP,IDATA,LP,LR,LC,KOD7,KOD10,KOD11,KOD12,
      C   KOUNT,NRUBT
          DIMENSION COSTR(25),ICNST(10),LP(90),LR(90),LC(30),
      1   VELOC(8),DEPTH(7)
S         LAP
S         BLOCK 200
S         BLOCK 100
          END
*
```

What is claimed is:

1. In an oil drilling rig having a traveling block vertically upwardly and vertically downwardly movable and having transducer means for generating an electrical signal representative of the actual direction of motion of the traveling block and an electrical signal representative of the actual block velocity, wherein the improvement comprises first means for comparing the signal representative of the actual velocity of the block with a signal representative of a predetermined maximum velocity and for outputting a first alarm signal indicative of the actual velocity being greater than the predetermined maximum velocity; and, second means for comparing the signal representative of the actual direction of motion of the block with a signal representative of a predetermined direction of motion and for outputting a second alarm signal if the actual direction of the block deviates from the predetermined direction.

2. The oil drilling rig according to claim 1 wherein the signal from the transducer means representative of the actual block velocity is a unipolar signal and wherein the first comparing means includes a maximum velocity indicating network which comprises:

a potentiometer for generating the electrical signal representative of the predetermined maximum velocity; and, a comparator input with the electrical signal representative of the actual block velocity and the electrical signal representative of the predetermined maximum velocity from the potentiometer for generating the first electrical alarm signal if the actual velocity signal exceeds the maximum velocity signal.

3. The oil drilling rig according to claim 2 wherein the signal output from the transducer means is a bipolar electrical signal the magnitude of which is functionally related to the actual velocity of the traveling block and the polarity of which is representative of the actual upwardly or downwardly direction of motion thereof and wherein the second comparing means includes a direction indicating network which comprises:

a first comparator element and a second comparator element each associated with the bipolar electrical signal from the transducer means and each operative to compare the bipolar electrical signal with a predetermined reference signal and to generate the second electrical alarm signal if the bipolar electrical signal deviates from the reference signal by a predetermined magnitude; and means for enabling a selected one of the first or second comparator elements.

4. The oil drilling rig according to claim 3 wherein the first and second alarm signals are input to the computer from the first and second comparing means, respectively.

5. The oil drilling rig according to claim 2 wherein the first and the second alarm signals are input to the computer from the first and second comparing means, respectively.

6. The oil drilling rig according to claim 2 wherein the transducer means outputs a bipolar electrical signal the magnitude of which is functionally related to the actual velocity of the traveling block and the polarity of which is representative of the actual upwardly or downwardly direction of motion thereof and wherein the zero velocity network comprises:

a first comparator element and a second comparator element connected to the bipolar electrical signal from the transducer means at the inverting and non-inverting inputs, respectively;

first potentiometer means for generating a reference electrical signal representative of a predetermined range of velocities close to zero velocity connected to the first comparator element at the non-inverting input thereof the first comparator element operative to output an electrical signal whenever the downward velocity of the block falls within the predetermined range of velocities close to zero velocity; and, second potentiometer means for generating a reference electrical signal representative of a predetermined range of velocities close to zero velocity connected to the second comparator element at the inverting input thereof, the second comparator element operative to output an electrical signal whenever the upward velocity of the block falls within a predetermined range of velocities close to zero velocity.

7. The oil drilling rig according to claim 1 wherein the signal output from the transducer mean is a bipolar electrical signal the magnitude of which is functionally related to the actual velocity of the traveling block and the polarity of which is representative of the actual upwardly or downwardly direction of motion thereof and wherein the second comparing means includes a direction indicating network which comprises:

a first comparator element and a second comparator element each associated with the bipolar electrical signal from the transducer means and each operative to compare the bipolar electrical signal with a predetermined reference signal and to generate the second electrical alarm signal if the bipolar electrical signal deviates from the reference signal by a predetermined magnitude; and means for enabling a selected one of the first or second comparator elements.

8. The oil drilling rig according to claim 7 wherein the first and the second alarm signals are input to the computer from the first and second comparing means, respectively.

9. The oil drilling rig according to claim 1 wherein the first and the second alarm signals are input to the computer from the first and second comparing means, respectively.

10. The oil drilling rig according to claim 1, further comprising a zero velocity network for generating an electrical signal when the magnitude of the electrical signal representative of the actual block velocity falls within a predetermined range of values close to zero velocity.

* * * * *

UNITED STATES PATENT AND TRADEMARK OFFICE

CERTIFICATE OF CORRECTION

PATENT NO. : 4,128,888

DATED : December 5, 1978

INVENTOR(S) : Loren B. Sheldon, et al.

It is certified that error appears in the above-identified patent and that said Letters Patent are hereby corrected as shown below:

Col. 147, line 51, "2" should read ---1---.

Col. 148, line 15, "the" (second occurrence) should read ---a---;

line 19, "the" (third occurrence) should read ---a---;

line 22, "2" should read ---10---.

Col. 149, lines 2 and 6, "the" (third occurrence) should read ---a---.

Signed and Sealed this

***Twenty-ninth* Day of *May 1979***

[SEAL]

*Attest:*

RUTH C. MASON
*Attesting Officer*

DONALD W. BANNER
*Commissioner of Patents and Trademarks*